US006843977B2

(12) United States Patent
Pinnavaia et al.

(10) Patent No.: US 6,843,977 B2
(45) Date of Patent: Jan. 18, 2005

(54) ULTRASTABLE POROUS ALUMINOSILICATE STRUCTURES AND COMPOSITIONS DERIVED THEREFROM

(75) Inventors: Thomas J. Pinnavaia, East Lansing, MI (US); Wenzhong Zhang, Broken Arrow, OK (US); Yu Liu, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 140 days.

(21) Appl. No.: 10/025,647

(22) Filed: Dec. 19, 2001

(65) Prior Publication Data

US 2002/0131930 A1 Sep. 19, 2002

Related U.S. Application Data

(63) Continuation-in-part of application No. 09/792,017, filed on Feb. 21, 2001, now Pat. No. 6,746,659, and a continuation-in-part of application No. 09/578,315, filed on May 25, 2000, now Pat. No. 6,585,952.

(51) Int. Cl.[7] .............................................. C01B 33/26
(52) U.S. Cl. .................... 423/702; 423/709; 423/328.2; 501/80; 501/81
(58) Field of Search ................................ 423/702, 709, 423/326, 328.1, 328.2; 502/80, 81

(56) References Cited

U.S. PATENT DOCUMENTS

| 3,574,538 A | 4/1971 | McDaniel |
| 3,671,191 A | 6/1972 | Maher et al. |
| 3,789,107 A | 1/1974 | Elliott |
| 3,808,326 A | 4/1974 | McDaniel et al. |
| 4,178,352 A | 12/1979 | Vaughan et al. |
| 4,231,899 A | * 11/1980 | Chen et al. ............. 502/62 |
| 4,236,993 A | * 12/1980 | Muller et al. ............. 204/294 |
| 5,232,675 A | * 8/1993 | Shu et al. ............. 423/328.2 |
| 5,264,203 A | 11/1993 | Beck et al. |
| 5,840,271 A | * 11/1998 | Carrazza et al. ............. 423/700 |
| 5,958,368 A | * 9/1999 | Ryoo et al. ............. 423/705 |

OTHER PUBLICATIONS

Liu et al., "Steam-Stable Aluminosilicate Mesostructures Assembled from Zeolite Type Y Seeds," J. Am. Chem. Soc., vol. 122, pp. 8791–8792, Aug. 24, 2000.*
Ryoo, R., et al., Chem. Commun.2225 (1997).
Luan, Z.H., et al., J. Phys. Chem. 99 10590 (1995).
Corma, A., et al., J. Catal. 148 569 (1994).
Beck, J.S., et al., J. Am. Chem. Soc. 114 10834 (1992).
Chen, C–Y., et al., Microporous Mater. 2 17 (1993).
Borade, R.B., et al., Catal. Lett 31 267 (1994).
Janicke, M.T., et al., Chem. Mater. 11 1342 (1999).
Hamdan, H., et al., J. Chem. Soc. Faraday Trans 92 2311 (1996).
Mokaya, R., et al., Chem. Commun. 2185 (1997).
Ryoo, R., et al., Chem. Mater. 9 1607 (1998).

(List continued on next page.)

*Primary Examiner*—David Sample
(74) *Attorney, Agent, or Firm*—Ian C. McLeod

(57) ABSTRACT

Porous hexagonal, cubic, lamellar, wormhole, or cellular foam aluminosilicates, gallosilicates and titanosilicates derived from protozeolitic seeds or zeolite fragments using an organic porogen directing agent are described. The porous aluminosilicates optionally also can contain zeolite crystals depending upon the aging of the protozeolitic seeds. The silicon and aluminum, gallium or titanium centers in the structures are stable so that the framework of the structure does not collapse when heated in the presence of water or water vapor (steam). The steam stable compositions can be used as catalysts for hydrocarbon conversions, including the fluidized bed catalytic cracking and the hydrocracking of petroleum oils, and other reactions of organic compounds.

40 Claims, 51 Drawing Sheets

OTHER PUBLICATIONS

Corma, A., Chem. Rev. 2373 (1997).
Kim et al., Science, 282 1302 (1998).
Bagshaw et al., Chem. Commun. 533–534 (2000).
Lechert et al. Stud. Surf. Sci. Catal., 84 147 (1994).
Robson, ACS Sym. Ser. 398, 436 (1989).
Lok, et al., Zeolites 3, 282 (1983).
Watson, J.N., et al., J. chem. Soc., Faraday Trans. (94) 2181 (1998).
deMoor, P.P.E.A. et al., Chem. Mater. (11) 36 (1999).
deMoor, P.P.E.A. et al., J. Phys. Chem. B (103) 1639 (1999).
Zones, S.E., et al., Microporous Mesoporous Mater. 21, 199 (1998).
Boyett, R.E., et al., Zeolites (17) 508 (1996).
J. Am. Chem. Soc. 122, 10712 (2000).
Chem. Comm. 559 (2001).
J. Am. Chem. Soc., 123 5146 (2001).
Chem. Comm. 2177 (1999).
Nature 412 169 (2001).
Lippmaa et al., J. Amer. Chem. Soc. 108 1730 (1986).
Lawton, S.L., et al., J. Phys. Chem. 100 3788 (1996).
Nature 396 353 (1998).
Jansen, J.C., et al., Chem. Comm. 8 713 (2001).
deMoor et al., J. Phys. Chem. B 103 1639 (1999) (duplicate—See A19).
White et al., J. Chem. Soc., Faraday Trans. 94, 2181 (1998).
van Santen et al., J. Phys. Chem. 103, 1639 (1999) (same as A19).
Ryoo, J. Phys. Chem. 99 16742 (1995).
Mokaya, R., Angew. Chem. Int. Ed. 38 No. 19 2930 (1999).
Kloetstra et al, Chem. Commun., 2281 (1997).
Perez–Pariente, J., et al., Applied Catalysis 31, 35 (1998).
Camblor, et al., Stud. Surf. Sci. Catal. 105 341 (1997).
Stucky, et al., J. Am. Chem. Soc. 121:254 (1999).
Liu, Y., et al., J. Am. Chem. Soc. 122 8791 (2000).

* cited by examiner

Testing of Mokaya's Al-MCM-41(Si/Al=6.1)

FIGURE 32 (Example 31)
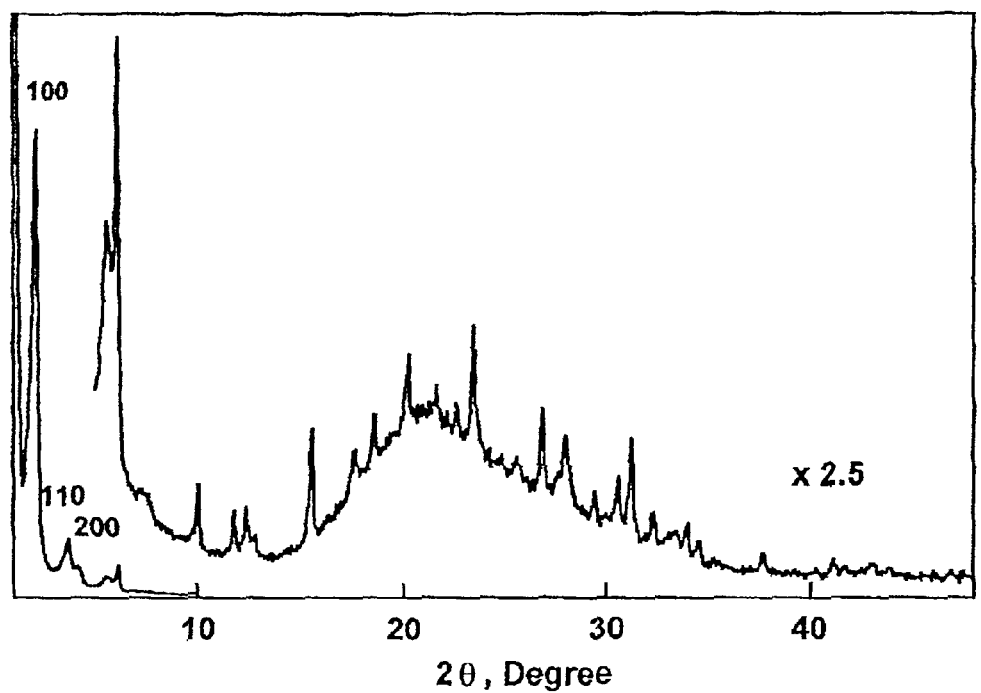

(Example 31)

FIGURE 34 (Example 31)
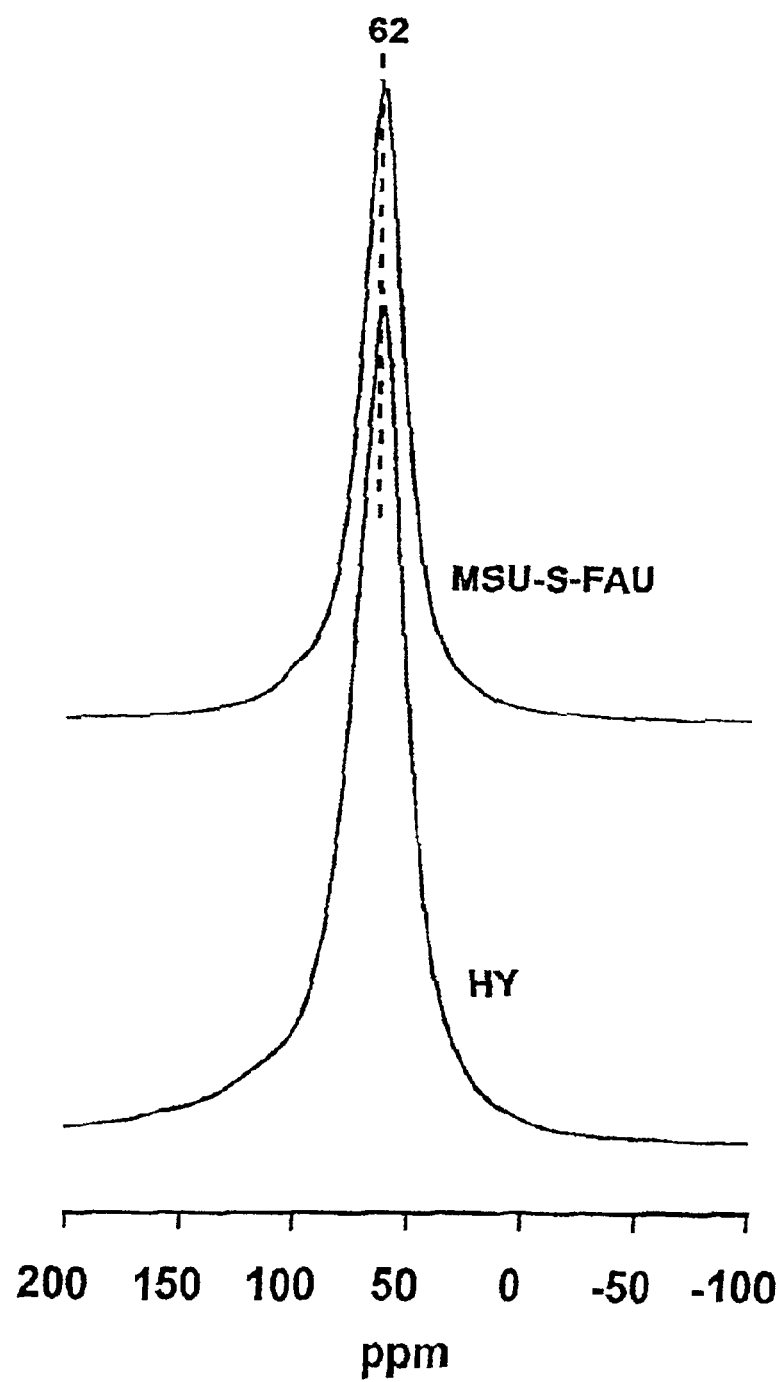

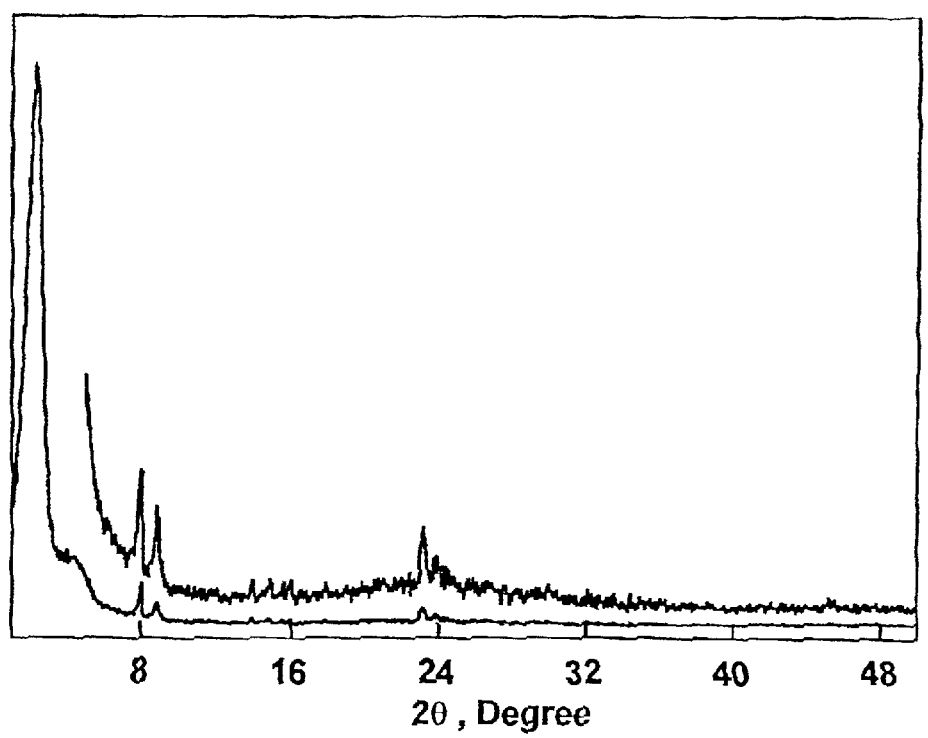
FIGURE 35 (Example 32)

FIGURE 36 (Example 32)
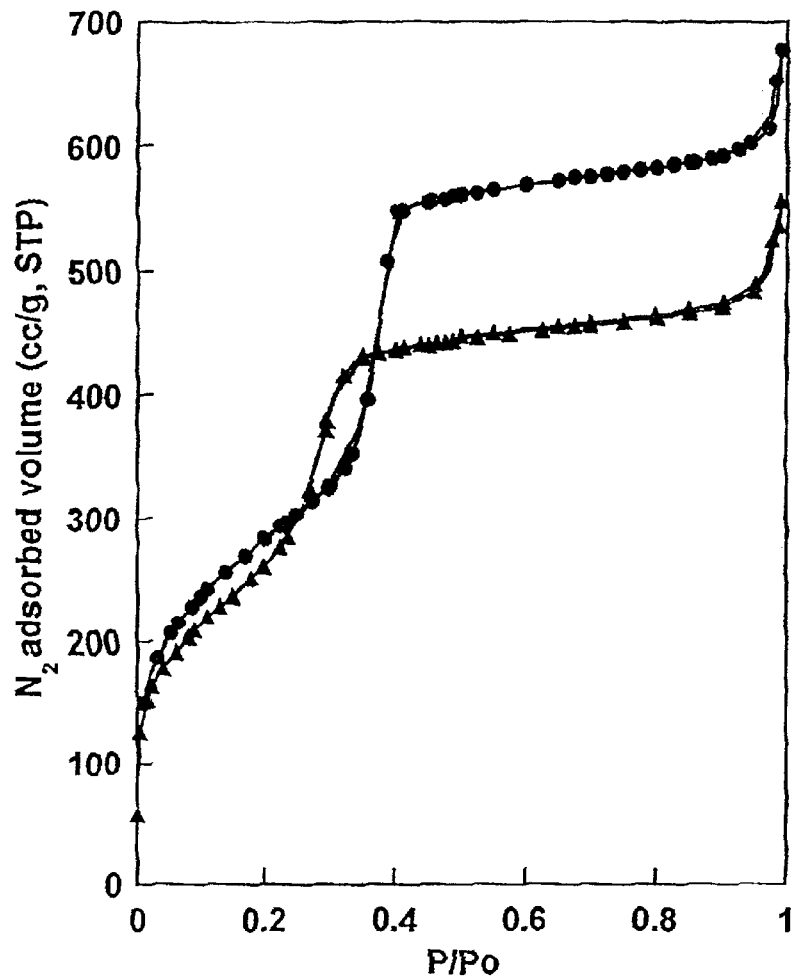
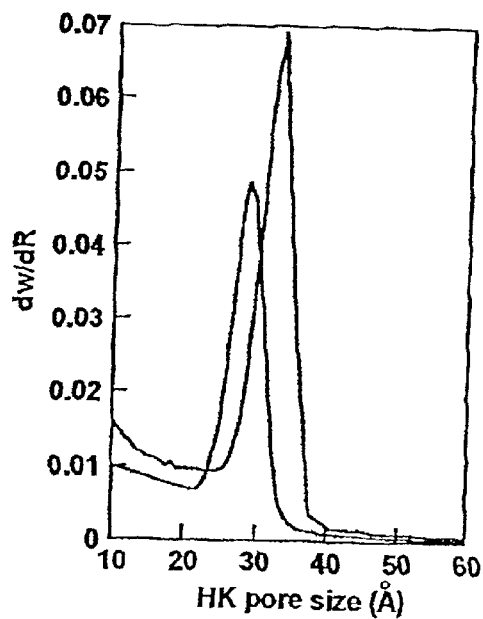
FIGURE 36A

FIGURE 37 (Example 33)
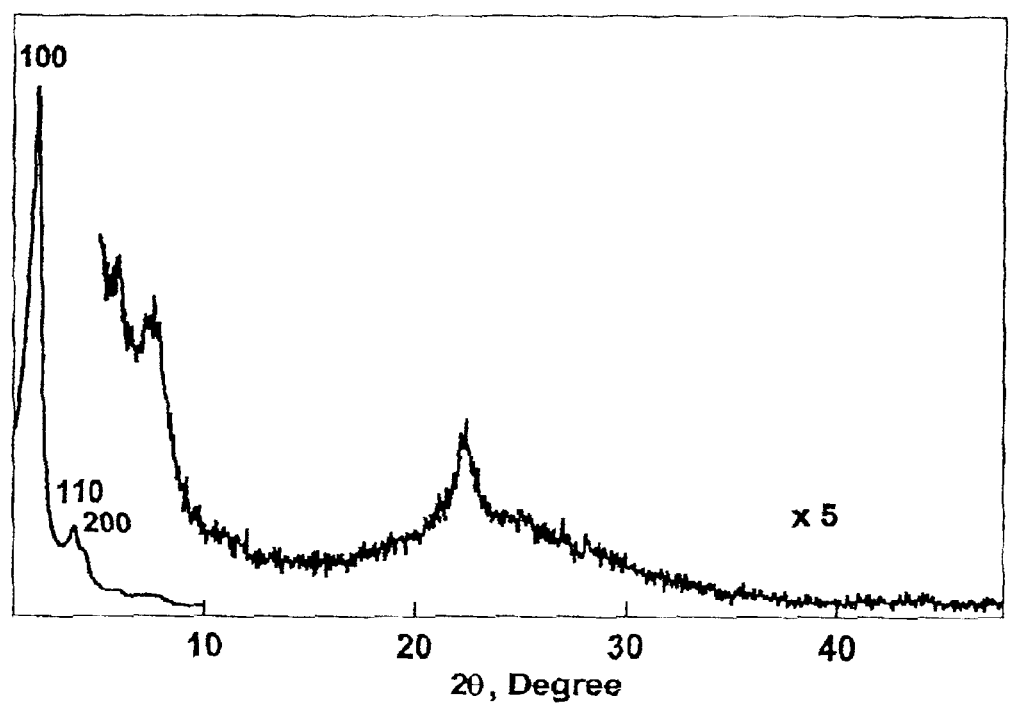

FIGURE 38 (Example 33)
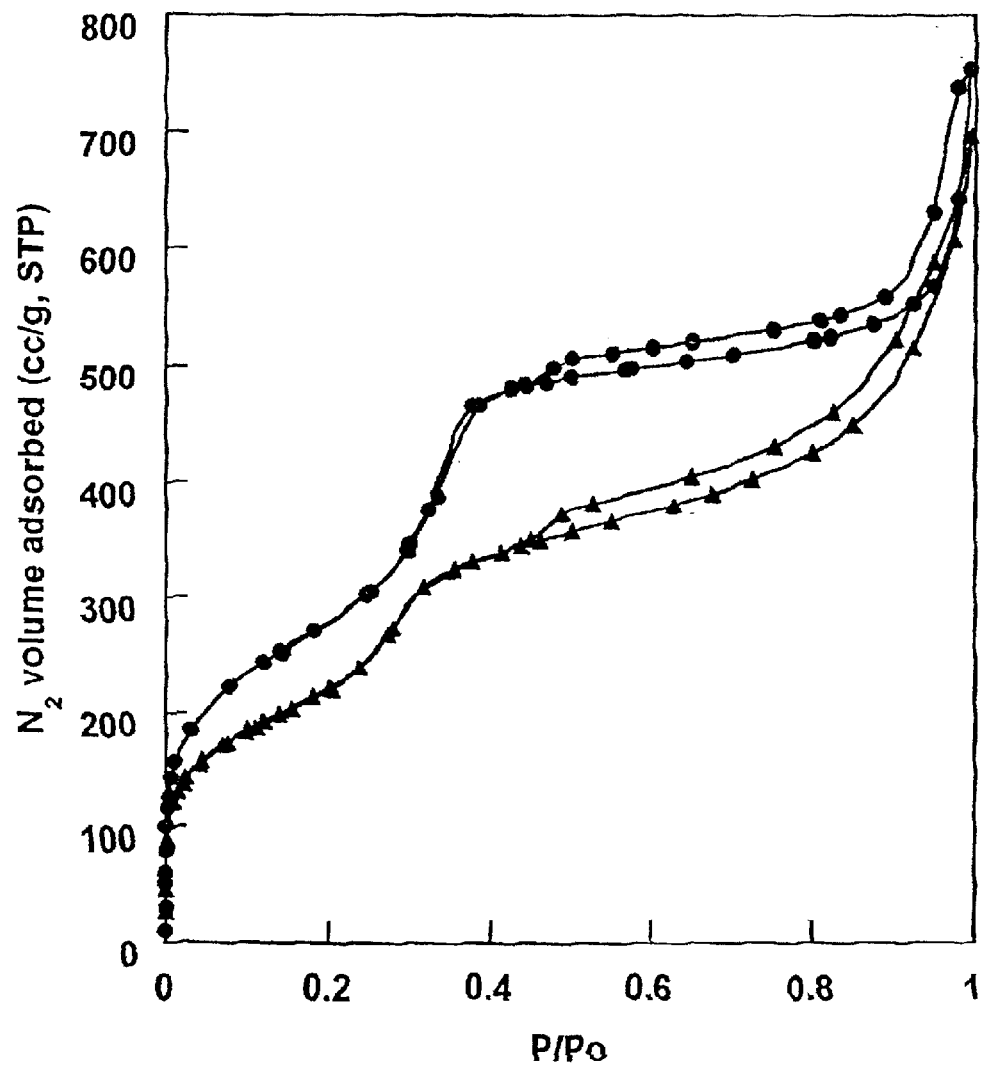
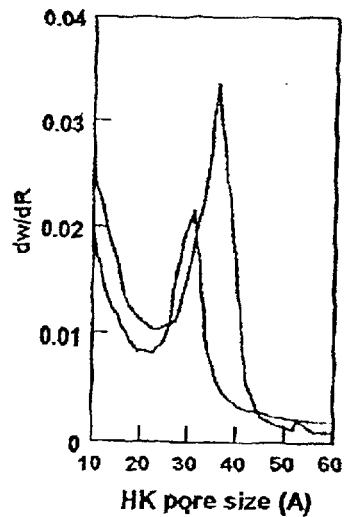
FIGURE 38A

FIGURE 39 (Example 34)
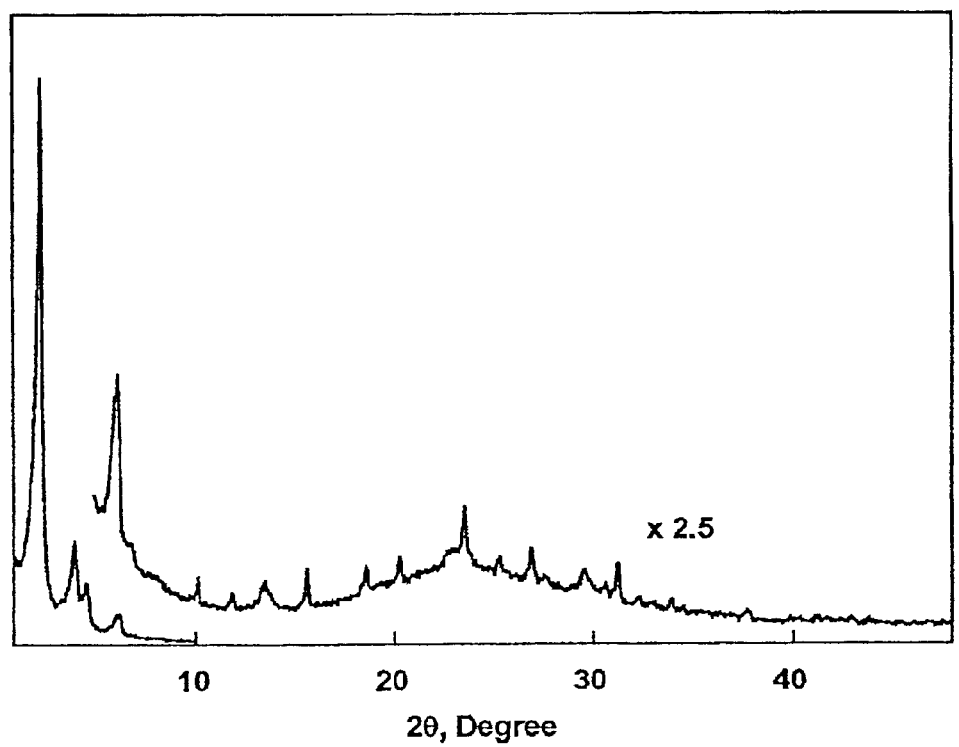

(Example 34)

FIGURE 41 (Example 35)
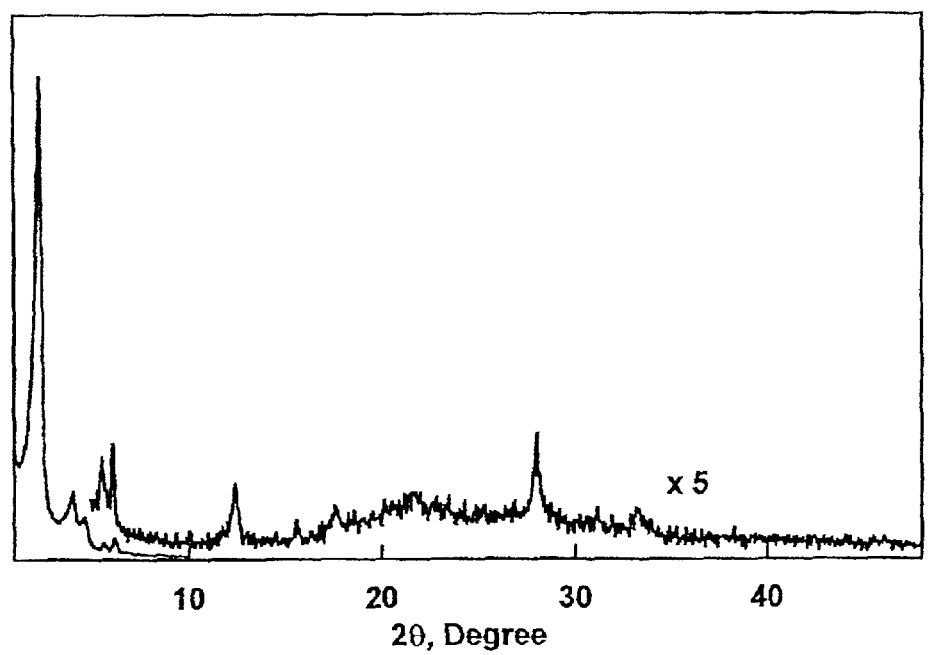

FIGURE 42 (Example 35)
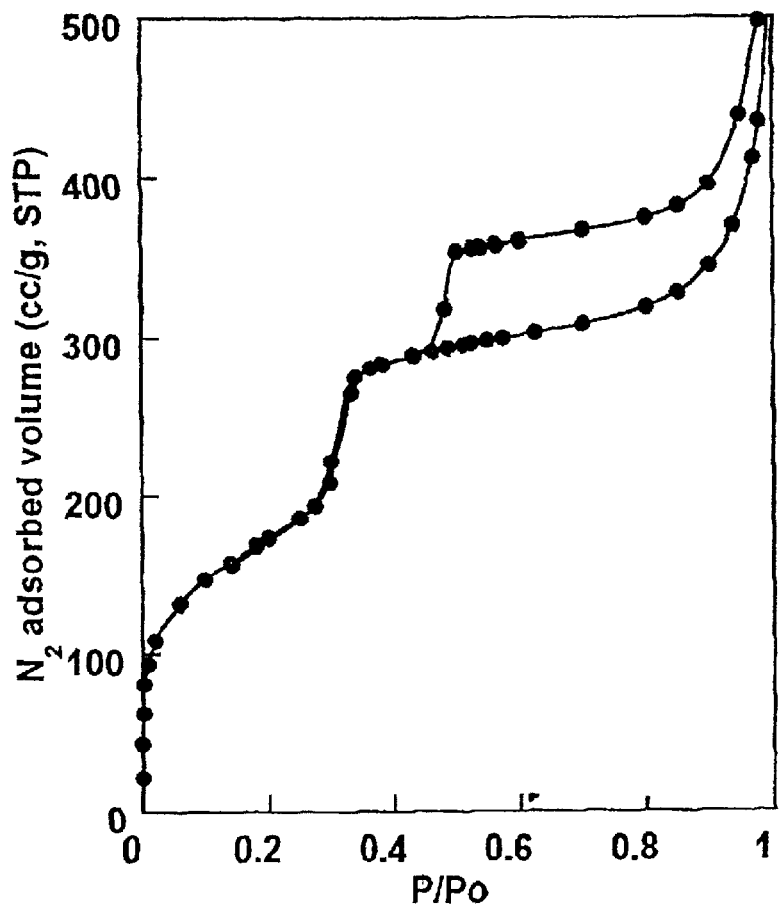
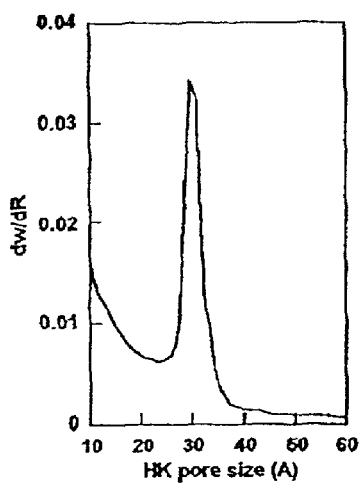
FIGURE 42A

FIGURE 43 (Example 36)
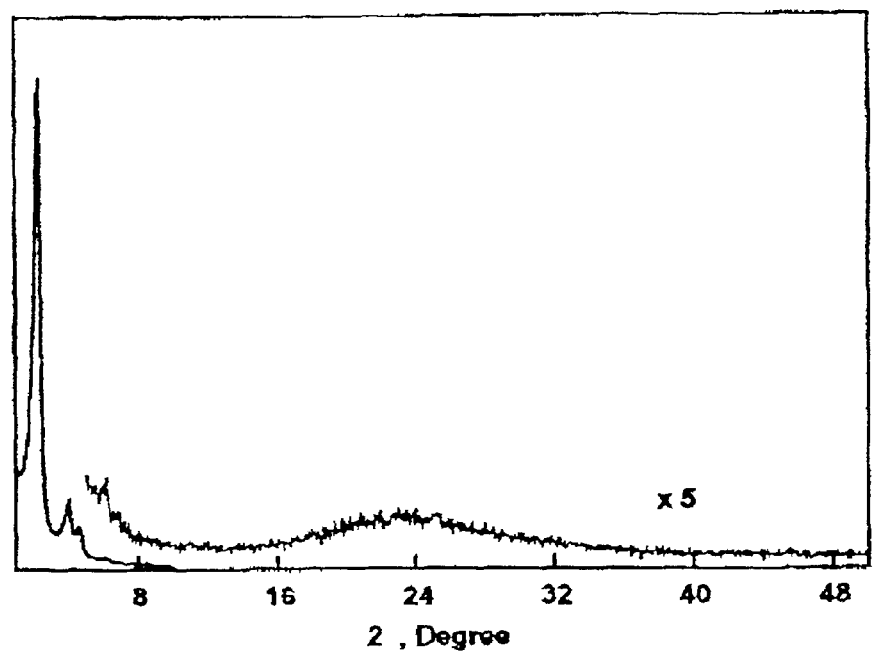

FIGURE 44
(Example 36)
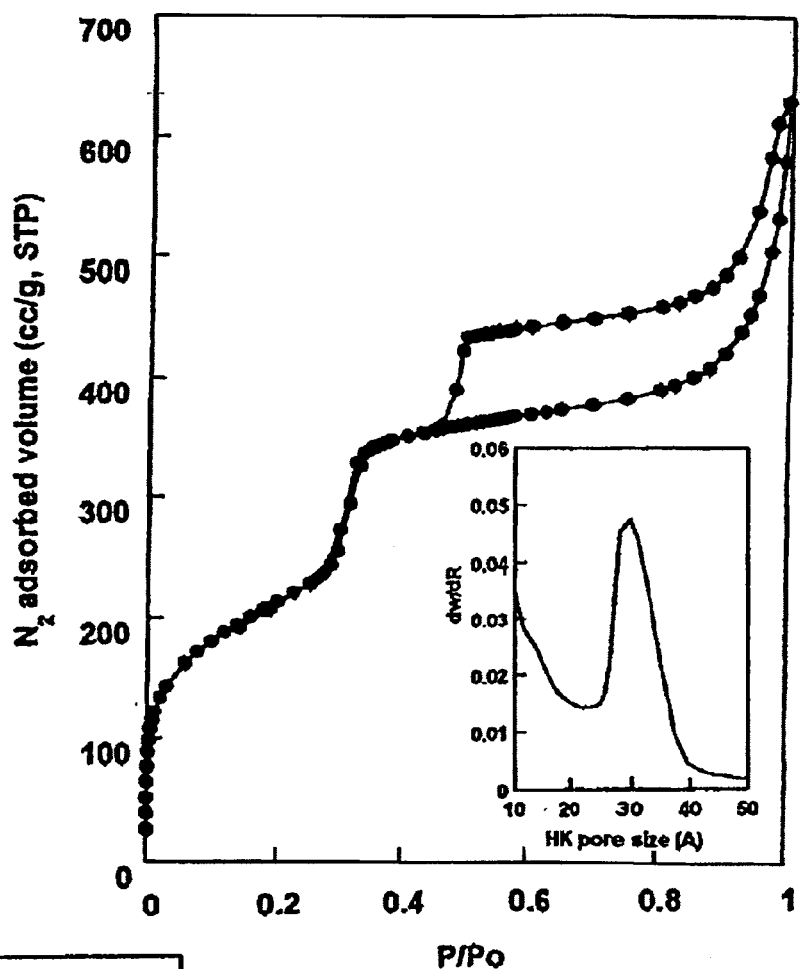
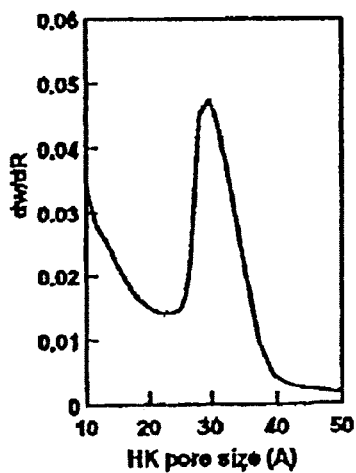
FIGURE 44A

FIGURE 45 (Example 37)
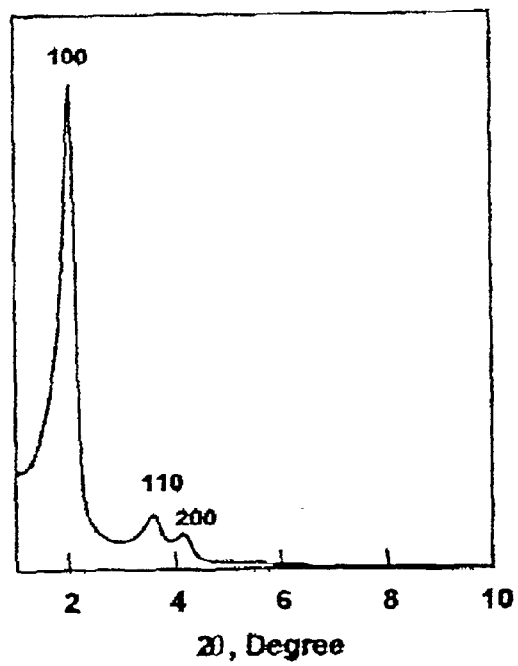
FIGURE 46 (Example 37)
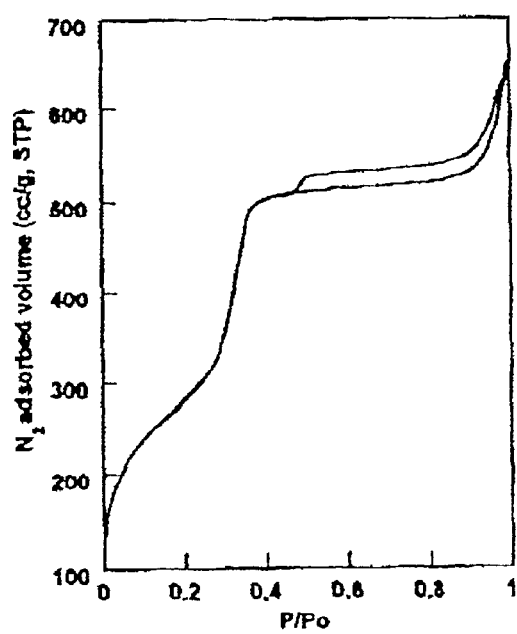

US 6,843,977 B2

ULTRASTABLE POROUS ALUMINOSILICATE STRUCTURES AND COMPOSITIONS DERIVED THEREFROM

CROSS REFERENCE TO RELATED APPLICATION

This application is a continuation-in-part of application Ser. No. 09/792,017 filed Feb. 21, 2001, now U.S. Pat. No. 6,746,659, and a continuation-in-part of application Ser. No. 09/578,315 filed May 25, 2000, now U.S. Pat. No. 6,585,952.

STATEMENT REGARDING FEDERALLY FUNDED RESEARCH AND DEVELOPMENT

This invention was developed under National Science Foundation Grant Nos. CHE-9633798 and CHE-9903706. The U.S. government has certain rights to this invention.

BACKGROUND OF THE INVENTION (1) Field of the Invention

The present invention relates to porous aluminosilicate compositions which have a unique structure which are stable at high temperatures and under hydrothermal conditions. In particular, the present invention relates to a process for producing the porous aluminosilicate composition which uses a zeolite seed or a zeolite fragment with a structure directing agent, referred to as an organic porogen. The porous aluminosilicate structures are mesoporous and optionally can contain zeolite crystals, depending upon the aging of the zeolite seeds and the extent to which the zeolite fragments are disordered. Further still, the present invention relates to novel cracking catalysts for oil and other organic molecules. The present invention thus provides for the assembly of ultrastable porous aluminosilicates with hexagonal, cubic, wormhole or foam framework structures that do not suffer from the undesirable extensive de-alumination and steam instability of conventional aluminosilicate compositions.

(2) Description of Related Art

All previously reported aluminosilicate mesostructures, as prepared by either direct or post synthesis alumination, result in the extensive de-alumination of the framework upon calcination (Ryoo, R., et al., Chem. Commun. 2225 (1997); and Luan, Z. H., et al., J. Phys. Chem. 99 10590 (1995)). This undesired property has been attributed to the hydrolysis of the framework Al by steam generated in the calcination process (Corma, A., et al., J. Catal. 148 569 (1994); and Luan, Z. H., et al., J. Phys. Chem. 99 10590 (1995)). Regardless of the mechanism responsible for the de-alumination process, the acid catalytic properties of these materials for organic chemical conversions is greatly compromised. Moreover, all previously reported aluminosilicate mesostructures completely lose their framework mesoporosity when exposed to steam at the temperatures normally encountered in the processing of petroleum catalysts.

Soon after the discovery of mesoporous MCM-41 molecular sieves (Beck, J. S., et al., J. Am. Chem. Soc. 114 10834 (1992)), it was found that the incorporation of aluminum into the framework introduced mild acidic functionality, but the long range order and tetrahedral siting of the aluminum was compromised (Chen, C-Y., et al., Microporous Mater. 2 17 (1993); Borade, R. B., et al., Catal. Lett 31 267 (1994); Luan, Z. H., et al., J. Phys. Chem. 99 10590 (1995)), especially at intended aluminum loadings above about 8 mol %. Mild acidity and loss of structural integrity, together with poor steam stability under regeneration conditions made hexagonal Al-MCM-41 compositions unattractive candidates for the processing of high molecular weight petroleum fractions. More recently, important advances have been made in improving the structural integrity of Al-MCM-41 through direct assembly (Janicke, M. T., et al., Chem. Mater. 11 1342 (1999)) and post synthesis modification methods (Hamdan, H., et al., J. Chem. Soc. Faraday Trans 92 2311 (1996); Mokaya, R., et al., Chem. Commun. 2185 (1997); Ryoo, R., et al., J. Chem. Commun. 2225 (1997); and Ryoo, R., et al., Chem. Mater. 9 1607 (1998)). However, the low acidity and poor steam stability still limit potential applications in petroleum refining (Corma, A., Chem. Rev. 2373 (1997)).

U.S. Pat. No. 5,264,203 to Beck et al describes mesoporous aluminosilicate compositions. The compositions are similar to the present invention but are not based upon pore forming zeolitic seeds or fragments thereof.

There is thus a need for improved aluminosilicate compositions, both mesostructured with larger pore sizes that are stable, particularly in the presence of steam. In particular, the present invention relates to aluminosilicates that have stable framework structures.

SUMMARY OF THE INVENTION

The present invention relates to a porous structured aluminosilicate composition which comprises:

a framework of linked tetrahedral $SiO_4$ and $AlO_4$ units, the framework defining pores and having an Si to Al molar ratio of between about 1000 to 1 and 1 to 1, and wherein the composition retains at least 50% of an initial framework pore volume after exposure to 20 volume % steam at 800° C. for two hours.

The present invention also relates to a porous structured aluminosilicate composition which comprises:

a framework of linked $SiO_4$ and $AlO_4$ units, the framework defining pores and having a Si to Al molar ratio of about 1000 to 1 and 1 to 1, and having at least one X-ray diffraction peak between 2 and 100 nm, and wherein the composition retains at least 75% of an initial framework pore volume after exposure to 20 volume percent steam at 600° C. for four hours.

The present invention also relates to a porous structured aluminosilicate composition which comprises:

a framework of linked tetrahedral $SiO_4$ and $AlO_4$ units, the framework defining pores having an organic surfactant in the pores and having a Si to Al molar ratio of between 1000 to 1 and 1 to 1 and having at least one X-ray diffraction peak corresponding to a basal spacing between about 2 and 100 nm and wherein the composition is derived from a porogen and preformed zeolite seeds or zeolite fragments.

The present invention also relates to a process for forming a porous aluminosilicate composition which comprises:

(a) providing zeolite seeds or zeolite fragments in a form selected from the group consisting of an aqueous solution, gel, suspension wetted powder and mixtures thereof;

(b) mixing in a mixture the zeolite seeds or zeolite fragments in an aqueous medium with an organic porogen;

(c) aging the mixture of step (b) at a temperature between 25° and 200° C. to obtain a precipitate of the composition; and (d) separating the composition from the mixture of step (c).

The present invention further relates to a structured aluminosilicate porous composition which comprises:

a framework of linked tetrahedral $SiO_4$ and $AlO_4$ units, the framework defining mesopores, having a porogen or a surfactant, a porogen in the pores of the composition having an Si to Al molar ratio of between about 1000 to 1 and 1 to 1, and having at least one X-ray diffraction peak corresponding to a basal spacing between about 2.0 and 100 nm, and which when calcined retains at least 50% of an initial framework pore volume after exposure to 20 volume % steam at 800° C. for two hours.

The present invention also relates to a porous aluminosilicate composition which comprises: a framework of tetrahedral linked $SiO_4$ and $AlO_4$ units, the framework defining mesopores having an Si to Al molar ratio of between about 1000 to 1 and 1 to 1, and having at least one X-ray diffraction peak corresponding to a basal spacing between about 2.0 and 100 nm, wherein a BET surface area is between 200 and 1400 $m^2$ per gram, wherein an average pore size of the framework is between about 1.0 and 100 nm, and wherein a pore volume of the framework is between about 0.1 and 3.5 $cm^3$ per gram, and which retains at least 50% of an initial framework pore volume after exposure to 20 volume % steam at 800° C. for two hours.

The present invention further relates to a hybrid porous aluminosilicate-carbon composition which comprises: a framework of linked tetrahedral $SiO_4$ and $AlO_4$ units, the framework defining mesopores having an Si to Al molar ratio of between about 1000 to 1 and 1 to 1 and between 0.01 and 50 wt % carbon embedded in the mesopores, and having at least one X-ray diffraction peak corresponding to a basal spacing between about 2.0 and 100 nm, wherein a BET surface area is between 100 and 1400 $m^2$ per gram, wherein an average pore size of the framework is between about 1.0 and 100 nm, and wherein a pore volume of the framework is between about 0.1 and 3.5 $cm^3$ per gram, and which retains at least 50% of an initial framework pore volume after exposure to 20 volume % steam at 800° C. for two hours.

The present invention further relates to a composition prepared by treating the composition of claim 20 before calcining with an ammonium salt solution at a temperature between about 0° and 200° C. for a period of up to 24 hours and repeating the treatment up to ten times to introduce ammonium ions into the composition, collecting and drying the resulting composition, and then calcining the resulting composition at a temperature between about 400 and 900° C. to remove the organic porogen and to convert a fraction of the surfactant or other organic porogen to carbon embedded in the mesopores.

The present invention further relates to a process for forming a porous aluminosilicate composition which comprises:

(a) reacting a sodium silicate solution at basic pH with a sodium aluminate solution at an aluminum to silicon ratio between about 1000 to 1 and 1 to 1 and aging the mixture at 25 to 200° C. for periods of up to 48 hours to form zeolite seeds;

(b) mixing the resultant mixture with an organic porogen;

(c) reducing a pH of the mixture obtained from (b) with a protonic acid to obtain a mixture with an $OH^-/(Si+Al)$ ratio in the range of 0.10 to 10;

(d) aging the mixture from step (c) at a temperature between 20 and 200° C. to obtain a precipitate of the composition; and (e) separating the composition from mixture of step (d).

The present invention further relates to a process for forming a porous aluminosilicate composition which comprises:

(a) providing zeolite seeds or zeolite fragments in a form selected from the group consisting of an aqueous solution, gel, suspension, wet powder, or combination thereof;

(b) reacting the zeolite seeds in the aqueous medium with an organic porogen wherein the solution has an $OH^-/(Si+Al)$ ratio in the range of 0.10 to 10;

(c) aging the mixture from step (b) at a temperature between 20 and 200° C. to obtain a precipitate of the composition; and (d) separating the composition from the mixture of step (c).

The present invention further relates to a catalyst useful for a fluidized bed catalytic cracking (FCC) or hydrocracking of an organic molecule which comprises:

(a) a porous aluminosilicate composition which comprises a framework of linked tetrahedral $SiO_4$ and $AlO_4$ units, the framework defining mesopores having an Si to Al molar ratio of between about 1000 to 1 and 1 to 1, wherein a BET surface area is between 200 and 1400 $m^2$ per gram, wherein an average pore size of the framework is between about 1.0 and 100 nm, and wherein a pore volume of the framework is between about 0.1 and 3.5 $cm^3$ per gram, and which retains at least 50% of an initial framework pore volume after exposure to 20 volume % steam at 800° C. for two hours; and (b) a binder for the aluminosilicate composition.

The present invention further relates to a catalyst useful for fluidized bed catalytic cracking (FCC) or hydrocracking of an organic molecule which comprises:

(a) a porous aluminosilicate-carbon composition which comprises a framework of linked tetrahedral $SiO_4$ and $AlO_4$ units, the framework defining mesopores having an Si to Al molar ratio of between about 1000 to 1 and 1 to 1 and between 0.01 and 50 wt % carbon embedded in the mesopores, and having at least one X-ray diffraction peak corresponding to a basal spacing between about 2.0 and 100 nm, wherein a BET surface area is between 100 and 1400 $m^2$ per gram, wherein an average pore size of the framework is between about 1.0 and 100 nm, and wherein a pore volume of the framework is between about 0.1 and 3.5 $cm^3$ per gram, wherein the carbon content is between 0.01 and 50% by weight, and which retains at least 50% of an initial framework pore volume after exposure to 20 volume % steam at 800° C. for two hours; and (b) a binder for the aluminosilicate-carbon composition.

The present invention further relates to a process for catalytic reaction of an organic molecule into lower molecular weight components, which comprises:

(a) providing in a reactor a catalytic cracking catalyst which comprises: a porous aluminosilicate composition which comprises a framework of linked tetrahedral $SiO_4$ and $AlO_4$ units, the framework defining mesopores having an Si to Al molar ratio of between about 1000 to 1 and 1 to 1, wherein a BET surface area is between 200 and 1400 $m^2$ per gram, wherein an average pore size of the framework is between about 1.0 and 100 nm, and wherein a pore volume of the framework is between about 0.1 and 3.5 $cm^3$ per gram; and a binder for the aluminosilicate composition, and which retains at least 50% of an initial framework pore volume after exposure to 20 volume % steam at 800° C. for two hours; and (b) introducing the organic molecule onto the catalyst at temperatures and pressures which cause the reaction of the organic molecule.

The present invention further relates to a process for reaction of an organic molecule into lower molecular weight components, which comprises:

(a) providing in a reactor a catalytic cracking catalyst which comprises: a porous aluminosilicate-carbon composition which comprises: a framework of tetrahedral linked $SiO_4$ and $AlO_4$ units, the framework defining mesopores having an Si to Al molar ratio of between about 1000 to 1 and 1 to 1 and between 0.01 and 50 wt % carbon embedded in the mesopores, and having at least one X-ray diffraction peak corresponding to a basal spacing between about 2.0 and 100 nm, wherein a BET surface area is between 100 and 1400 $m^2$ per gram, wherein an average pore size of the framework is between about 1.0 and 100 nm, and wherein a pore volume of the framework is between about 0.1 and 3.5 $cm^3$ per gram; and a binder for the aluminosilicate-carbon composition, and which retains at least 50% of an initial framework pore volume after exposure to 20 volume % steam at 800° C. for two hours; and (b) introducing the organic molecule onto the catalyst at temperatures and pressures which cause the reaction of the organic molecule into lower molecular weight components.

The present invention further relates to a catalyst useful for a fluidized bed catalytic cracking (FCC) or hydrocracking of an organic molecule which comprises:

(a) a porous structured aluminosilicate composition which comprises:

a framework of linked tetrahedral $SiO_4$ and $AlO_4$ units, the framework defining pores and having an Si to Al molar ratio of between about 1000 to 1 and 1 to 1, and wherein the composition retains at least 50% of the initial framework pore volume after exposure to 20 volume % steam at 800° C. for two hours; and (b) a binder for the aluminosilicate composition. The structures have at least one X-ray diffraction peak corresponding to a basal spacing between about 2.0 nm and 100 nm. Again these structures can have no x-ray diffraction pattern if the pores are irregularly formed.

The present invention further relates to a process for reaction of an organic molecule into lower molecular weight components which comprises:

(a) providing a porous structured aluminosilicate composition which comprises:

a framework of linked tetrahedral $SiO_4$ and $AlO_4$ units, the framework defining pores and having an Si to Al molar ratio of between about 1000 to 1 and 1 to 1, and having at least one X-ray diffraction peak corresponding to a basal spacing between about 1 and 100 nm, and wherein the composition retains 50% of the initial framework pore volume upon exposure to 20 volume percent steam at 800° C. for two hours; and (b) introducing the organic molecule onto the catalyst at temperatures and pressures which cause the reaction of the organic molecule to produce the lower molecular weight components.

The present invention further relates to a catalyzed organic reaction process, the improvement which comprises:

conducting the reaction with a catalyst which is selected from the group consisting of a porous structured aluminosilicate, gallosilicate, titanosilicate and mixtures thereof which catalyst comprises: a framework of linked tetrahedral $SiO_4$ and $AlO_4$, $GaO_4$ or $TiO_4$ units, the framework defining pores and having an Si to combined Ga, Ti and Al molar ratio of between about 1000 to 1 and 1 to 1, and having at least one X-ray diffraction peak corresponding to a basal spacing between about 2 and 100 nm, and wherein the composition retains at least 50% of initial framework pore volume after exposure to 20 volume % steam at 600° C. for four hours.

The present invention further relates to a porous structured silicate composition which comprises:

a framework of linked tetrahedral $SiO_4$ and units selected from the group consisting of $AlO_4$ units, $GaO_4$ units, $TiO_4$ units and mixed units, the framework defining pores and having an Si to combined Ga, Ti and Al molar ratio of between about 1000 to 1 and 1 to 1, and having at least one X-ray diffraction peak corresponding to a basal spacing between about 1 and 100 nm, and wherein the composition retains at least 50% of the initial framework pore volume after exposure to 20 volume percent steam at 600° C. for four hours.

The present invention further relates to a process for forming a porous aluminosilicate composition which comprises:

(a) providing zeolite fragments prepared by disrupting the structure of a crystalline aluminosilicate zeolite in a form selected from the group consisting of an aqueous solution, gel, suspension, wetted powder, and mixtures thereof;

(b) mixing in a mixture the zeolite fragments in an aqueous medium with an organic porogen;

(c) aging the mixture of step (b) at a temperature between 25° and 200° C. to obtain a precipitate of the composition; and (d) separating the composition from the mixture of step (c).

The compositions of the present invention can be used for hydroprocessing of petroleum, especially hydrocracking processes wherein petroleum fractions, for example, distillates or resid fractions, are cracked to lower molecular weight fractions of useful hydrocarbons in the presence of hydrogen gas. The beds for the catalytic cracking can be fluidized. Usually the beds for hydrocracking are fixed.

Zeolites: are open framework aluminosilicate structures with long range atomic order. They exhibit x-ray diffraction patterns characteristic of the atomic order.

Protozeolitic Seeds are nanoclustered ions or molecules that nucleate the crystallization of zeolites. They do not exhibit x-ray diffraction patterns indicative of long range atomic order. However, they contain zeolitic subunits that constitute the building blocks of the zeolite that they nucleate. The nanoclusters are formed from silicate and aluminate anions in the presence of inorganic ions (e.g., sodium ions) or organic ions (e.g., onium ions) as structure directing agents.

Zeolite Fragments, as defined in the present art, are formed through the degradation of a crystalline zeolite, either by chemical means (e.g., by treatment of the zeolite with a basic reactant) or by physical means (e.g., through the input of energy such as ultra sound or mechanical energy in the form of grinding and milling). The long range atomic order of the initial zeolite is disrupted, as evidenced through the disappearance of some or all of the x-ray diffraction lines of the starting zeolite. However, the zeolitic subunits that formed the building blocks of the initial zeolite are still present in the zeolite fragments and these building blocks impart the desired steam stability to the aluminosilicate mesostructure that is formed when the fragments are assembled into the said open framework aluminosilicate mesostructure in the presence of a surfactant or porogen.

An organic porogen is an organic molecule which acts to form mesopores in the aluminosilicate composition. The porogen is an organic molecule which is typically an amphiphilic surfactant, but organic molecules that lack surfactant properties may also function as a porogen. A co-surfactant can be used to augment the surfactant. The removal of the porogen from the as-made composition allows the mesopores to be accessed by other guest molecules for adsorption and chemical catalysis.

BRIEF DESCRIPTION OF DRAWING

FIG. 2A provides the X-ray powder diffraction patterns for the solids formed by air drying the zeolite Y seeds (denoted 10% Al—Y-Seeds) and by precipitating the zeolite Y seeds through the addition of ethanol (denoted 10Al—Y-Seeds+EtOH).

FIG. 32 is a graph showing x-ray powder diffraction patterns for Example 31.

FIG. 34 is a graph showing the chemical shift characteristic of Y zeolites in Example 31.

FIG. 35 is a graph showing the x-ray powder diffraction patterns for the composition for Example 32.

FIG. 36 is a graph showing the nitrogen adsorption/desorption pattern for the composition of Example 32

FIG. 36A is a graph showing the pore size distribution of the composition.

FIG. 37 is a graph showing x-ray powder diffraction patterns for Example 33.

FIG. 38 is a graph showing the nitrogen adsorption/desorption pattern for Example 33.

FIG. 39 is a graph showing the x-ray powder diffraction patterns for the composition of Example 34.

FIG. 41 is a graph showing the x-ray powder diffraction patterns for the composition of Example 35.

FIG. 42 is a graph showing the adsorption/desorption pattern for the composition of Example 35

FIG. 42A shows the pore size distribution of the composition.

FIG. 43 is a graph showing the x-ray powder diffraction patterns of the composition of Example 36.

FIG. 44 is a graph showing the adsorption/desorption pattern for the composition of Example 36

FIG. 44A is a graph showing the pore size distribution of the composition.

FIG. 45 is a graph showing the pore size distribution of the composition of Example 37.

FIG. 46 is a graph showing nitrogen adsorption/desorption isotherms for the composition of Example 37.

DESCRIPTION OF PREFERRED EMBODIMENTS

Figure 1:
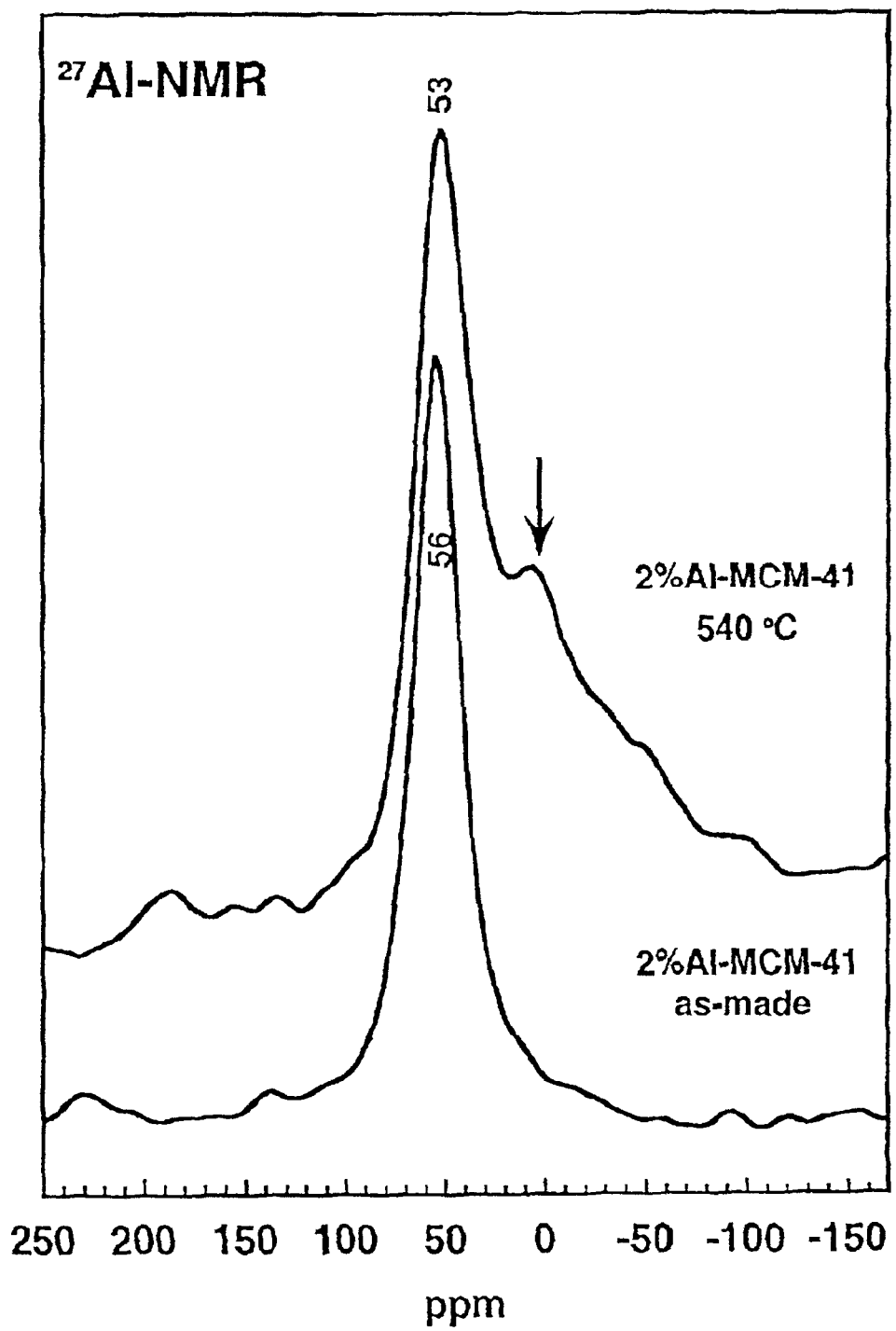
FIG. 1 provides the $^{27}$Al MAS NMR spectra for the as-made and calcined (540° C.) forms of a 2% Al-MCM-41 aluminosilicate mesostructure prepared from conventional aluminate and silicate precursors. The arrow points to the resonance near 0 ppm that is indicative of six-coordinated AlO$_6$ centers in the calcined mesostructure.

This invention provides structurally distinct families of large pore (supermicroporous), to very large pore (mesoporous), to exceedingly large pore (macroporous) aluminosilicates that are stable solid acid catalysts under the harsh steaming conditions encountered in the regeneration of the catalyst in processes such as the refining of petroleum. This result has been achieved without added reagent or processing costs in comparison to the costs for producing conventional aluminosilicate structures with framework pores in the same size range. The large framework pore sizes, which have average diameters in the range 1–100 nm for the purposes of this invention, make these new materials especially desirable as solid acid catalysts, especially cracking catalysts or hydrocracking catalysts for the refining of "heavy crudes" containing very high molecular weight fractions.

One approach for making ultrastable aluminosilicate mesostructures is to prepare first a reaction mixture of nanometer-sized, protozeolitic anionic aluminosilicate clusters that contain primarily four-coordinated aluminum and silicon as linked tetrahedral $AlO_4$ and $SiO_4$ units in the presence of a structure-directing agent which is an organic porogen that generates the desired nanoclusters. These protozeolitic nanoclustered aluminosilicate anions are then further linked into a porous framework structure through supramolecular assembly reaction in the presence of a structure-directing surfactant, most preferably a onium ion surfactant or a non-ionic surfactant. The onium ion surfactant can contain ammonium, phosphonium or arsonium ions in an organic molecule. The non-ionic surfactant can be a di-, tri-, or tetrablock co-polymer in which the hydrophilic segments are one or more polyethylene oxide chain $(PEO)_x$ and the hydrophobic segments are polypropylene oxide chains $(PPO)_y$, alkyl chains, polybutylene oxide chains, substituted aryl groups or mixtures thereof. Non-ion PEO surfactants marketed under the trade names PLURONIC (BASF), TETRONIC (BASF), TRITON, TERGITOL (Union Carbide), BRIJ, SORBATAN, etc. are useful non-ionic surfactants. Neutral amines also are useful structure-directing surfactants, particularly for the assembly of wormhole and lamellar framework structures (Kim et al., Science, 282 1302 (1998)). Co-surfactants are useful in expanding the size of the structure-directing surfactant micelles and, hence, the pore size of the framework. Bolaform surfactants, such as $HO(CH_2)_{16}N(CH_3)_3^+$ are effective in the assembly of supermicroporous frameworks (Bagshaw et al., Chem. Commun. 533–534 (2000)). The choice of surfactant and optional co-surfactant plays an important role in determining the open framework structure type of the steam-stable compositions of this invention. In general hexagonal, cubic, lamellar and disordered wormhole framework structures can be assembled from zeolite seed precursors. In addition, cellular foam structures are obtained from surfactant and co-surfactant emulsions in the presence of zeolite seeds. Still further non-surfactant organic molecules, such as triethanolamine, are capable of functioning as porogens for the formation of wormhole framework structures with mesopores (see Chem. Comm 8, 713 (2001)).

The appended examples illustrate the assembly of several open framework structure types. Each structure type exhibits a characteristic x-ray diffraction pattern. In all cases, except for the wormhole structures formed from triethanolamine, each structure type exhibits at least one reflection corresponding to a spacing of at least 2.0 nm. The structure type also is verified through high resolution transmission electron micrographs that image the framework walls and pores. The wormhole mesostructures formed from triethanolamine lack a well-expressed low angle XRD peak, but the wormhole framework is clearly evident from TEM micrographs.

The displacement of alkali metal ions, organic ions and surfactant from the as-made structures provide a porous framework with unique thermal and hydrothermal stability in comparison to previously disclosed aluminosilicate structures. Most preferred are the porous structures obtained by displacing the sodium ions, organic ions and some of the surfactant by treatment with a solution of ammonium ions ($NH_4^+$). The calcination of these $NH_4^+$-exchanged forms of the compositions at temperatures above about 500° C. removes residual surfactant and converts the ammonium ions to protons, thus affording a stable solid acid for catalyzing a variety of organic chemical conversions, especially alkylation reactions, isomerization reactions, cracking reactions, hydrocracking reactions, and hydrotreating reactions. The resulting acidic compositions can be easily incorporated as an active component of a conventional catalyst particle to improve catalytic conversions. If the concentration of alkali metal ions present in the assembly process is low, then few such ions are incorporated into the as-made products. In this case a steam-stable product can be obtained through the removal of the surfactant and optional co-surfactant by calcination. This avoids the need for an ion exchange reaction to remove the alkali metal ions prior to or following the removal of the surfactant.

In particular, an enhancement in the catalytic performance properties of FCC (fluidized bed catalytic cracking) and hydrocracking catalyst particles can be expected by incorporating into the particle matrix the steam-stable porous compositions of the present invention as a component capable of cracking a high fraction of the petroleum that comprises the resid or heavy end fraction of the petroleum. These steam-stable compositions can also be used as a component in a heterogeneous acid catalyst for various chemical syntheses, including acetal formation, aromatic alkylations, olefin dimerizations and oligomerization, esterifications of olefins and alcohols, alcohol esterifications, etherification of alcohols, hydration of olefins, isomerizations, transalkylations, transesterifications, hydrolysis reactions, among others. The steam stability is very important for these catalytic applications because it allows the spent catalyst to be cleansed of deactivating by-products through calcination in air, a process that generates substantial steam.

The protozeolitic nanoclustered aluminosilicate anions used to form the stable mesostructures of this invention are known in the art of zeolite chemistry as nucleating agents or, more generally, as "zeolite seeds". They are given this term because they can be crystallized into a specific atomically ordered zeolite upon aging them as a solution, gel, or wet solid at elevated temperatures. In addition, some zeolite seeds can promote the nucleation and crystallization of a specific zeolite when they are added in small amounts to reaction mixtures of silicate and aluminate ions that would not normally form the desired zeolite of interest under equivalent conditions in the absence of the added seeds. In general, zeolite seeds can have two physical forms, namely, they can be in the form of sub-micrometer crystalline particles of the same zeolite that they nucleate, or they can be amorphous nanoclusters in solution, gel or solvent-suspended form. The sub-micrometer forms are often referred to as "crystalline seeds", whereas the amorphous nanoclustered forms are often called "nucleating centers, gels, solutions, agents, etc." and sometimes "amorphous zeolites". For instance, Lechert et al. Stud. Surf. Sci. Catal., 84,147(1994) distinguishes between "crystalline" and "amorphous gel" forms of nucleating agents for type Y zeolites seeds. For the purpose of presenting the art of the present invention, however, we refer to both forms of these zeolite nucleating reagents as "zeolite seeds" or simply "seeds" whether they are sub-micrometer crystals or amorphous nanoclusters.

In general, the preferred zeolite seed compositions used to assemble the steam-stable porous structures of this invention have less than about 5% of the linked $SiO_4$ and $AlO_4$ tetrahedra in atomically crystalline form, as judged from the integral intensities of the Bragg X-ray reflections in comparison to a fully crystallized zeolite with the same Bragg reflections. The most preferred zeolite seeds used to form the steam-stable aluminosilicate compositions of this invention typically show no Bragg X-ray reflections either in aqueous suspension or in powdered form.

Also, the preferred steam-stable supermicroporous (1.0–2.0 nm), mesoporous (2.0–50 nm) and macroporous (50–100 nm) aluminosilicate framework structures of this invention, do not exhibit Bragg X-ray reflections characteristic of an atomically ordered zeolite with long range atomic order that persists over many crystallographic unit cells. However, the possibility that an atomically ordered zeolite phase can be admixed with the steam-stable porous aluminosilicate compositions of this invention is not excluded. The presence of a mesoporous aluminosilicate phase is typically indicated by at least one X-ray diffraction peak corresponding to a basal spacing or pore to pore correlation distance greater than about 2.0 nm, although the correlation length is usually greater than 3.0 nm. The open framework structure is verified by transmission electron microscopy images that reveal a pore network and by nitrogen adsorption isotherms characteristic of pores in the 1.0–100 nm range. The absence of long range atomic order in the walls defining the framework pores is verified by the absence of narrow X-ray diffraction peaks corresponding to atomic order that repeats or persists over many crystallographic unit cells. Short range atomic order corresponding to zeolitic subunits or building blocks is present in the framework walls and thus short range order can give rise to broadened XRD diffraction peaks that reflect this short range atomic order.

All of the open framework aluminosilicate structures of this invention retain at least 50% of their initial framework surface area and framework pore volume after exposure to 20 volume % steam at 800° C. for a period of 2 hr. No other previously disclosed open framework aluminosilicate compositions exhibit comparable hydrothermal stability. The main distinction between the art of this invention and all previously disclosed art for the assembly of open framework aluminosilicate compositions lies in the choice of silicate and aluminate precursors for the supramolecular assembly process. Whereas, the art of the present invention makes use of protozeolitic aluminosilicate nanoclusters or "zeolite seeds" and, as discussed below, "zeolite fragments", for the assembly of the framework walls, all previously disclosed art utilized conventional silicate and aluminate precursors.

Zeolite seeds are formed by aging mixtures of silicate anions and aluminate anions under conditions of basic pH and, normally, elevated temperatures in the presence of specific inorganic and organic cations. The cations are selected so that they act as "templates" or, more precisely, as structure directors in forming the seeds. For example, the use of inorganic sodium cations to form seeds of zeolite Y, more precisely the seeds of faujasitic zeolites, has been disclosed by Robson ACS Sym. Ser.,398,436 (1989), by Vaughan et al, U.S. Pat. No. 4,178,352 (1979), Lechert et al, Stud. Sur. Sci. Catal., 84, 147 (1994), and by U.S. Pat. Nos. 3,574,538 and 3,808,326 to McDaniel et al, U.S. Pat. No. 3,671,191 to Maher et al. and U.S. Pat. No. 3,789,107 to Elliott. The use of organic cations to form seeds of many different families of zeolites have been described by Lok et al. Zeolites, 3, 282 (1983); J. N. Watson et al. J. Chem. Soc., Faraday Trans. (94) 2181 (1998); P. P. E. A. de Moor, et al. Chem. Mater. (11) 36 (1999); P. P. E. A. de Moor, et al. J. Phys. Chem. B (103) 1639 (1999) and S. I. Zones et al., Microporous Mesoporous. Mater. 21, 199(1998).

The structures of amorphous nanoclustered seeds is unknown, but it is presumed that the nanoclusters contain linkages of $SiO_4$ and $AlO_4$ tetrahedra that resemble the secondary building blocks found in crystalline zeolites. These secondary building blocks may contain rings of a specific number of space filling oxygen atoms that bridge the tetrahedrally coordinated silicon and aluminum centers, such as single and double 4-rings, 5-rings, 6-rings, and the like, where the numbers refer to the oxygenation in the ring. Whatever the connectivity of the $SiO_4$ and $AlO_4$ units in nanoclustered aluminosilicate seeds may be, they are powerful structure-directing reagents in the nucleation of zeolite phases. The nanoclusters may be regarded as being "protozeolitic" by bearing a structure or tetrahedral building block connectivity that readily promotes zeolite crystallization. The art of the present invention discloses that these same protozeolitic seeds are preferred precursors for the supramolecular assembly of highly stable structured aluminosilicate molecular sieves, even though the framework walls remain largely disordered in comparison to the atomically well-ordered framework walls of conventional zeolites. However, as noted above we do not exclude from the disclosed art the use of crystalline sub-micron zeolite seeds as precursors to the assembly of stable structured aluminosilicate molecular sieves. Such small crystalline zeolite seeds can be transformed, at least in part, into stable framework wall-forming substructures under the conditions used to assemble an open framework structure.

The structural order, acidity and steam stability of aluminosilicate mesostructures all can be substantially improved through the assembly of nanoclustered precursors that normally nucleate the crystallization of microporous zeolites, particularly zeolites type Y and ZSM-5. These zeolite seeds are presumed to promote zeolite nucleation by adopting $AlO_4$ and $SiO_4$ tetrahedra connectivities that resemble the secondary structural elements in a crystalline zeolite. Assembling these same zeolite seeds into a mesostructure imparts acidity and hydrothermal stability that begin to approach zeolites, even though the framework walls remain in large part atomically disordered.

The assembly of hydrothermally stable aluminosilicate mesostructures from zeolite seeds according to the teachings of this invention is not limited to zeolite Y formed from inorganic cations or to zeolite Beta or ZSM-5 zeolite seeds formed from organic cations. Any zeolite seed composition can be used to form aluminosilicate mesostructures with a hydrothermal stability that is substantially improved in comparison to the same mesostructures prepared from conventional precursors. As we have noted above, the literature discloses numerous examples of organic molecules and ions that organize (or "template") silicate and aluminate anions into nanoclustered units that seed the nucleation of crystalline zeolites (see, for example, B. M. Lok, et al. Zeolites (3) 282 (1983); R. E. Boyett, et al., Zeolites (17) 508 (1996); S. I. Zones, et al. Microporous Mesoporous Mater. (21) 199 (1998)). All of these protozeolitic seed compositions formed from organic templating agents are preferred precursors for the surfactant-directed supramolecular assembly of aluminosilicate mesostructures with enhanced hydrothermal stabilities.

The assembly of zeolite seeds, particularly amorphous nanoclustered seeds, into a mesoporous framework causes the framework aluminum to remain in large part tetrahedral as $AlO_4$ units corner shared with silicate tetrahedra, even after calcination. Also, the siting of the aluminum is more like that found in a hydrothermally stable zeolite, as indicated in part by the aluminum nmr chemical shift or by certain absorption bands in the infrared spectrum. Up to 35 mol % aluminum can be easily incorporated into mesostructured aluminosilicate frameworks by utilizing zeolite Y seeds. Up to 13% Al was incorporated into alumino silicate mesostructures formed from ZSM-5 zeolite seeds or zeolite Beta seeds. In principle it is possible to incorporate zeolite seeds containing a 1:1 ratio of $SiO_4$ and $AlO_4$ tetrahedral units into a mesostructure. For instance zeolite Type A (abbreviated LTA) can have up to 50% of the framework tetrahedral sites occupied by aluminum in place of silicon. Importantly, for the porous aluminosilicate compositions of this invention typically more than 75% or even more than 90% of the aluminum sites remain tetrahedral after calcination at 540° C. $^{27}$Al-NMR chemical shift of mesostructures formed from zeolite Y seeds, as well as the shape and width of the resonance, was very similar to that of microporous zeolite Y. This result indicates that the local environment of the aluminum is analogous to that found in one of the most stable and most widely used zeolites in the petrochemical industry. Thus, these new ultrastable mesostructures are very useful for many applications where zeolite Y and other zeolites cannot be used because of a limited pore size below 1.0 nm. In addition, the mesostructures remain porous even after treatment in 20% steam at 800° C. for up to 5 hours, making them suitable for cracking or hydrocracking of high molecular weight petroleum fractions that cannot be processed by zeolite Y.

Aluminosilicate mesostructures with Si/Al ratios greater than about 6.7 have been assembled from aluminosilicate nanoclusters that normally nucleate the crystallization of zeolites type Beta and ZSM-5. The aluminum content can be made very low by increasing the Si/Al ratio to 1000 and beyond. At Si/Al ratios beyond 1000 the mesostructures are for all intents and purposes essentially silica rather than aluminosilicate mesostructures. Most silicate precursors used for the preparation of zeolite seeds contain aluminum as an impurity at the one part per thousand to one part per ten thousand level. The calcined mesostructures assembled from zeolite Beta and ZSM-5 seeds are stable to 20% steam at 800° C. for 4 hours. The intrinsic acidity of these mesostructures is sufficient to crack cumene over the temperature range 300–450° C., suggesting that nanoclustered zeolite seeds are promising precursors for the design of hydrothermally stable mesostructures for the acid-catalyzed processing of high molecular weight petroleum fractions that cannot be adequately refined over microporous zeolites.

Several structurally relevant properties embody the stable mesostructured aluminosilicate compositions of this invention and distinguish them from previously disclosed mesostructures. In one general structural embodiment of the invention, the preferred compositions prepared from zeolite seeds templated by inorganic cations (e.g., sodium) have an experimentally observed $^{27}$Al MAS NMR chemical shift in the range 57–65 ppm relative to an aqueous 1.0 M aluminum nitrate as an external chemical shift reference. This is the chemical shift range that is found for many crystalline zeolite, including zeolite Y and other faujasitic zeolites. All previously reported mesostructured aluminosilicates prepared from conventional silicate and aluminate precursors, including the original Al-MCM-41 compositions of Beck et al., exhibit a chemical shift of 53–56 ppm. Chemical shift values in the range of 57–65 ppm are indicative of a zeolite-like connectivity of the $SiO_4$ and the $AlO_4$ units that comprise the framework walls of the mesostructures, even though the framework walls are largely disordered. We postulate that the zeolitic connectivity of the said tetrahedral units mimic the structural subunits of a zeolite and thereby contributes substantially to the improvement in the hydrothermal stability of these preferred mesostructured compositions.

As another structural distinction, the $^{27}$Al MAS NMR chemical shifts of several of the preferred compositions fall in the range of previously disclosed mesostructured aluminosilicate compositions, for example, 53–56 ppm, but are distinguished by the presence of an infrared adsorption band in the frequency range 500–600 $cm^{-1}$ in the case of pentasil zeolite seeds wherein rings containing five oxygen atoms are present. The most universal structural distinction, however, is provided by the retention of at least 80% of the initial framework mesopore volume is retained when the composition is exposed to boiling water for 5 hours or to 20% steam at 600° C. for 5 hours. The infrared band at 500–600 $cm^{-1}$ is indicative of the presence of pentasil zeolite in the amorphous framework walls. These compositions also are stable to 20% steam at 800° C. for 2 hr, retaining more than 50% of the framework surface area and pore volume observed prior to exposure to steam under these conditions. Pentasil zeolite seeds, particularly those of zeolites ZSM-5, ZSM-11, and Beta are especially effective in providing the steam-stable compositions characterized by the said second structural embodiment.

Yet another structural distinction, the preferred aluminosilicate compositions of this invention are free of sodium exchange cations, exhibit a zeolite-like $^{27}$Al MAS NMR chemical shift in the range 57 to 65 ppm, and contain between 0.01 and 10 wt % carbon embedded in the framework mesopores. The sodium ions in the as-made mesostructures are displaced by ion exchange reaction with an ammonium salt, most preferably ammonium nitrate, in aqueous solution in the presence of the structure directing surfactant in the framework mesopores This exchange reaction also displaces a substantial amount of surfactant from the mesopores. Subsequent to the ion exchange reaction with ammonium ions, the mesostructure is calcined in air at a temperature sufficient to remove the remaining surfactant and to convert the ammonium exchange ions to protons, most preferably at a temperature of 540° C. for a period of about 5 hours. This calcination procedure converts some of the remaining framework surfactant to carbon, presumably through cracking reactions of the surfactant in the acidic mesopores of the framework. The embedded carbon, which can amount to 0.01 to 10 wt % of the calcined mesostructure depending on the calcination conditions used to degrade the intercalated porogen, can play an important role in the hydrothermal stability of the mesostructures, presumably by reinforcing the framework against collapse under hydrothermal conditions. Even more carbon (e.g. up to 50 wt % or more) can be loaded into the framework pores by first intercalating a carbon precursor into the pores such as sucrose, furfuryl alcohol, a formaldehyde-phenolic resin or divinyl benzene, and then pyrolyzing the precursor in the pores (see J. Am. Chem. Soc. 122, 10712; J. Phys. Chem. B, 103, 7743 (1999); Chem. Comm. 559, (2001); J. Am. Chem. Soc., 123 5146 (2001)). In comparison to conventional aluminosilicate mesostructures, the exceptional acidity of the aluminosilicate framework containing zeolitic nanoclusters promotes efficient carbon formation that more accurately replicates the structure of the aluminosilicate mold. Furthermore, the resulting carbon replica can be recovered in pure form by dissolving away the aluminosilicate mold. The resulting carbon replicas are useful as adsorbents, double layer capacitors, and as supports for dispersed metal particles for use in chemical catalysis (see Chem. Comm. 2177 (1999); Nature 412, 169 (2001)).

Yet another important feature of the art disclosed in this invention is the formation of steam-stable open framework structures from mixtures of zeolite seeds and conventional silicate precursors. As taught in appended Examples, zeolite seeds are effective in converting conventional silicate precursors into protozeolitic nanoclusters suitable for the supramolecular assembly of steam-stable open framework structures. This feature of the art is very useful in forming especially stable framework structures with high Si/Al ratios from zeolite seeds that are best prepared at low Si/Al ratios. Zeolite type Y seeds, for example, are best prepared at a Si/Al ratio below 10 in the presence of Na$^+$ ions as the template. By diluting the zeolite Y seeds with conventional sodium silicate precursors, one can assemble steam-stable open framework structures with substantially higher Si/Al ratios (e.g., Si/Al=50).

All of the structured aluminosilicate compositions of this invention share the common property of retaining at least 50% of their initial framework surface area and framework pore volume when exposed to 20% steam at 800° C. for 2 hours. In general, however, the calcined mesoporous aluminosilicate compositions of the present invention with hexagonal, cubic, lamellar and wormhole framework structure and pore sizes in the range 2.0–500 nm are more stable to exposure to steam than the compositionally equivalent calcined compositions with supermicroporous framework structures (1.0–2.0 nm) or with cellular foam structures and framework pores of 10–100 nm. The said mesostructures are stable to 20% steam at 800° C. for 4 hr or even longer exposure times. Although the said supermicroporous and cellular foam aluminosilicates retain at least 50% of their initial surface area and framework pore volume in 20% steam at 800° after an exposure time of 2 h, they will rapidly degrade upon longer exposure times to steam under these conditions. Nevertheless, the supermicroporous structures and cellular foam structures of this invention have much longer useful lifetimes when exposed to 20 volume % steam at 650° C. or, even better, when exposed to 20% steam at 500° C. Under these latter steaming conditions they retain more than 50% of their framework pore volume and framework surface areas after exposure times longer than 4 hours. No other supermicroporous or cellular foam aluminosilicate composition formed through a supramolecular assembly pathway is known to survive exposure to 20% steam at 650° C. for equivalent periods of time.

Protozeolitic seeds of pentasil zeolites are especially valuable for forming steam-stable aluminosilicate structures. At least three zeolite structure types, namely, ZSM-5, ZSM-11, and Beta and generally described as MFI, MEL, and BEA structure types, respectively, are members of the pentasil family of zeolites. These structure types are templated by tetrapropyl, tetrabutyl, and tetraethyl ammonium ions, respectively. Moreover, the aluminum centers in these zeolites can easily be substituted by gallium and titanium, producing analogous MFI, MEL and BEA gallosilicate and titanosilicates with Si/Ga and Si/Ti ratios in the range 1000 to about 10 and, more preferably, about 100 to about 20. Therefore, the art of the present invention may also be used to assemble hydrothermally stable hexagonal, cubic, lamellar, wormhole and cellular foam framework structures of gallosilicates with Si/Ga and Si/Ti ratios in the range 1000 to about 10. For instance, the nanoclustered seeds of a MFI or BEA gallosilicate are readily prepared according to Examples 3, 20, and 21 simply by replacing sodium aluminate with sodium gallate, gallium chloride or gallium nitrate. It is also possible to prepare MFI or BEA gallosilicate or titanosilicate seeds simply by replacing the aluminum alkoxide in Example 27 with a gallium alkoxide or a titanium alkoxide and adjusting the digestion time to 3–10 hr. The resulting seeds can then be assembled into the desired steam stable wormhole, hexagonal, cubic, lamellar or cellular foam framework structures according to Examples 12, 18, 20, 21, 27, among others, with pore sizes in the range 1–100 nm and Si/Ti and Si/Ga ratios in the range 1000 to about 10.

In view of the importance of the $^{27}$Al MAS NMR chemical shift measurements in characterizing the preferred compositions embodied in this invention, we briefly describe the measurement of this diagnostic parameter. In magic angle spinning (MAS) nuclear magnetic resonance (NMR) spectroscopy experiment, the energy levels of the magnetic nucleus are split by the imposed magnetic field. Transitions between these energy levels are made to occur through the absorption of electromagnetic radiation in the radio frequency range, typically the megahertz range. The absorption of the electromagnetic radiation gives rise to a "resonance" line at a frequency that is energetically equivalent to the energy separation between the magnetic energy levels for the nucleus under investigation. The sample is spun at an angle to the imposed magnetic field (the so-called magnetic angle) to average-out dipolar interactions that can broaden the resonance lines and complicate the spectrum. Because the electrons surrounding the nucleus contribute to the magnetic field experienced by the nucleus, the resonance frequency is dependent on the chemical environment. Thus, the resonance frequency "shifts", depending on the chemical environment. These "chemical shifts" in the resonance frequency are recorded in "parts per million" (ppm) frequency units relative to the frequency of a reference compound with a known chemical environment and an arbitrarily assigned chemical shift of 0 ppm. The magnitude of the chemical shift is often used to deduce information on the chemical environment of the nucleus in the chemical compound being studied by MAS NMR.

In the case of quadrupolar $^{27}$Al nuclei, the splitting of the nuclear energy levels is determined by the nuclear magnetic spin quantum number I=5/2. The observed MAS NMR spectrum is typically dominated by the (+½, −½) central transition. The experimentally observed chemical shift for the resonance line corresponding to this transition can be influenced by quadrupolar interactions of the nucleus with the electric field gradient at the nucleus. Generally speaking, the observed $^{27}$Al MAS NMR chemical shifts should be corrected for quadrupolar interactions to obtain the true values of the chemical shifts. However, if the electric field gradient at the nucleus is small, then the error in the observed resonance position for the (+½, −½) transition also is small (about 1 ppm or so in error) and no correction in the observed chemical shift is needed, especially if the differences in the chemical shifts being compared are much larger than the error caused by quadrupolar effects. This is typically the case for the AlO$_4$ tetrahedra in most zeolites and related aluminosilicates (see Lippmaa et al., J. Amer. Chem. Soc. 108 1730 (1986)), as well as for the Al(H$_2$O)$_6^{3+}$ cations that are used as the chemical shift reference in $^{27}$Al NMR spectroscopy. For this reason, the chemical shifts reported here and in the literature for aluminosilicate mesostructures are not corrected for quadrupolar effects.

In the present invention steam stable aluminosilicate mesostructures are produced using inorganic or organic zeolite seeds and precursors along with a quaternary ammonium compound. The zeolite seeds are allowed to digest (age), typically at a temperature between about 25° and 100° C. For the formation inorganic zeolite seeds (i.e., seeds formed from inorganic structure directors) the mole ratio of Si to Al is less than or equal to 10 (but greater than 1.0) in order to form the mesostructures. For the organic zeolite seeds (i.e. seeds formed from organic templates) the ratio of Si to Al is greater than or equal to 10, more preferably greater or equal to 20. The result is that using the inorganic zeolite seeds formed from inorganic structure directors (i.e., alkali metal ions) is a structure with a chemical shift of between about 57 to 65 ppm. For the pentasil zeolite seeds made from organic templates (i.e., organic onium ions) the chemical shift is between about 53 and 56 ppm, but unlike the seed made from inorganic templates, they also exhibit a distinct infrared absorption band in the region 500–600 cm$^{-1}$.

It is very important that the digestion occurs for a sufficient period of time (1 to 48 hours). A Bragg XRD is not obtained as with the fully formed zeolite so that the zeolite seeds are well formed at basic pH (pH 10 to 14).

If the pore forming surfactant and optional co-surfactant is added too soon to the seeds solution, the result is an ordinary aluminosilicate structure with limited or no steam stability. If the zeolite seeds are allowed to form (nucleate) completely then an ordinary zeolite is formed which is microporous. The porous structures of the present invention are between about 1 and 100 nm in pore diameter and can either have a hexagonal, cubic, lamellar, wormhole, or cellular foam framework structure. In any event the structures are steam stable.

The steam stabilities of our aluminosilicate structures have been compared by virtually all of the general synthetic methods reported in the literature. None is as stable to steam as those in the present application. Although the steam stability of crystalline zeolites generally decreases with increasing aluminum content, this may not be true for amorphous aluminosilicate mesostructures that contain terminal SiOH groups. Aluminum may actually improve the framework crosslinking in such mesostructures. For instance, a pure silica MCM-41 prepared in the absence of sodium is not as hydrothermally stable as its Al-grafted analog, and the hydrothermal stability increases with increasing Al content. The hydrothermal stability of this sodium-free, Al-grafted MCM-41 was checked and found it to be greatly inferior to MSU-S compositions in hydrothermal stability. The Al content of the MFI and BEA seeds can be doubled to 3.0% without a discernable change in steam stability of the final mesostructures.

Thus the preceding description particularly describes steam-stable aluminosilicate mesostructures that were assembled from zeolite seeds. Zeolite seeds are nanoclusters of aluminosilicate anions that nucleate the crystallization of specific zeolite phases. It was demonstrated that by capturing the protozeolitic nanoclusters prior to their formation of a zeolite phase, one could use the nanoclusters to form mesoporous aluminosilicate mesostructures with exceptional hydrothermal stabilities (denoted MSU-S) in comparison to compositionally equivalent mesostructures assembled from conventional silicate and aluminate precursors. The improved hydrothermal stability of MSU-S aluminosilicates was attributable to the presence of zeolitic sub-units in the walls of mesostructures. Although the walls of the steam-stable mesostructures remained atomically disordered (amorphous), the NMR and IR spectroscopic studies show that a substantial fraction of the $SiO_4$ and $AlO_4$ tetrahedra comprising the walls of the steam-stable mesostructures are linked together (i.e., co-polymerized) in a way that included the subunits of a zeolite structure.

Further the aluminosilicate compositions can comprise a composite of a steam-stable, mesoporous MSU-S mesostructure phase (pore size 2.0–100 nm) and an atomically ordered (crystalline) and microporous 0.4–2.0 nm zeolite phase. Zeolite phases may be described as being "microstructured" or "microporous" phases, because they are atomically ordered open framework structures that provide pore sizes in the range from about 0.4 to 2.0 nm. These composite materials were formed in at least two different ways. One approach was to utilize the same protozeolitic seeds solutions and gels that are useful for the formation of MSU-S mesostructures, except that the seeds were allowed to mature to the point where a zeolite phase is formed in part and then the remaining seeds are transformed into a MSU-S mesostructure to form the said composite. Another approach was to transform a zeolite seeds solution or gel directly into a composite mixture of a mesostructure MSU-S phase and a crystalline zeolite phase. This later approach was achieved by arresting the crystallization of the zeolite seeds solution or gel through the addition of a mesostructuring surfactant and the careful control of the pH of the seeds solution or gel.

The ratio of mesostructured MSU-S to zeolite phases in the composite compositions can range from about 99:1 to 1:99. The composite phases are preferably those in which the fraction of the zeolite phase typically represent less than 50% of the total composite by weight. Zeolite crystals tend to be small, often nanosized, at the beginning of the zeolite crystallization process. The dispersion of nanosized zeolite crystals in a matrix of MSU-S mesostructure is highly desirable for the use of the composites as heterogeneous catalysts and catalyst supports. By minimizing the size of the zeolite phase in the composite, the zeolite becomes highly dispersed in the MSU-S mesostructure matrix and, therefore, more accessible for catalytic reaction.

Especially preferred zeolite phases are those that are used as heterogeneous catalytic and adsorptive commercial processes. Zeolite phases that are used for the processing of petroleum and petrochemicals, particularly the faujasitic zeolitic type X and type Y as well as the pentasil zeolite phases (i.e., those containing rings made of five Si—O linkages). Zeolites ZSM-5, Beta, and ZSM-11, are especially preferred pentasil zeolites. Also, the faujasitic phases, as represented by zeolites X and Y, are useful for petroleum refining, the trapping of contaminates from waste streams, and as agents for the separation of molecules, such as the separation of oxygen and nitrogen molecules of air when the faujasite zeolite is in Li+ exchange from. The mesophorous MSU-S aluminosilicate mesophase may have hexagonal, cubic, lamellar, or wormhole framework structures. The cation exchange sites of both phases may be occupied by any desired organic, inorganic or complex cation to achieve a particular catalytic or adsorption result. Also, other elements may be substituted for either silicon (e.g., titanium or germanium) or for aluminum (e.g., gallium) in either the mesostructured MSU-S or microstructured zeolite phase of the composite composition to favorably alter the catalytic activity or adsorption selectivity of the composite. Still further, the said composite compositions can be blended with other matrix materials such as kaolin clay, metakaolin clay, alumina and numerous other matrix phases to form complex, multi-component mixtures for multi-functional catalysis and selective adsorption processes.

Naturally occurring clay kaolin is another highly preferred crystalline aluminosilicate precursor that can be reconstituted into a zeolite seeds solution or gel and used to prepare a mesostructured MSU-S/microstructured zeolite composite or a pure MSU-S mesostructure. In this aspect of the present invention, the kaolin is calcined at a temperature above about 650° C. to form metakaolin and the metakaolin can be transformed into a zeolite seeds solution or gel for the preparation of the desired MSU-S mesostructure or a mesostructured MSU-S/microstructured zeolite composite composition.

A further aspect of the present invention is steam stable MSU-S mesostructures, whether formed as part of a mesostructured MSU-S/microstructured zeolite composite or as a pure MSU-S mesostructure, which can be formed from crystalline zeolites or zeolite precursors. Thus, in this embodiment a crystalline zeolitic aluminosilicate, is transformed into a solution or gel of zeolite fragments. The zeolitic aggregates were then transformed into a steam stable MSU-S mesostructure or a composite MSU-S/zeolite composition. Especially preferred crystalline aluminosilicates for the preparation of a zeolite seeds solution or gel are the synthetic and naturally occurring zeolites themselves. Many naturally occurring zeolites or low cost synthetic zeolites can be transformed into a zeolite fragment solution or gel through digestion in a basic aqueous solution (pH>10) or through a combination of thermal treatment and hydrolysis in basic aqueous solution. For instance, the faujasitic zeolites type X and type Y were transformed into a zeolite fragment solution by digestion in sodium hydroxide solution. The said fragment solution then was subsequently converted into an MSU-S mesostructure or a mesostructured MSU-S/microstructured zeolite composite by adjusting the pH and adding a structure directing surfactant.

A "zeolitic fragment" differs from a "zeolite seed". The former reagent is generated through the breakdown of the long-range atomic order of a crystalline zeolite, whereas the latter is an aluminosilicate nanocluster formed from silicate and aluminate ions in the presence of a nucleating agent. A zeolite fragment, like a protozeolitic zeolite seed, contains zeolitic subunits or nanoclusters. Therefore, another approach to obtaining zeolitic subunits from zeolite precursors, other than the chemical approach described above, is to break down the zeolite structure through the input of physical energy. The physical energy needs to be sufficient in magnitude and duration to disrupt the long range atomic order of the crystallized zeolite, but not so severe as to destroy all the subunit building blocks of the initial zeolite crystal. At the same time, the zeolite fragments cannot be so large as to prevent their assembly into a mesostructure. The mechanical energy needed to break down the initial crystalline zeolite can be conveniently delivered in the form of ultrasound or through milling and grinding. In addition, one can combine both physical energy and chemical transformation simultaneously or in sequence to break down the long range atomic structure of a zeolite to achieve zeolitic fragments suitable for assembly into a steam stable aluminosilicate mesostructure. The re-assembly of the zeolite fragments into a mesostructure is achieved through reaction with a structure-directing agent, typically a surfactant in micellar or liquid crystal form. The surfactant not only plays the role of a mesostructure director, but also a pore-former or porogen. Removal of the surfactant or porogen by solvent extraction or by mechanical means affords the desired open framework aluminosilicate mesostructure that is stable to steam.

The following Example 38 illustrates the use of mechanical energy, more precisely ultrasound energy, to break down the long range atomic energy of a zeolite precursor into zeolitic fragments suitable for the assembly into a steam stable aluminosilicate mesostructure. For instance, the zeolite MCM-22 contains crosslinked lamellar units as part of its crystal structure. This zeolite is formed from a lamellar aluminosilicate precursor, denoted MCM-22(P) When the layers are condensed in the direction orthogonal to the layers, the MCM-22 zeolite is formed. The lamellae can have a lateral dimension as large as the crystal itself (i.e., submicrons to microns in lateral width. The lamellae of MCM-22(P) can be segregated by intercalation of a surfactant to give a pillared form, as demonstrated by the art of Mobil researchers. (S. L. Lawton, A. S. Fung, G. J. Kennedy, L. B. Alemany, C. D. Chang, G. H. Hatzikos, D. N. Lissy, M. K. Rubin, H. J. C. Timken, S. Stenernagel, D. E. Woessner, *J. Phys. Chem.* 100 3788 (1996)). In this case the surfactant acts as a swelling or pillaring agent for the lamellar structure. The pillared derivatives of MCM-22(P) exhibit novel adsorption and catalytic properties in its own right. But the properties derived from a pillared MCM-22 (P) can be enhanced further by separating the layers of the pillared structure into unstacked or exfoliated forms, known as ITQ-2, as demonstrated by Corma and his co-workers (*Nature* 396 353 (1998)). The delamination process results in the de-stacking or exfoliation of the pillared MCM-22(P) layers and this provides more facile access to the layers for improved catalysis and adsorption. In the delaminated state of MCM-22(P), denoted ITQ-2 by Corma, the layered units retain their in-plane atomic structure. Consequently, the delaminated layers still show XRD peaks indicative of the in-plane portion of the MCM-22 zeolite structure, but the XRD reflections characteristic of layer-stacking are absent in the ITQ-2 derivative.

As shown by the art of the present invention, the delaminated layers of ITQ-2 can be broken down further into zeolitic fragments by the application of sufficient ultrasound energy that goes beyond simple layer delamination. The energy provided by ultrasound, if sufficiently intense and long in duration, will actually cause fracture of the layers into atomically disordered nanoparticles. The art of the present invention shows that the disordered nanoparticles or zeolite fragments obtained through mechanical degradation are suitable for assembly into a steam-stable mesostructure. The resulting fragments contain zeolitic subunits, but the long-range in-plane atomic structure of the layers is largely lost, as evidenced by a loss of characteristic in-plane XRD peaks. The resulting fragments can then be assembled by reaction with a structure-directing surfactant into a steam-stable mesostructure. The delaminated ITQ-2 layers produced in Corma's art, however, cannot be re-assembled into a mesostructure that exhibits a small angle diffraction peak.

The concept of using physical energy, as opposed to chemical means, to break down the structure of a zeolite can be applied to any crystalline zeolite or zeolite precursor structure to form an aluminosilicate mesostructure with improved acidity and hydrothermal stability.

Yet another objective of this invention, as shown in Example 39, is to demonstrate that steam-stable mesostructures with wormhole-like aluminosilicate frameworks can be formed from zeolitic subunits using small molecules as the pore-forming porogen in place of a surfactant. The group of Mashmeyer (J. C. Jansen, Z. Shan, L. Marchese, W. Zhou, von der Puil, N. T. Mashmeyer, *Chem. Comm.* 8 713 (2001)) first disclosed the concept of using small molecules, as such as triethanol amine, as a pore-forming porogen for the formation of silicate mesostructures known as TUD-1. The resulting mesostructured wormhole frameworks typically are not sufficiently ordered to exhibit a small angle x-ray diffraction peak characteristic of most wormhole mesostructures, but the presence of a wormhole framework structure nevertheless can be imagined by TEM. The pore sizes, surface areas and pore volumes are comparable to those of wormhole mesostructures that do exhibit a small angle diffraction peak.

In the present invention it is demonstrated that steam-stable analogs of TUD-1 wormhole mesostructures can be prepared through the assembly of protozeolitic seeds in the presence of triethanol amine as a porogen. These assembled mesostructures are as stable to steam as the analogous wormhole mesostructures assembled in the presence of a surfactant. A major difference between the wormhole framework structures formed through surfactant templating and triethanol amine templating is that the former structure exhibit a well expressed low angle X-ray reflection indicative of a well ordered mesostructure, whereas the wormhole framework formed in the presence of triethanol amine is less well ordered and exhibits little or no X-ray diffraction at low angles. The wormhole framework structures, however, are clearly revealed through TEM imaging.

It is worth emphasizing the formal definition of the prefix "meso" relates to a length scale between 2.0 and 50 nm. Thus, a "mesostructure" is formally a structure that repeats on a length scale between 2.0 and 50 nm. Also, a "mesoporous" material has an average pore size between 2.0 and 50 nm. For the purpose of the present invention, however, we expand the meaning of "meso" to include a length scale between about 1.0 nm and 100 nm. Thus, a composition with an average pore size of 1.5 nm is included in the description of a mesoporous composition, even though the composition would be regarded as a "supermicroporous" or simply a microporous material by IUPAC definitions. Similarly, a composition with an average pore size of 80 nm could be considered to fall within the INPAC definition of "macroporous". The material is regarded as being "mesoporous" for the purpose of defining the porous composition of the present invention.

With regard to the distinction between "zeolite seeds" and "zeolite fragments", it is commented further as follows. As noted earlier, zeolite seeds are anionic aluminosilicate nanoclusters constructed from simple silicate and aluminate ions in the presence of an organic or inorganic structure directing cation. The distinguishing feature of the aluminosilicate nanoclusters is their ability to nucleate the crystallization of a zeolite with long range atomic order. The "zeolite seeds" are thus "protozeolitic nanoclusters" containing subunits that resemble the structural building blocks of the crystalline zeolites that they nucleate. However, zeolite seeds lack the long range atomic order that is characteristic of a crystalline zeolite. That is, the atoms comprising a zeolite seeds are not constrained to occupying specific lattice points in three-dimensional space over many crystallographic unit cells. Nevertheless, the relationship between the structural subunits in a zeolite seed and in a crystalline zeolite can often be verified by spectroscopic techniques such as infrared spectroscopy and NMR spectroscopy.

In contrast to zeolite seeds, "zeolite fragment" are formed through the breakdown of the long-range atomic order of a crystalline zeolite or zeolite precursor, such as zeolite Y or the precursor of zeolite MCM-22, respectively. The breakdown in long-range atomic order, which can be accomplished by chemical or physical means, does not have to be complete. That is, the x-ray or electron diffraction pattern may exhibit some of the same reflections that are found in the starting zeolite or zeolite precursor, but several other reflections characteristic of the starting zeolite or zeolite precursor will be missing from the x-ray or electron diffraction pattern of the zeolite fragment. Thus, a zeolite fragment, like a zeolite seed, lacks long range atomic order and contains subunits characteristic of the building blocks of a crystalline zeolite. However, a zeolite fragment is less disordered than a zeolite seed and is capable of exhibiting some, but not all, of the x-ray or electron diffraction lines characteristic of the starting zeolite or zeolite precursor. The lack of long range atomic order in zeolite seeds and zeolite fragments makes it possible to assemble these atomically disordered aggregates into mesostructured aluminosilicates with framework pore sizes in the range 1.0–100 nm. The presence of zeolitic subunits in the mesostructures imparts valuable hydrothermal and steam stability.

Regarding the assembly of zeolite seeds into a steam-stable aluminosilicate mesostructure, it is pointed out that the pH value used to form the zeolite seeds is especially important. Normally, zeolite seeds are formed at pH values that are higher than the pH values needed to form an aluminosilicate mesostructure through supramolecular assembly processes. Therefore, it is generally necessary to first form the zeolite seeds in the presence of the zeolite structure director at a high pH value (typically, above pH 11–12) and then lower the pH through the addition of acid to a value suitable for mesostructure formation (typically below pH about 11–12). This is why all previously reported preparations of aluminosilicate mesostructures have afforded materials with comparatively poor steam stability even though a zeolite structure directing agent (e.g., sodium ion or an alkyl ammonium) ion may have been present in the reaction used to form the mesostructure. Mixing a zeolite structure forming agent with a mesostructure forming agent under the pH conditions needed to form the mesostructure will not impart the desired steam stability to the mesostructure because the pH is too low to form zeolite seeds.

COMPARATIVE EXAMPLE 1

In order to have a contrast example for our newly invented aluminosilicate mesoporous molecular sieves, we prepared a conventional (well-ordered) hexagonal MCM-41 aluminosilicate molecular sieve in which the overall Si/Al molar ratio was 49/1. This Example 1 sample is denoted 2% Al-MCM-41. The synthesis recipe was as follows: a solution containing the appropriate amounts of sodium aluminate ($NaAlO_2$) and sodium silicate solution was mixed, and then the required amount of $H_2SO_4$ acid was added under stirring to obtain a clear solution. Next, the required amount of cetyltrimethyl ammonium bromide (CTAB) in water was added and the mixture was stirred vigorous at ambient temperature for 30 minutes. The resultant mixture was aged without stirring in a Teflon lined autoclave at 100° C. for 2 days. The product was recovered by filtration and thoroughly washing with deionized water. The molar composition for this particular synthesis was:

0.02 mole $NaAlO_2$
1.0 mole sodium silicate solution (27 wt %)
0.25 mole CTAB
0.28 mole $H_2SO_4$
130 mole $H_2O$ The initial solution compositions were as follows:

$6.56 \times 10^{-4}$ mole sodium aluminate in 0.28 mole water
$3.28 \times 10^{-2}$ mole sodium silicate (27 wt % silica)
$8.20 \times 10^{-3}$ mole surfactant in 3.9 mole water
$9.18 \times 10^{-3}$ mole sulfuric acid in 0.08 mole water The sample after calcination at 650° C. exhibited a BET surface area of 1037 $m^2$/g, a total pore volume of 0.77 cc/g and an effective pore size of 33 Å as determined from the Horvath-Kawazoe model. The X-ray diffraction pattern exhibited three diffraction lines with d-spacings at 43.2, 24.9, and 21.6 Å and corresponding to the (100), (110) and (200) reflections, respectively, of a hexagonal mesostructure. The $^{27}$Al-NMR spectrum for this particular sample is shown in FIG. 1. In agreement with the findings reported by Corma and his coworkers, the MCM-41 aluminosilicate mesostructure prepared by this procedure has about ⅓ of the Al-sites in octahedral coordination and the remainder in tetrahedral coordination after calcination. The tetrahedral Al-sites exhibited a chemical shift at 53 ppm relative to 1.0 M aluminum nitrate solution, whereas the chemical shift for the aluminum in octahedral sites was 0 to 10 ppm. These chemical shifts are in agreement with the typical literature values (i.e. 53~56 ppm for tetrahedral aluminum and ~0.0 ppm for octahedral aluminum for a conventional Al-MCM-41.

EXAMPLES 2 TO 3

These two Examples illustrate according to the teachings of the present invention the preparation of protozeolitic aluminosilicate precursors (zeolite seeds) that are useful for the supramolecular assembly of hexagonal, cubic, lamellar, wormhole, and cellular foam framework structures that are steam-stable in comparison to like structured compositions obtained from conventional aluminosilicate precursors. The preferred aluminosilicate precursors of this invention contain nanosized aluminosilicate clusters in which the aluminum is in tetrahedral coordination and linked through bridging oxygen atoms to silicon tetrahedra that in are largely connected to other tetrahedra. These nanosized aluminosilicate precursors are capable of promoting the crystallization of atomically ordered zeolite phases when mixed with suitable gels and aged under hydrothermal conditions. Owing to their ability to nucleate zeolitic phases, such as zeolites type Y (more precisely faujasitic zeolites) and ZSM-5 (more precisely MFI zeolites), these highly cross-linked precursors are often referred to as "zeolite seeds". Therefore, the aluminosilicate precursor of Example 2 is referred to here as a "zeolite type Y seeds" composition, because it is known to promote the crystallization of Type Y zeolite. Likewise, the cross-linked aluminosilicate precursor of Example 3 is referred to here as "ZSM-5 seeds", because the precursor is known to nucleate the crystallization of ZSM-5 zeolite. However, these zeolite seeds can be used as precursors to mesoporous molecular sieve aluminosilicates with atomically disordered (amorphous) walls, but with a hexagonal, cubic, wormhole, lamellar and cellular framework structures that are sufficiently order on a mesoscopic length scale to exhibit correlation peaks in the powder X-ray diffraction pattern and transmission electron microscopy (TEM) images indicative of the said framework structures.

The type Y zeolite seeds composition of Example 2, which contained 10 mole % aluminum (Si/Al=9/1), was prepared in the following manner. A NaOH aqueous solution with 0.088 mole NaOH and 8.5 mole $H_2O$ was prepared and 0.10 mole $NaAlO_2$ was added to this NaOH solution under stirring until a clear solution formed. To this basic sodium aluminate solution was added 1.0 mole of sodium silicate from a 27 wt % sodium silicate solution under vigorous stirring until a homogeneous opalescence gel formed. To obtain the Y-seeds composition, the gel was sequentially aged at ambient temperature over night and then at 100° C. over night.

Example 3 describes the preparation of a solution of Zeolite ZSM-5 seeds containing 1.5 mole % aluminum according to the general method described by deMoor et al., J. Phys. Chem. B 103 1639 (1999). A reaction mixture containing 6.7 mmole of tetrapropylammonium ions as the zeolite seeds director (6.7 mL of 1.0 M tetrapropylammonium hydroxide), 0.50 mmole sodium aluminate (Strem Chemical) and 33.3 mmole fumed silica (Aldrich Chemical) in 1270 mmole of water was aged with stirring at 50° C. for 18 hr to form the seeds.

Figure 2:
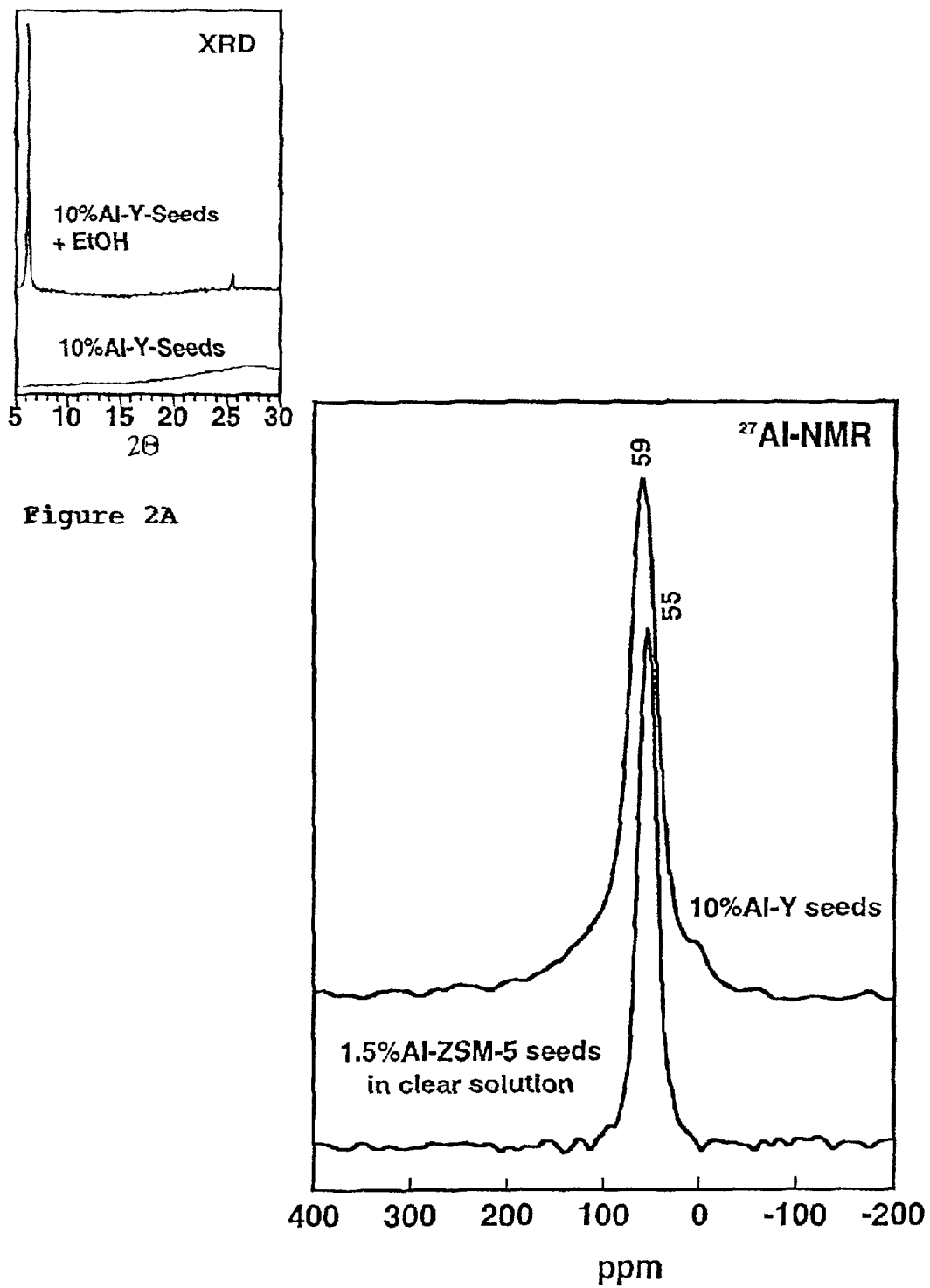
FIG. 2 provides the $^{27}$Al MAS NMR spectra for aluminosilicate nanoclusters that act as nucleation centers (seeds) for the nucleation of faujasitic zeolite Y (denoted 10% Al—Y) and the nucleation of MFI zeolite ZSM-5 (denoted 5% Al-ZSM-5).

$^{27}$Al-MAS NMR spectra of the protozeolitic seeds compositions were recorded on a Varian VRX 400S instrument in a zirconia rotor at spinning speeds of 2 kHz and 900 Hz, respectively. The spectra are shown in FIG. 2. FIG. 2A provides the X-ray diffraction pattern of the 10% Al—Y-seeds obtained by smearing the Y-seeds gel on a glass plate in the absence (bottom) or the presence of ethanol (top) to help promote the aggregation of the aluminosilicate precursor. The single $^{27}$Al NMR lines with chemical shifts of 55 and 59 ppm correspond to aluminum in a zeolite—like tetrahedral environment. In other words, the aluminosilicate species in the precursor compositions exhibit an $^{27}$Al NMR pattern consistent with the presence of nano-sized aluminosilicate clusters, as reported in the literature for typical zeolite seeds (White et al, J. Chem. Soc., Faraday Trans. 1998, 94, 2181; van Santen et al, J. Phys. Chem. 1999, 103, 1639).

Several of the following examples will illustrate the use of the nano-clustered zeolite seeds of Examples 2 and 3, as well as other zeolite seeds, as precursors for the assembly of aluminosilicate mesostructures with hexagonal, cubic, wormhole and cellular foam frameworks that are ultrastable under steaming conditions in comparison to mesoporous aluminosilicate molecular sieves prepared from conventional precursor solutions.

EXAMPLES 4 TO 6

These three Examples were designed to illustrate the use of nanoclustered zeolite Y seeds according to art of the present invention for the preparation of steam-stable mesoporous aluminosilicate molecular sieves with long range hexagonal order (denoted hexagonal Al-MSU-S from zeolite Y seeds) even at high tetrahedral aluminum concentrations in the framework. The hexagonal order is retained even after the mesostructures have been calcined to remove the surfactant. These mesostructures, as formed from zeolite Y seeds, also exhibited a $^{27}$Al-NMR resonance with a chemical shift substantially greater than 56 ppm, indicating a zeolitic type Y connectivity of $SiO_4$ and $AlO_4$ units in the framework walls. This minimum chemical shift value for our new aluminate mesostructures as formed from zeolite Y seeds is larger than the previously reported literature values for all known aluminated derivatives of silica mesostructures, regardless of the long range structural order of the mesostructure or the method used to form the aluminated derivatives. Moreover, the aluminum NMR chemical shifts for our new aluminosilicate mesostructures formed from zeolite Y seeds are comparable to the values typically observed for the siting of aluminum centers steam stable zeolite Y itself.

These examples also illustrate how the use of zeolite type Y seeds in the present invention overcomes the structural disordering effect of direct aluminum incorporation that is normally encountered when conventional aluminosilicate precursors are used in the assembly of a mesoporous aluminosilicate with intended long range hexagonal order. The three mesoporous aluminosilicate molecular sieves of Examples 4, 5, and 6 have Al-loading of 2 mol %, 10 mol % and 20 mol %, and are denoted 2% Al-, 10% Al., And 20% Al-MSU-S$_H$, respectively. The molar compositions of the reaction mixtures used to prepare the steam-stable compositions of these examples were as follows:

0.02, 0.10, or 0.20 mole $NaAlO_2$, corresponding to the compositions of Examples 4, 5, and 6, respectively.

0.088 mole NaOH 1.0 mole sodium silicate 0.25 mole CTAB surfactant 0.62 mole $H_2SO_4$ 130 mole $H_2O$ Gel-like type Y zeolite aluminosilicate seeds with the desired aluminum content were prepared according to the general method of Example 2 and diluted with 127 moles of water. To the diluted mixture, was added sequentially 0.044 mole $H_2SO_4$ and 0.20 mole CTAB under stirring at room temperature for 30 minutes. The resultant mixture was further acidified with 0.48 mole $H_2SO_4$ and aged at 100° C. for 20 h. The mixture then was acidified with 0.098 mole $H_2SO_4$ under vigorous stirring and aged at 100° C. again for 20 h to obtain the as-made aluminosilicate mesostructure. The as-made mesostructure was exchanged with 0.1 M $NH_4NO_3$ solution, dried at room temperature, and calcined at 540° C. for 7 h to remove the surfactant.

Figure 3:
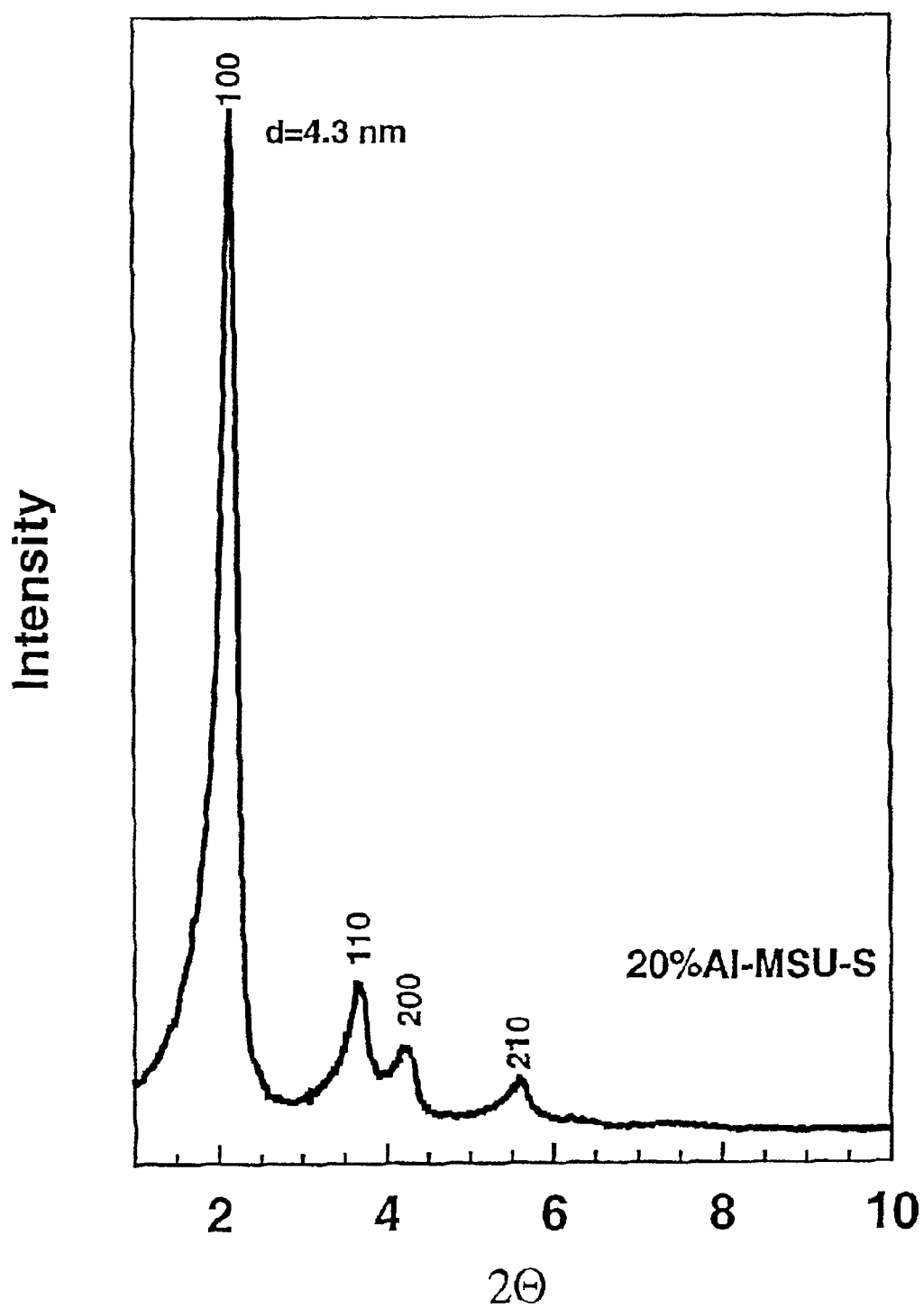
FIG. 3 is the XRD pattern for a 20% Al-MSU-S hexagonal aluminosilicate mesostructure that has been calcined at 540° C.
Figure 4:
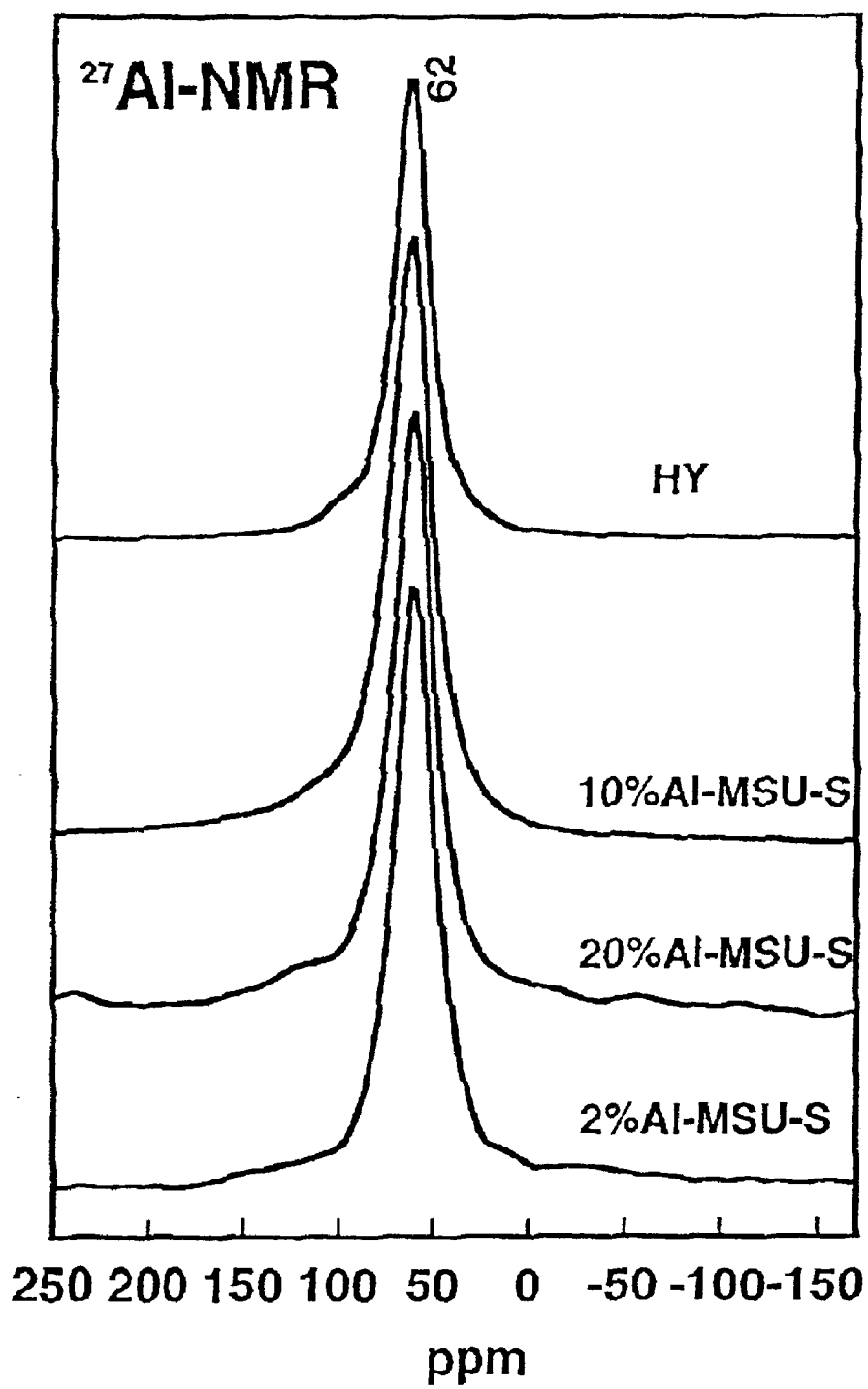
FIG. 4 provides the $^{27}$Al-MAS NMR spectra for calcined forms of Al-MSU-S aluminosilicate mesostructures and for the proton form of zeolite Y (denoted HY). The chemical shift value of 62 ppm is indicative of tetrahedral AlO$_4$ centers with a zeolite-like connectivity to SiO$_4$ centers. No octahedral AlO$_6$ centers with a chemical shift near 0 ppm are indicated.

FIG. 3 shows the powder X-ray diffraction patterns for the calcined form of hexagonal 20% Al-MSU-S from zeolite Y seeds (Example 6). The four well-expressed reflections were indexed to the (100), (110), (200) and (210) reflections of a hexagonal mesophase. The calcined hexagonal 2% Al- and 10% Al-MSU-S mesostructures exhibited equivalent diffraction patterns. Equally important, each of calcined mesostructures exhibited a $^{27}$Al MAS NMR chemical shift at about ~62 ppm which is comparable to the shift of steam stable Y zeolites (FIG. 4). The BET surface area ($m^2/g$) and pore volumes (cc/g) of the mesostructures prepared in Example 4 to 6 were 1037 and 0.80, 978 and 0.70 and 599 and 0.51, respectively. In each case, the average Horvath-Kawazoe pore size determined from the nitrogen adsorption isotherm was about 3.3 nm.

EXAMPLE 7

This example illustrates that our new aluminosilicate mesoporous molecular sieves, as prepared from zeolite type Y seeds according to Examples 4 to 6, is not limited to cetyltrimethylammonium ions as the structure director and that they can be formed using other quaternary ammonium ion surfactants, as well. In this example, tetradecyltrimethylammonium bromide (TTAB) was used in place of CTAB as the structure director. A reaction mixture containing 0.25 mole TTAB as the surfactant structure director and a 20 mol % Al type Y zeolite aluminosilicate precursor was prepared and processed in the same way as described in Examples 4 to 6. The resultant calcined product exhibited a well-expressed hexagonal X-ray diffraction pattern with a basal spacing of 37.0, 21.3, 18.5 and 14.0 A, corresponding to the (100), (110), (200) and (210) reflections of a hexagonal mesostructure, respectively. The magic angle spinning $^{27}$Al-NMR spectrum for the calcined sample exhibited a resonance with a chemical shift of 62 ppm.

EXAMPLES 8 TO 10

These Examples 8 and 9 were designed to demonstrate the art of the present invention for the preparation of our new aluminosilicate mesostructures with long range cubic order, which we denote cubic Al-MSU-S from zeolite Y seeds. These cubic compositions also exhibit tetrahedral $^{27}$Al-NMR resonances at chemical shifts greater than 56 ppm and similar to the chemical shift of HY zeolite. Two cubic mesoporous aluminosilicate molecular sieves with Al contents of 2 mol %, and 10 mol % were prepared corresponding to Examples 8 and 9, respectively.

To obtain the said cubic mesostructures, gel-like zeolite type Y aluminosilicate seed precursors with the appropriate Al content were obtained according to Example 2 and diluted with 127 mole water. For each mole of silicon used in the reaction mixture, the diluted gel was first treated with 0.044 mole $H_2SO_4$ to lower the pH. Then 0.12 mole CTAB and 3.0 mole ethanol as a co-surfactant was sequentially added under vigorous stirring at ambient temperature. After being stirred for 40 minutes the pH of the reaction mixture was reduced with the addition of 0.14 mole $H_2SO_4$. The resulting mixture was transferred to a Teflon-lined autoclave and aged at 150° C. for 15 h. The as-made products were recovered by filtration, air-dried and then calcined at 540° C. for 7 h to remove the surfactant.

Figure 5:
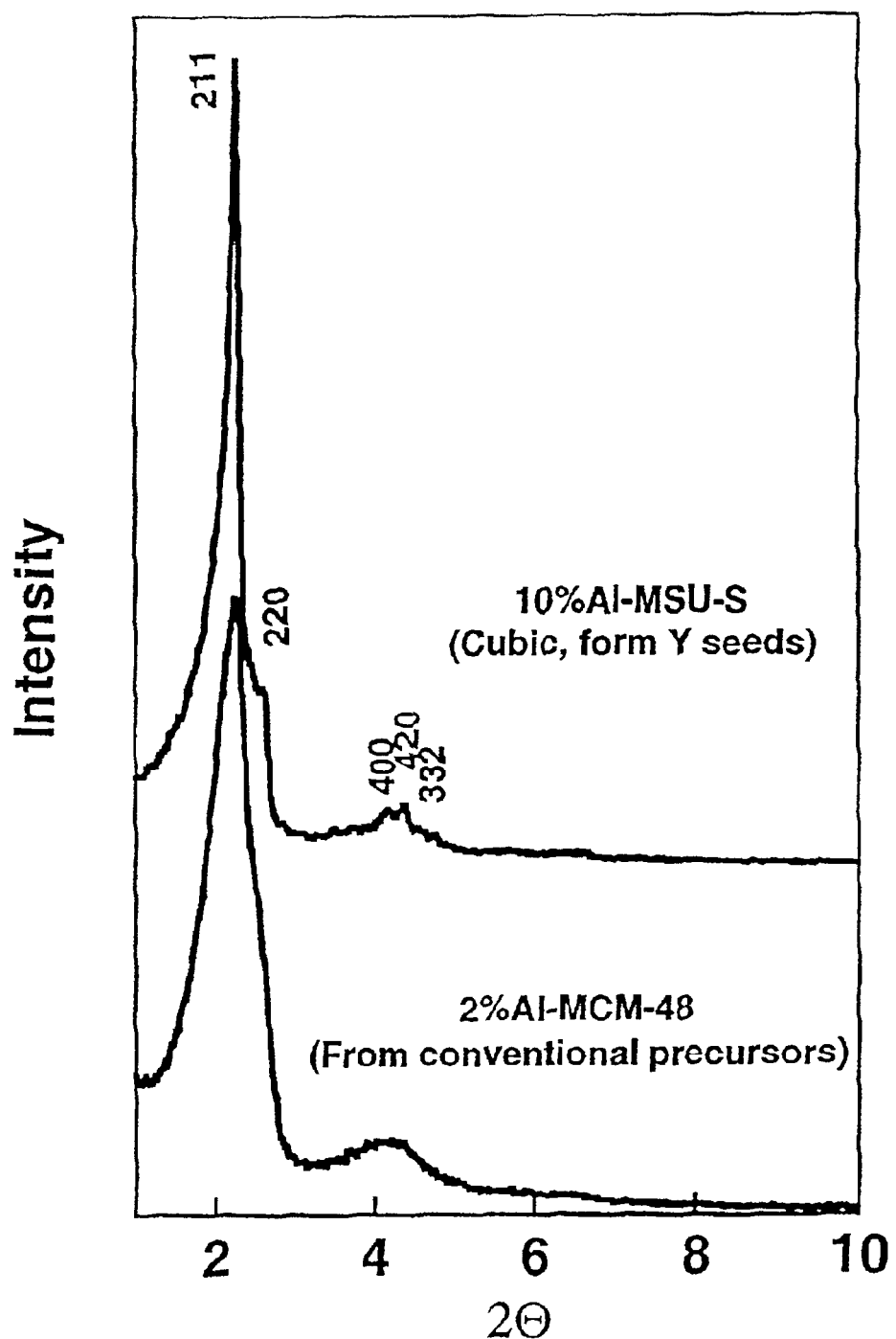
FIG. 5 provides the XRD patterns of a calcined cubic 10% Al-MSU-S aluminosilicate mesostructure assembled from nanoclustered zeolite Y seeds and a calcined cubic 2% Al-MCM-48 prepared from conventional aluminate and silicate precursors.

In FIG. 5, the top diffraction pattern is for the calcined 10% Al-MSU-S sample prepared from type Y zeolite seeds as described in Example 9. The bottom diffraction pattern is for 2% Al-MCM-48 as a contrast sample (Example 10). This contrast sample was prepared from conventional precursors by mixing diluted sodium silicate (1.0 mole) and sodium aluminate (0.02 mole) and NaOH (0.088 mole) solutions to obtain a clear solution and then reducing the pH immediately with 0.18 mole $H_2SO_4$. Then, 0.12 mole CTAB and 3 mole ethanol per mole of silicon was sequentially added under vigorously stirring at ambient temperature before transferring the reaction mixture to a Teflon-lined autoclave to age at 150° C. for 15 h. The product was then washed and calcined at 540° C. to remove the surfactant. This same procedure afforded a well-ordered cubic MCM-48-like silica when the aluminum was omitted from the reaction mixture.

It is clear from the XRD pattern for the calcined cubic 10% Al-MSU-S mesostructure in FIG. 5 that a well ordered cubic mesoporous aluminosilicate molecular sieves was obtained from type Y zeolite seeds as the inorganic precursor. In contrast, FIG. 5 also shows that the calcined 2% Al-MCM-48 mesostructure prepared from conventional sodium aluminate, sodium silicate precursors and surfactant is disordered as judged from the broad low angle x-ray reflections.

Figure 6:
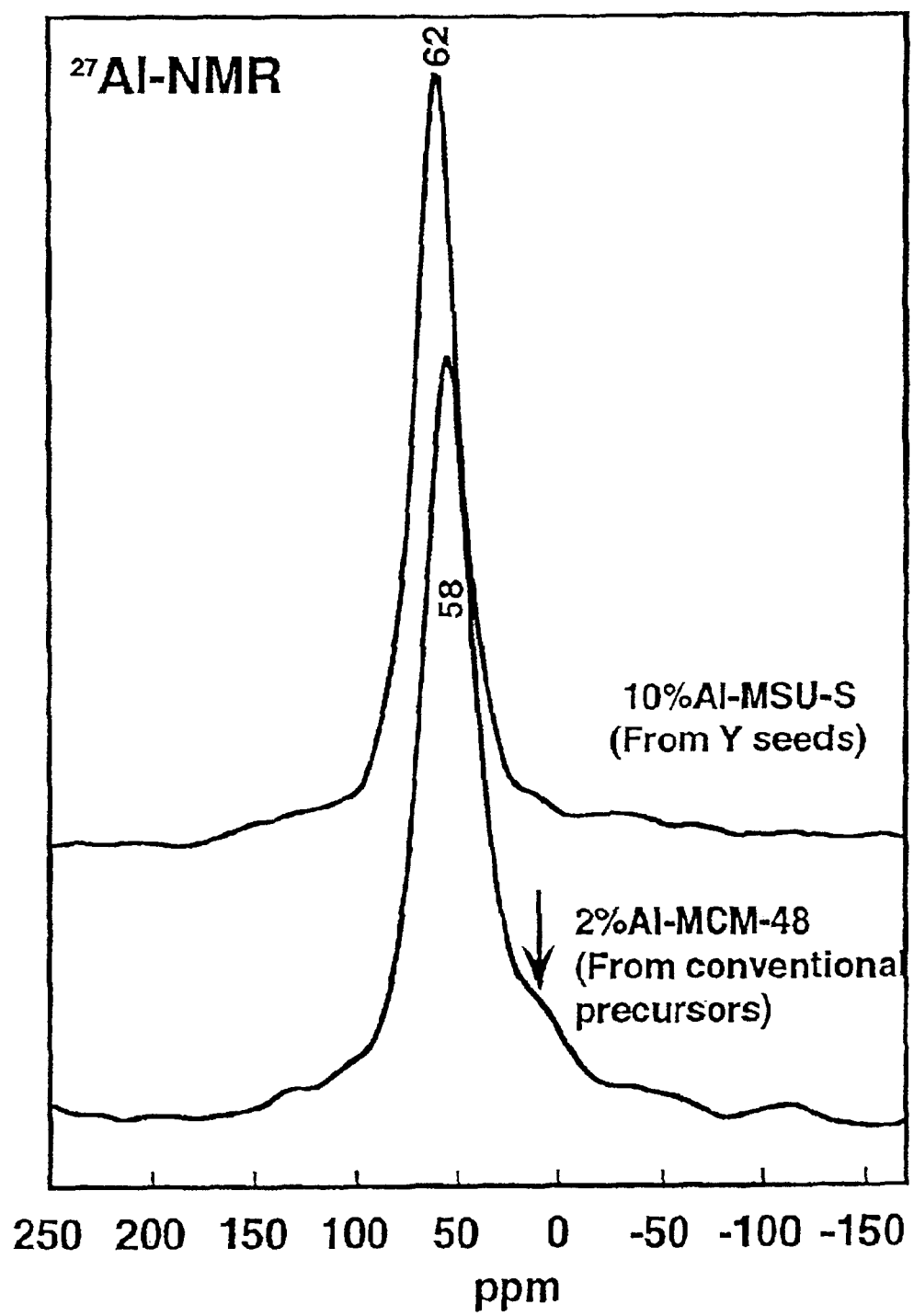
FIG. 6 provides the $^{27}$Al MAS NMR spectra for 2% Al-MSU-S prepared from zeolite Y seeds and 2% Al-MCM-41 prepared from conventional precursors. The arrow points to the resonance line near 0 ppm indicative of AlO$_6$ centers.

The $^{27}$Al-NMR spectra of 2% Al-MSU-S from Example 8 and 2% Al-MCM-48 from Example 10 are shown in FIG. 6. The zeolite-like resonance at a chemical shift of 62 ppm clearly indicates the exclusive presence of tetrahedral Al-sites for the cubic 2% Al-MSU-S. An analogous result was obtained for the cubic 10%-MSU-S mesostructure prepared in Example 9. However, the resonance for the tetrahedra aluminum in 2% Al-MCM-48 occurs at a chemical shift of 56 ppm. In addition, this latter mesostructure exhibits a resonance (indicated by the arrow) at 0 ppm corresponding to octahedral Al-sites. Consequently, we can conclude that pre-formation of protozeolitic (type Y zeolite) aluminosilicate nanoclusters indeed improves the long range order of cubic mesostructures as well as the Al-siting in these mesoporous molecular sieves. The BET surface area (and pore volume) measured from $N_2$ adsorption isotherms for the MSU-S samples prepared from Example 8 and 9 were 976 (0.70) and 599 $m^2/g$ (0.51 cc/g). The effective pore size calculated from the Horvath-Kawazoe model was 2.6 nm for both samples.

EXAMPLES 11 AND 12

These two examples were designed to illustrate the versatility of using pre-formed zeolite type Y and zeolite ZSM-5 aluminosilicate nanoclusters to assemble mesoporous molecular sieves with a wormhole framework structure, denoted wormhole Al-MSU-S from type Y zeolite seeds and ZSM-5 zeolite seeds, respectively, with zeolite-like tetrahedral Al-sites (as judged from $^{27}$Al NMR chemical shifts), as well as textural porosity that is useful for catalysis.

Example 11 made use of preformed Zeolite Y (faujasitic) seeds prepared as described in Example 2. Example 12 made use of preformed ZSM-5 seeds as described in Example 3. In Example 11 a 10% Al-containing seeds composition was prepared as described in Example 2 and then 0.073 mole CTAB was added per mole of Si under vigorously stirring at ambient temperature for 30 minutes. The resultant mixture was aged at 100° C. for 2 days and the product was filtered, washed and air-dried.

For Example 12, a clear 1.5% Al-ZSM-5 seeds solution obtained as described according to the general procedure of Example 3 and then 5.50 mmole CTAB and 1000 mmole water was added at ambient temperature under stirring. The resultant mixture was aged at 100° C. for 2 days and the product was recovered by filtration, washed and air-dried. The surfactant in the samples obtained from Examples 11 and 12 was removed from the framework pores by calcination at 540° C. in air for 7 h.

Figure 7:
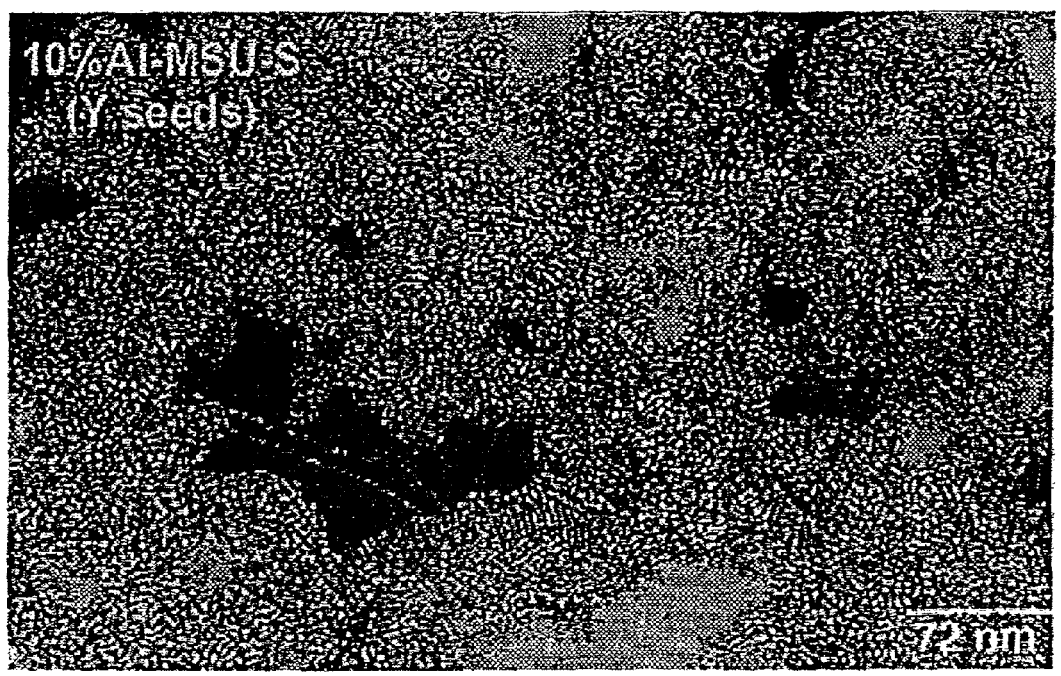
FIG. 7 provides a transmission electron micrograph for a 10% Al-MSU-S$_W$ wormhole structure assembled from zeolite Y seeds.
Figure 8:
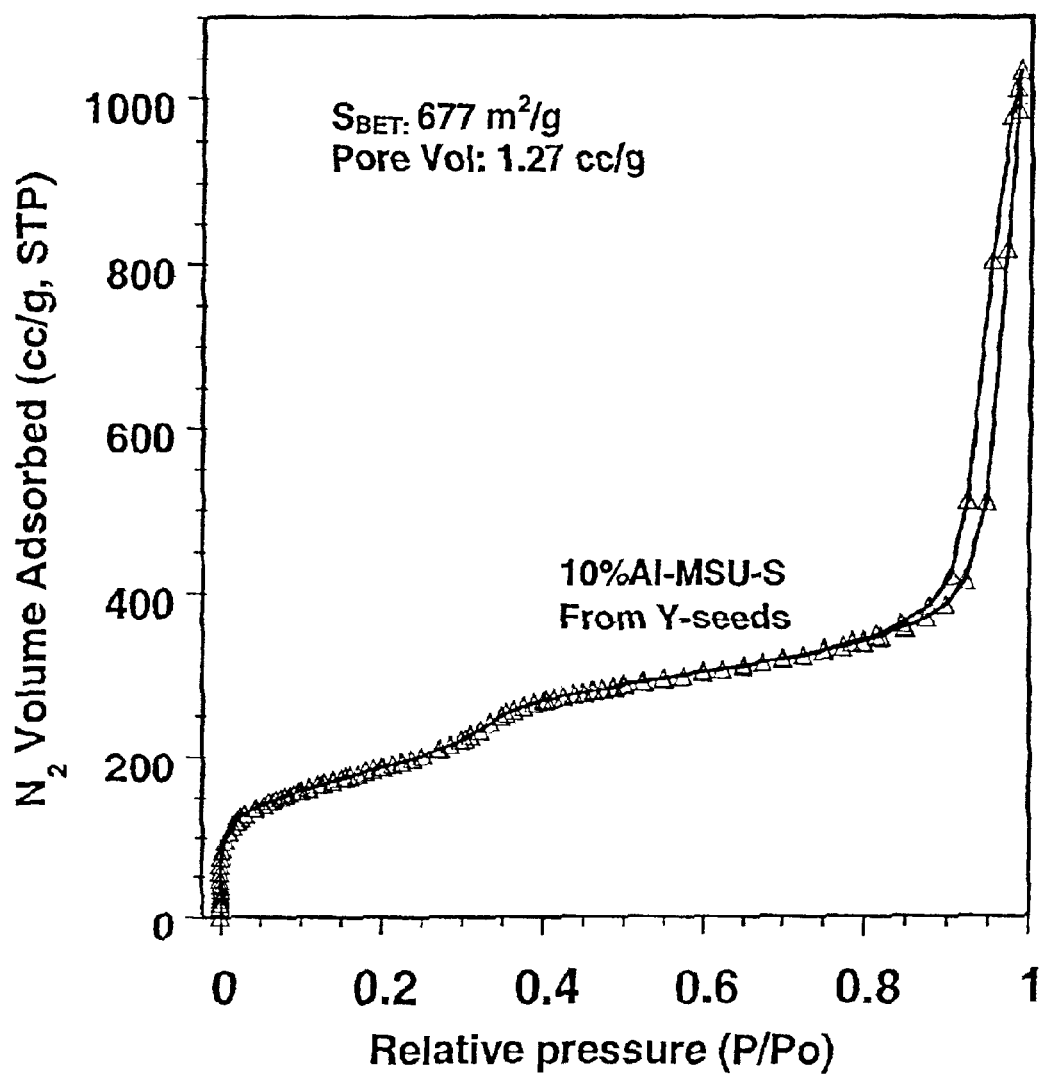
FIG. 8 provides the nitrogen adsorption/desorption isotherms for 2% Al-MSU-S and 10% Al-MSU-S$_W$ wormhole structures assembled from zeolite ZSM-5 and zeolite Y seeds, respectively. The insert provides the BET surface areas ($S_{BET}$) and pore volumes (P.V.) derived from the isotherms. Isotherms are offset by 200 cc/g for clarity.
Figure 9:
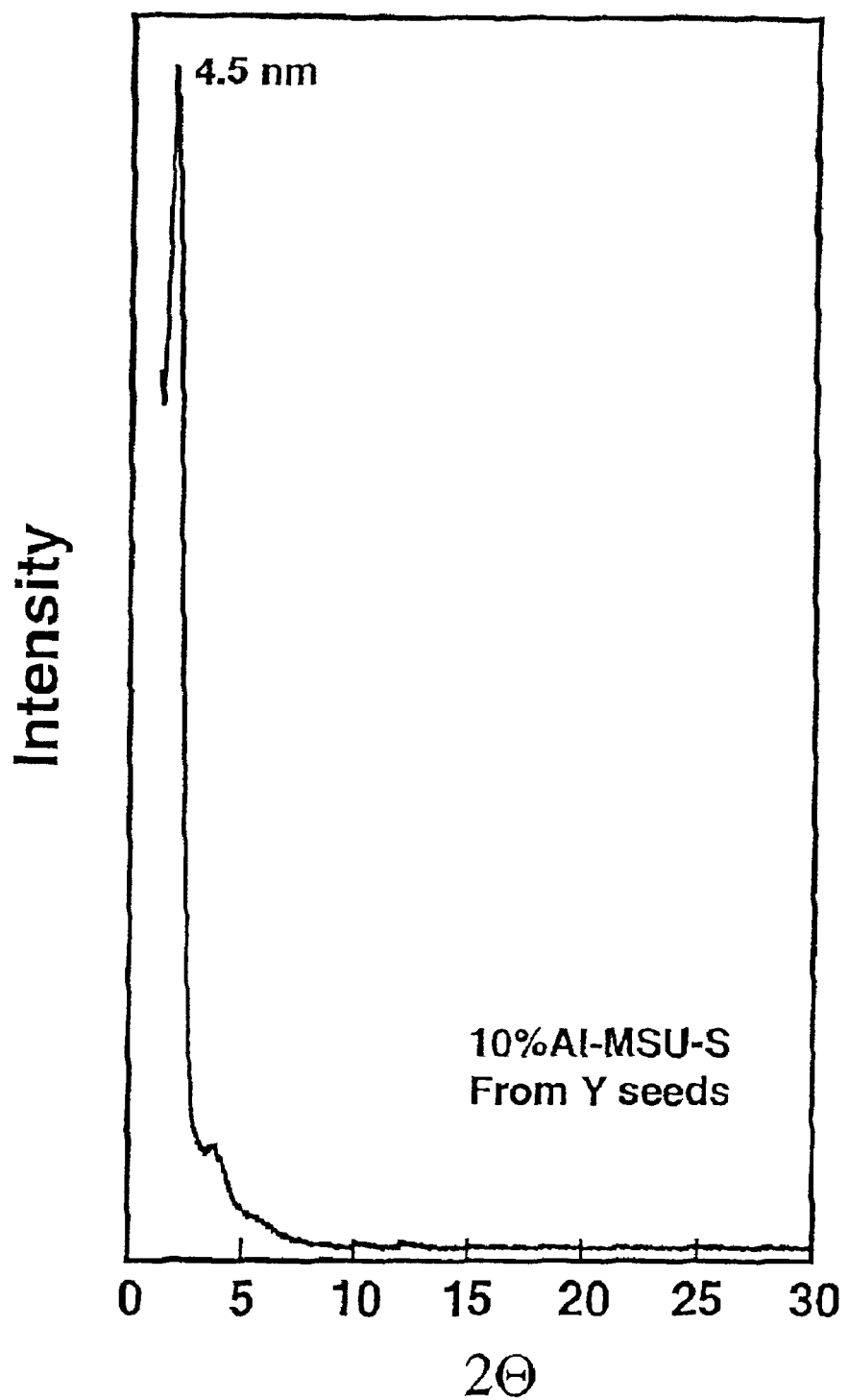
FIG. 9 provides the XRD patterns for mesoporous aluminosilicates 10% Al-MSU-S (assembled from zeolite Y seeds) and 2% Al-MSU-S (assembled from zeolite ZSM-5 seeds) with wormhole framework structures.

FIGS. 7A and 7B show the TEM images obtained for the wormhole MSU-S samples prepared in examples 11. A similar image was obtained for the product of Example 12. The images were recorded on a JEOL 100CX instrument with an electron beam accelerated at 120 kV using $CeB_6$ gun. The samples were dusted onto a copper-grid to obtain the images. Both wormhole-like framework pore channels and intraparticle textural mesopores are observed for both samples. The textural pores result from the intergrowth of nanoscale framework domains of primary particles. In agreement with the textural porosity evident in the TEM images, the $N_2$ adsorption-desorption isotherms, as shown in FIG. 8 for the product of Example 11 exhibits a large amount of textural porosity as evidenced by the hysteresis loop at partial pressures above 0.80. A similar isotherm was obtained for the calcined product of Example 12. The filling of the framework wormhole pores is indicated by the step in the adsorption isotherms at partial pressures between 0.25 and 0.45. In agreement with a wormhole framework structure, the X-ray diffraction patterns (FIG. 9) for the calcined aluminosilicate mesoporous molecular sieve of Example 11 contained a single intense X-ray diffraction line corresponding to the correlation length between the wormhole pores and a weak higher order refection at higher scattering angle. A similar XRD pattern was obtained for the calcined product of Example 12. Also, the $^{27}Al$-NMR spectra for the wormhole mesostructure assembled from type Y zeolite seeds exhibited a zeolitic chemical shift at ~61 ppm, in accord with the shifts observed for the samples prepared in Example 4 to 6.

EXAMPLE 13

The purpose for this example was to show that the hexagonal aluminosilicate mesostructures prepared from nanoclustered zeolite type Y seeds according to the present invention are capable of surviving exposure to steam at 800° C., at least when the structures are free of sodium ions and surfactant.

Samples of hexagonal 10% Al-MSU-S and 20% Al-MSU-S, were prepared from nanoclustered zeolite Y type seeds according to the general procedure described in Examples 4 to 6. One-gram quantities of each as-made sample were separately treated with 100 ml 0.1 M $NH_4NO_3$ aqueous solution at 100° C. for overnight. The treated samples were recovered by filtration and calcined at 540° C. in air for 7 hours to remove the surfactant in the mesopores. These calcined samples were used for steam stability testing. Each sample was steamed at 800° C. for 5 hours in the a stream of 20 vol % steam-containing $N_2$. Then the X-ray diffraction patterns and nitrogen adsorption isotherms were used to investigate the retention of a mesoporous structure after steaming.

Figure 31:
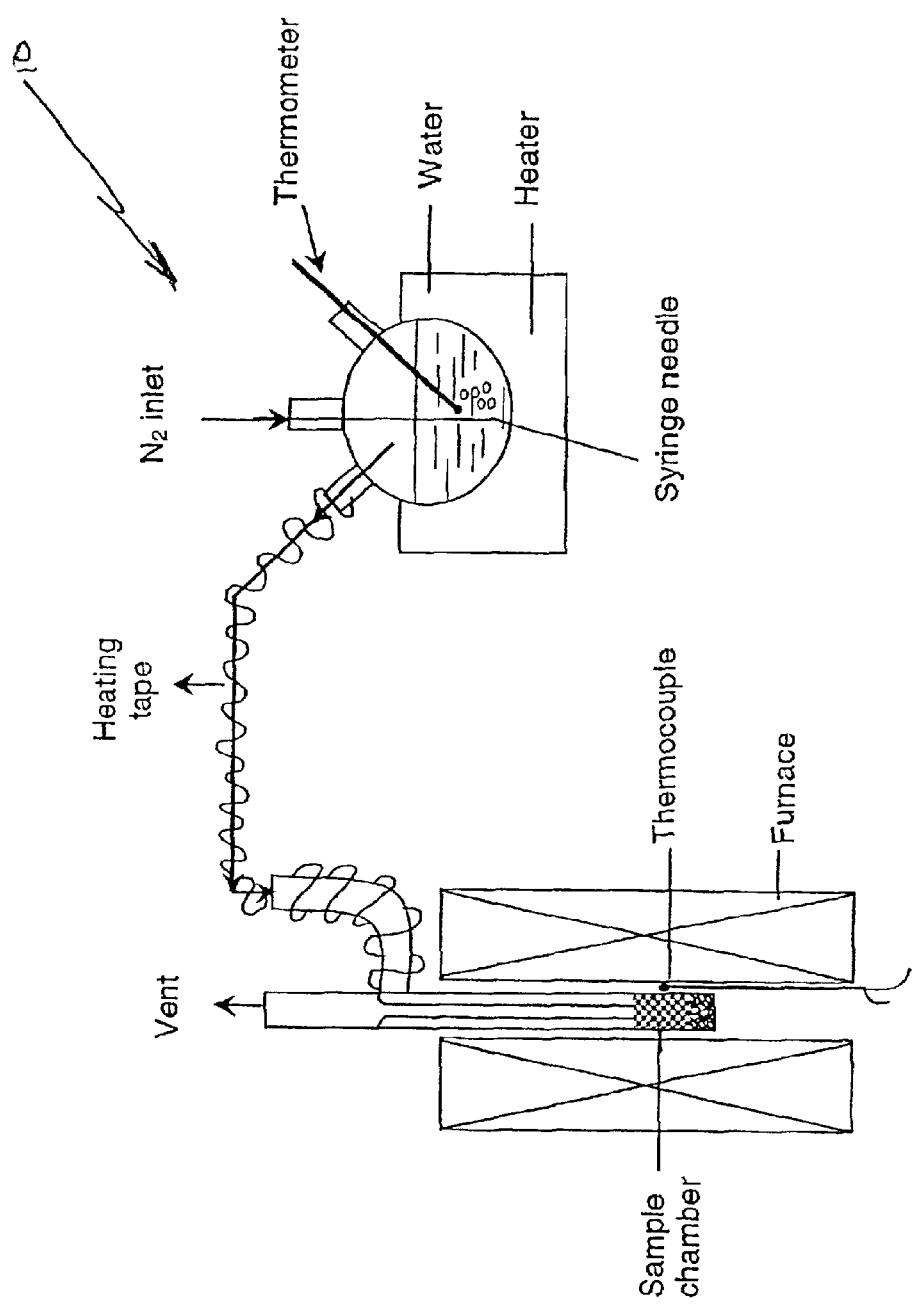
FIG. 31 provides a sketch of the apparatus used for exposing the aluminosilicate structures to 20% steam.
Figure 31A:
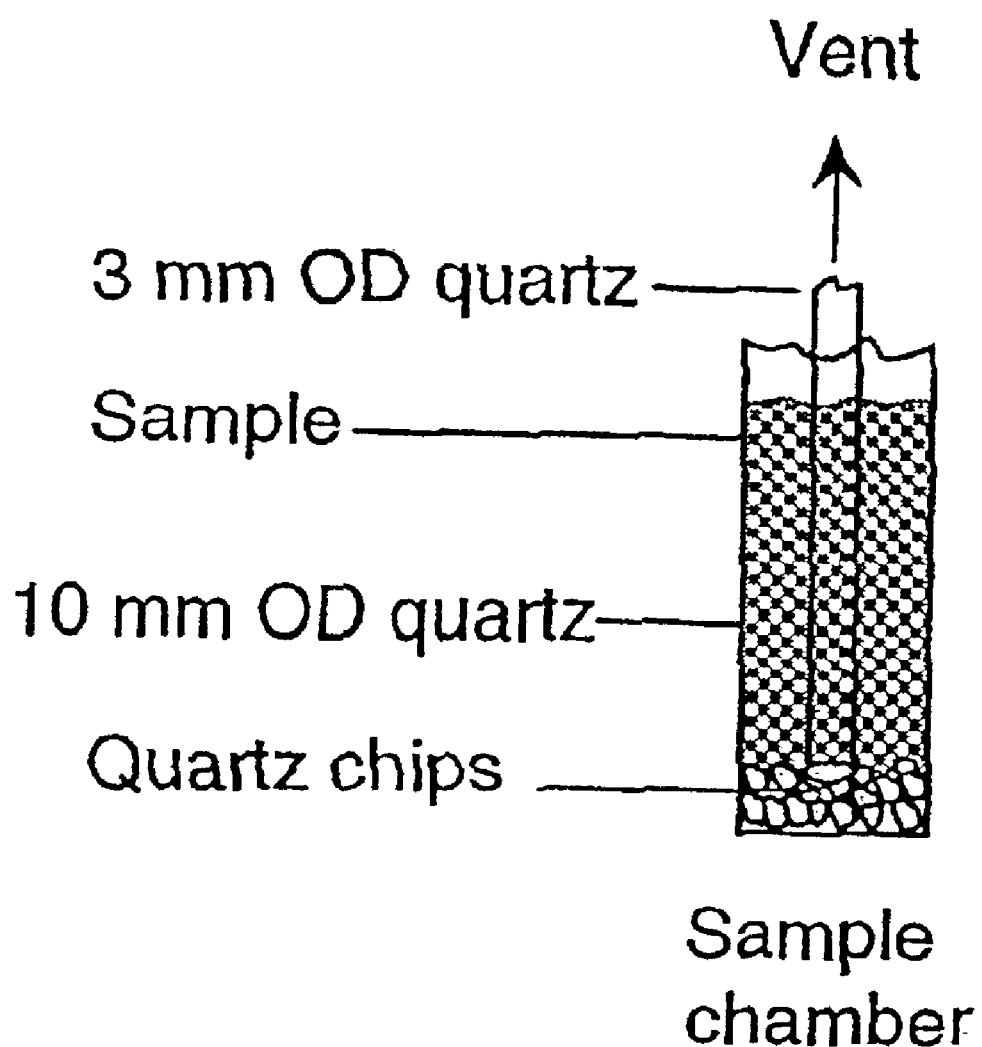
FIG. 31A is a partial enlarged view of the sample chamber.

The apparatus 10 used to steam the samples of this example, as well as the samples of all subsequent examples, is illustrated in FIG. 31 and FIG. 31A. A stream of nitrogen at atmospheric pressure (~20 cc per min) was passed through a flask of water heated at 62±1° C. at a vapor pressure of 156 torr. A syringe needle was used to produce fine nitrogen bubbles saturated by the water vapor. The sample chamber design ensures the uniform passage of the steam through the sample.

Figure 10:
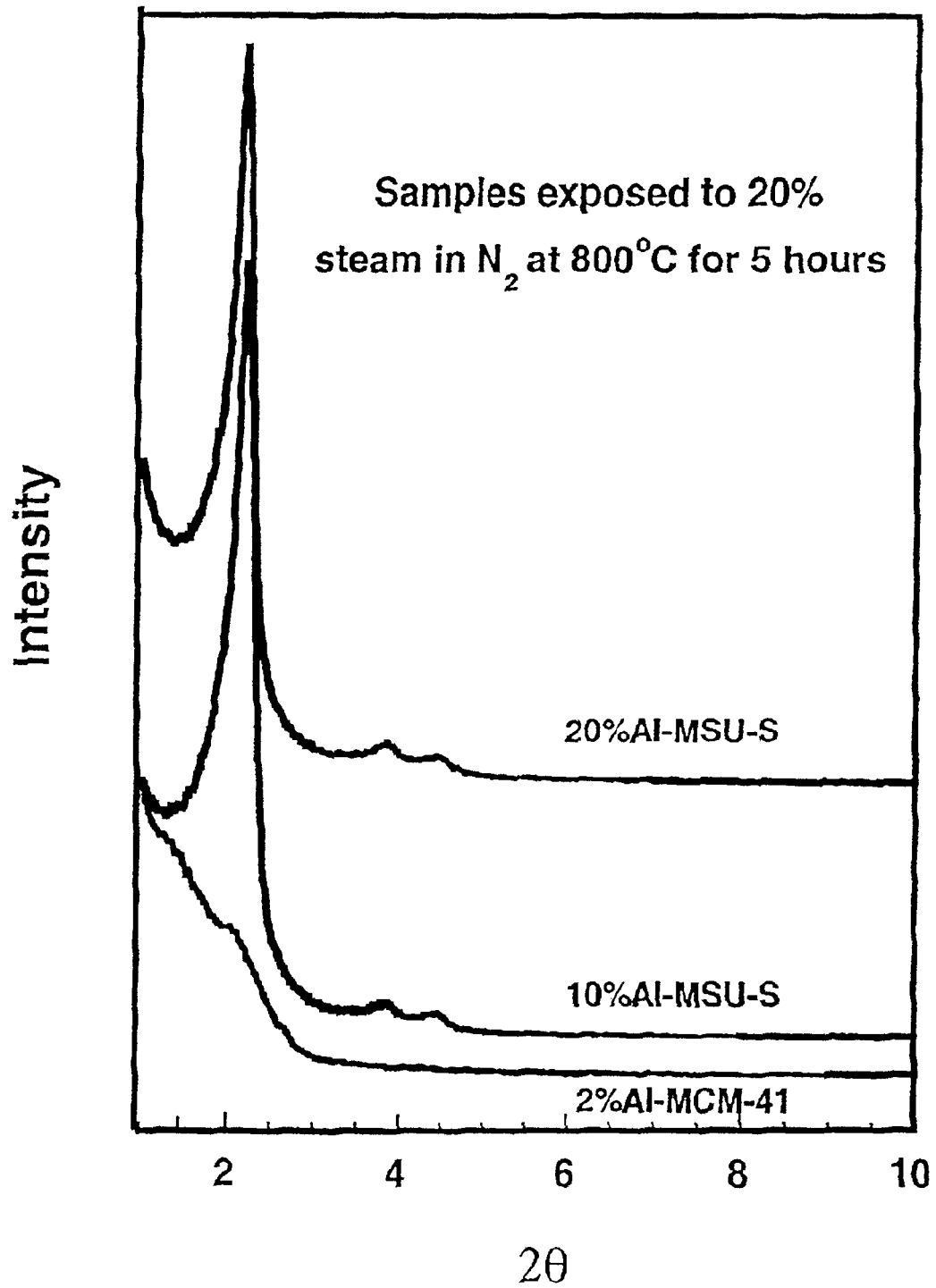
FIG. 10 provides the XRD patterns for 20% Al-MSU-S, 10% Al-MSU-S and 2% Al-MCM-41 aluminosilicate mesostructures after having been exposed to 20 vol % steam at 800° C. for 5 hours.

As shown in FIG. 10, it is obvious that the aluminosilicate mesostructures formed from preformed aluminosilicate nanoclusters retained their hexagonal structural integrity entirely, but the conventional MCM-41 like hexagonal mesostructure collapsed after steaming treatment at 800° C. for 5 hours. This is in agreement with what has been reported previously by Ryoo and his co-workers (Ryoo, J. Phys. Chem. 1995, 99, 16742) regarding the stability of MCM-41 prepared from conventional precursors.

Chemical analysis of the calcined samples before steaming indicated the presence of about 0.8% carbon. Samples calcined for periods longer or shorter periods than eight hours contained quantities of carbon lower than or greater than the 0.8 wt % value, respectively. Also, the degree to which the samples retained a hexagonal X-ray pattern and a framework mesoporosity after steaming generally paralleled the carbon content. Thus, we conclude that the framework embedded carbon, as well as the zeolite-like connectivity of the framework walls is helpful in contributing to the steam stability of these materials.

COMPARATIVE EXAMPLE 14

The purpose of this Example was to prepare a so-called ultrastable 14% Al-MCM-41 mesostructure according to the preparation art of R. Mokaya, as described in *Angew.Chem.Int.Ed.* 1999, 38 No.19, 2930. A 1.0 g calcined sample of a "secondary" MCM-41 silica was prepared according to the methodology of Mokaya (see below). To this secondary silica was added 50 ml of aluminum chlorohydrate (ACH) solution (0.48 M with respect to Al) and the mixture was stirred at 80° C. for 2 h. The resulting solid was collected by filtration and washed with 100 ml distilled water until it was free of Cl⁻ ions, dried at room temperature, and calcined in air at 550° C. for 4 h.

In accord with the teachings of Mokaya, in order to prepare a "secondary" MCM-41 silica, we first prepared a "primary" MCM-41 silica. To obtain the primary MCM-41 silica, 2.0 g of fumed silica was added to a solution containing 3.0 g cetyltrimethylammonium bromide (CTAB) and 0.610 g tetramethyl-ammonium hydroxide (TMAOH) in 24 g $H_2O$ at 35° C. under stirring for 1 h. After further stirring for 1 h, the resulting synthetic gel of molar composition 1.0 $SiO_2$; 0.25 CTAB: 0.2TMAOH; $40H_2O$ was left to age 20 h at room temperature then the mixture was transferred to a Teflon-lined autoclave and heated at 150° C. for 48 h. The solid product was obtained by filtration, washed with distilled water, dried in air at room temperature and calcined at 550° C. for 8 h. The "secondary" MCM-41 silica was then prepared from the primary MCM-41 silica. To prepare the secondary MCM-41, a synthesis gel of the same molar ratio was prepared, except that the primary calcined MCM-41 was used as silica source instead of fumed silica. The synthetic procedures were identical to the described for the primary synthesis.

The procedure for the steam stability test was as follows: 0.2 g of ultra stable MCM-41 was put into a Y-shaped quartz tube reactor and a stream of 20 vol % water vapor (steam) in $N_2$ at atmospheric pressure was introduced at 800° C. for 5 hours. The 20% water steam in $N_2$ was generated by passing the nitrogen stream through a saturator charged with liquid water at 62° C.±1. The vapor pressure of water at this temperature is 156 torr. The X-ray diffraction patterns and $N_2$-sorption and desorption isotherms were used to evaluate the residual structure after steaming.

Figure 11C:
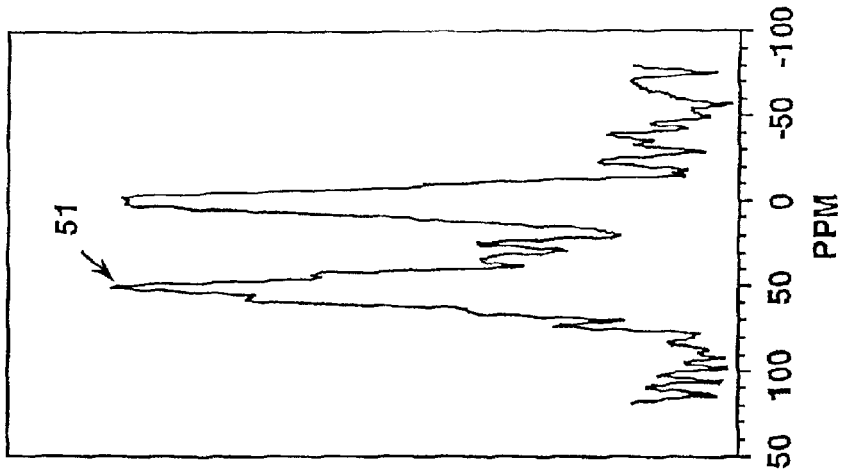
FIGS. 11A, 11B and 11C provide the XRD patterns (11A), and nitrogen adsorption/desorption isotherms (11B) for a freshly calcined "ultrastable" 14% Al-MCM-41 aluminosilicate prepared by grafting reaction of a secondary silica mesostructure with Al$_{13}$ oligocations according to the method of Mokaya (Angew. Chem. Int. Ed. 38 No. 19, 2930 (1999)) and for the same mesostructure after exposure to 20 vol % steam in nitrogen at 800° C. for 5 hours. Also, included in the figure is the $^{27}$Al AS NMR spectrum (11C) for the sample after exposure to steam.
Figure 11B:
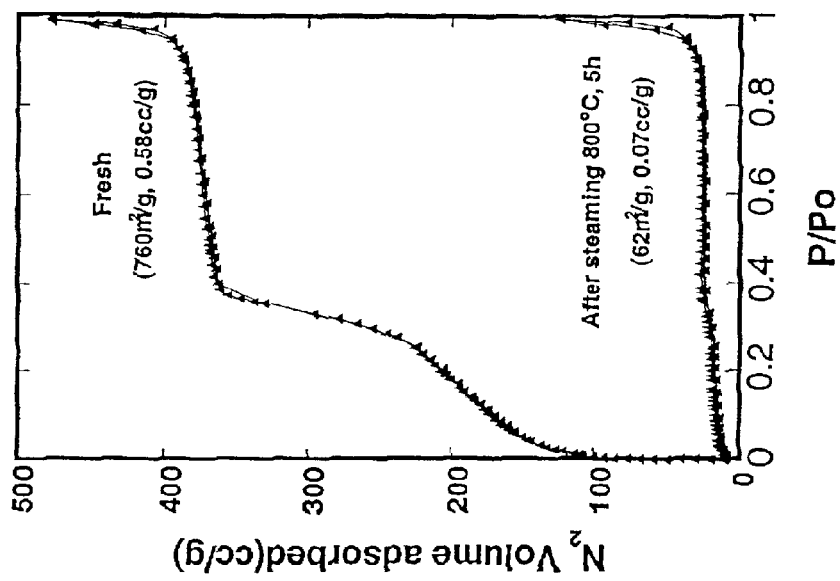
Figure 11A:
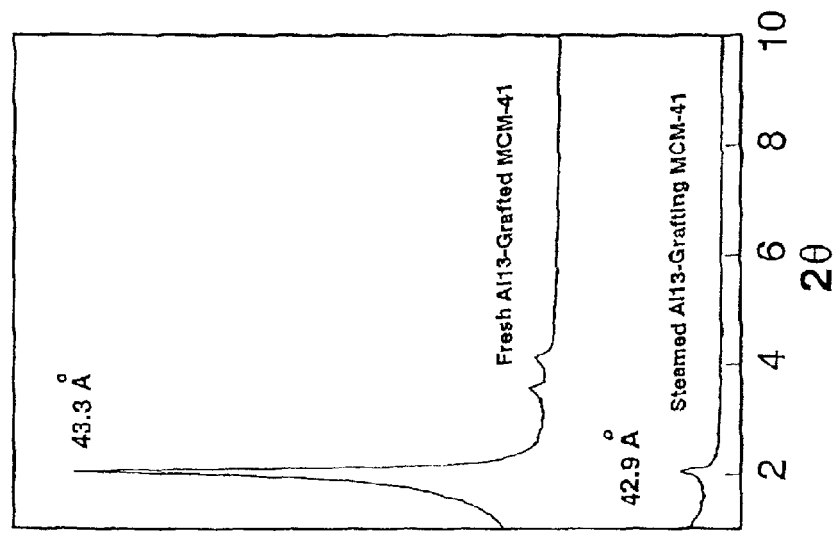

As shown by the X-ray and $N_2$ adsorption data in FIGS. 11A, 11B and 11C, the ultrastable 14% Al-MCM-41 of Mokaya underwent structural collapse after the steaming treatment at 800° C. for 5 hr. The surface area was reduced by 92% (from 760 to 62 $m^2$/g) and the framework pore volume, as determined at a nitrogen partial pressure of 0.96, was reduced by 88% (from 0.58 to 0.07 cc/g by steaming. Also, the $^{27}$Al MAS NMR spectrum in FIG. 11 shows that only about half the aluminum is in tetrahedral environments (~51 ppm) and the other half is in octahedral environments (~0 ppm). We conclude that this material lacks the desired hydrothermal stability for many practical applications in catalysis, especially catalytic cracking of petroleum.

COMPARATIVE EXAMPLES 15 AND 16

Example 15 describes the synthesis and properties of a typical hexagonal aluminosilicate mesostructure., hexagonal 10% Al-MSU-S (Si:Al=9:1), derived from seeds that normally nucleate the crystallization of faujasitic zeolite type Y. The procedure used here for forming the zeolite type Y seeds follows the general methodology described in the literature (Robson, H. ACS Symp. Ser. 398 436 (1989); and Lechert, L., et al., Stud. Surf. Sci. Catal. 84 147 (1994)).

Example 16 describes the preparation of a 10% Al-MCM-41 from conventional silicate and aluminate precursors. The procedure used to form 10% Al-MCM-41 in Example 16 was equivalent to the procedure used in Example 15, except that we eliminated the zeolite seeds-forming step used in the preparation of the 10% Al-MSU-S in Example 15. We then compare on the basis of XRD and nitrogen adsorption properties the steam stabilities of these two mesostructures. In addition, we include in the comparison of steam stability the "ultrastable" Al-MCM-41 prepared as described in Example 14 using the method of Mokaya.

The hexagonal 10% Al-MSU-S of Example 15 was prepared from zeolite Y seeds as follows. First, 0.269 g $NaAlO_2$ was dissolved in a solution of 0.116 g of NaOH in 5.0 ml water to obtain a clear solution. To this solution was added 7.29 g of sodium silicate solution (27 wt % $SiO_2$, 14 wt % NaOH) under vigorous stirring to obtain a homogeneous mixture. To generate faujasitic type Y zeolite seeds, the resulting mixture was aged at room temperature overnight and then an additional 24 hour period at 100° C. under static conditions. The mixture of zeolite seeds was diluted with 75 ml of water to obtain a milky suspension. Concentrated sulfuric acid (0.142 g) was added to the seeds mixture, followed by the addition of 2.45 g of cetyltrimethylammonium bromide (CTAB) under vigorous stirring for 30 minutes. Then an additional 0.781 g of sulfuric acid was added and the mixture was allowed to age at 100° C. under static conditions overnight. Following this aging step an additional increment of 0.156 g of sulfuric acid were added and the mixture was again allowed to age at 100° C. overnight under static conditions to form the mesostructure. At this point the pH of the reaction mixture was about 9.0 The resulting 10% Al-MSU-S product prepared from zeolite seed precursors was filtered, washed, and dried at ambient temperature in air. A 1.0-g quantity of the air-dried product was treated with 100 ml of 1.0M $NH_4NO_3$ at 100° C. overnight to displace sodium ions and about half of the surfactant from the mesopores, dried in air, and then calcined at 540° C. for 7 h to remove remaining surfactant and to convert charge-balancing ammonium ions to protons. Chemical analysis of the calcined product indicated a Si:Al molar ratio of 9:1, along with the presence of 0.80 wt % carbon. We attribute the formation of carbon to the cracking of surfactant in the very acidic mesopores of the zeolite-like framework of the hexagonal Al-MSU-S mesostructure during calcination.

The disordered hexagonal 10% Al-MCM-41 comparative sample of Example 16 was prepared from conventional aluminosilicate precursor as follows. A mixture of 0.269 g of $NaAlO_2$ and 7.29 g of sodium silicate (27 wt % $SiO_2$, 14 wt % NaOH) were stirred vigorously to form a homogeneous mixture and then 75 ml of water was added to form a milky suspension. To the milky suspension was added sequentially with stirring 0.142 g of concentrated sulfuric acid, 2.45 g of cetyltrimethylammonium bromide with vigorous stirring for 30 minutes, and 0.781 g concentrated sulfuric acid. The resulting mixture was allowed to age overnight at 100° C. under static conditions for 1 day. Then 0.156 g of sulfuric acid was added and the mixture was aged another day at 100° C. The resulting 10% Al-MCM-41 mesostructure prepared from conventional aluminate and silicate precursors was filtered, and dried in air at ambient temperature. A 1.0-g quantity of the air-dried product was treated with 100 ml of 1.0M $NH_4NO_3$ at 100° C. overnight to displace sodium ions and some of the surfactant from the mesopores, dried in air, and then calcined at 540° C. for 7 h to remove remaining surfactant and to convert charge-balancing ammonium ions to protons. Chemical analysis indicated a Si/Al ratio of 9/1, but the presence of less than 0.04% carbon.

Figures 12A, 12B:
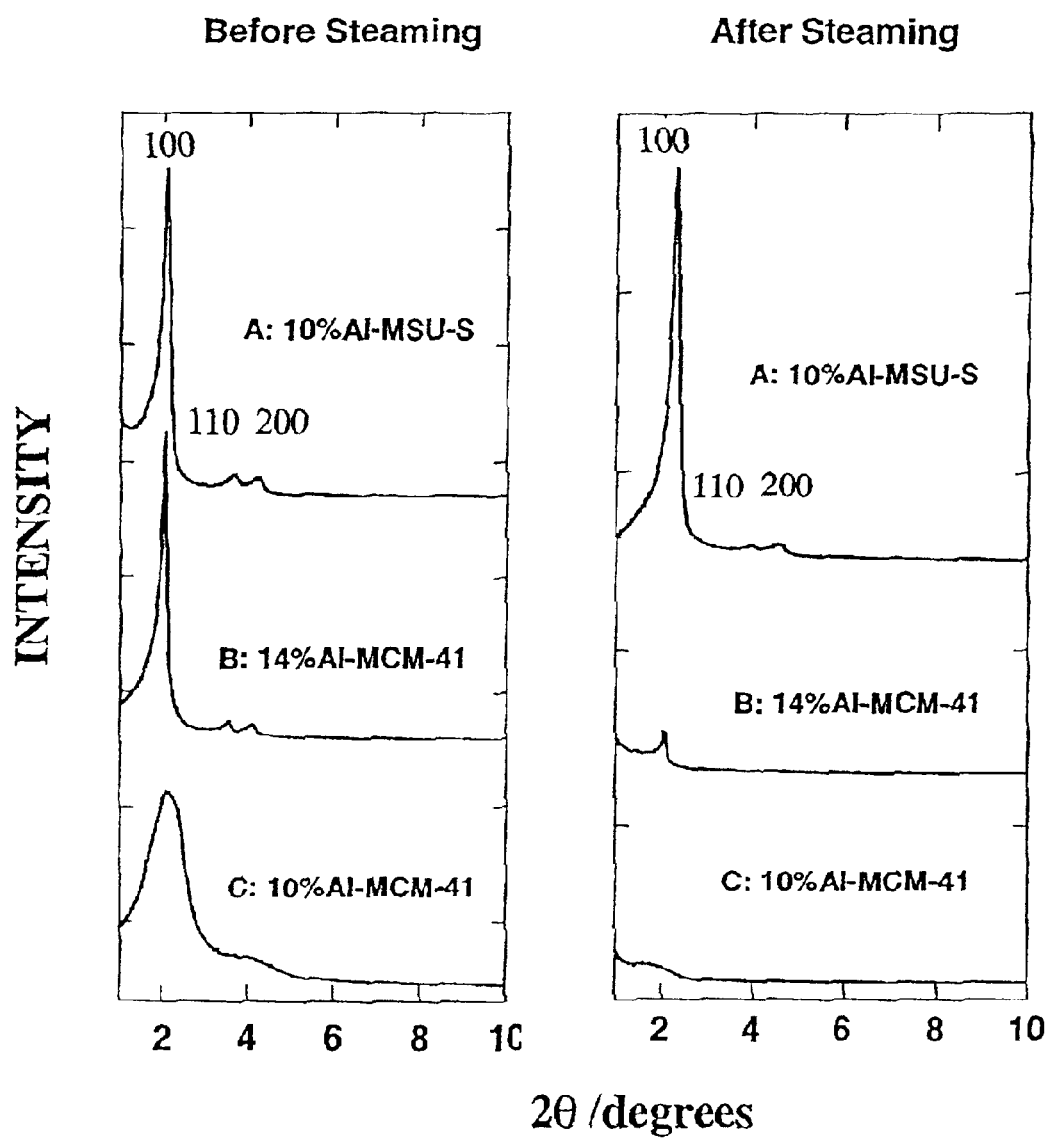
FIGS. 12A and 12B provide XRD patterns of calcined (540° C., 7 h) mesoporous aluminosilicate molecular sieves before (12A) and after (12B) exposure to 20 vol % steam in nitrogen at 800° C. for 5 h): (A) hexagonal 10% Al-MSU-S prepared from zeolite Y seeds; (B) "ultrastable" hexagonal 14% Al-MCM-41 prepared by the grafting method of Mokaya (Angew. Chem. Int. Ed., 38 No. 19, 2930 (1999)); (C) disordered 10% Al-MCM-41 prepared by direct synthesis from conventional silicate and aluminate precursors. The intensity scale is the same for the samples before and after steaming. The BET surface areas and pore volumes observed before and after exposure to steam at 800°, along with the hexagonal unit cell parameters are provided in Table 1.

FIGS. 12A and 12B illustrate the XRD patterns of the following calcined aluminosilicate mesostructures before and after steaming in 20% steam at 800° C. for 5 hr: 10% Al-MSU-S from zeolite Y seeds (Example 15), 10% Al-MCM-41 from conventional precursor (Example 16). Included in FIGS. 12A and 12B are the corresponding patterns for 14% Al-MCM-41 prepared as described in Example 14 using the very recently reported post-synthesis grafting reaction between a sodium-free MCM-41 silica and $Al_{13}$ oligocations (R. Mokaya, Angew. Chem. Int. Ed., 38, 2930 (1999)). This latter grafted form of Al-MCM-41 has been described as being hydrothermally "ultrastable" in comparison to all previously reported Al-MCM-41 derivatives. The XRD patterns of calcined 10% Al-MSU-S and ultrastable 14% Al-MCM-41 prior to steaming show well expressed hkl diffraction lines indicative of a hexagonal mesostructure. The diffraction lines for 10% Al MCM-41, made by the direct synthesis route of Example 16, are substantially broadened. This broadening of the diffraction lines is indicative of the disorder that normally accompanies the direct assembly of Al-MCM-41 from conventional aluminate and silicate precursors, particularly when the intended level of silicon substitution by aluminum in the framework is greater than about 8 mole %.

Figures 13A, 13B:
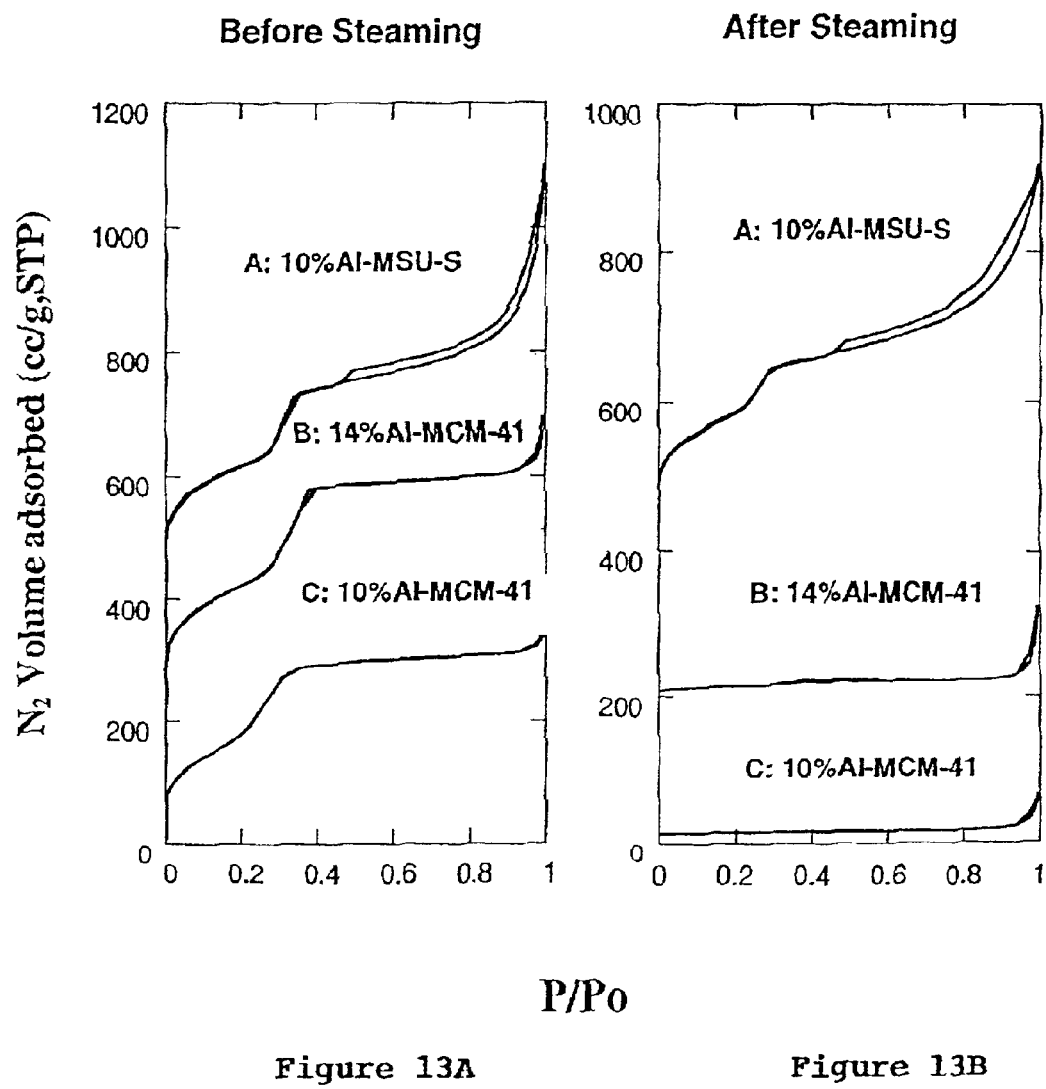
FIGS. 13A and 13B provide the N$_2$ adsorption/desorption isotherms for calcined (540° C., 7 h) mesoporous aluminosilicate molecular sieves before (13A) and after (13B) exposure to steam (20 vol % H$_2$O in N$_2$) at 800° C. for 5 h: (A) hexagonal 10% Al-MSU-S; (B) "ultrastable" 14% Al-MCM-41 prepared by the grafting method of Mokaya; (C) 10% Al-MCM-41 prepared by direct synthesis from conventional precursors. Isotherms are offset by 200 cc/g for clarity.

The XRD patterns in FIG. 12B clearly indicate that the 10% Al-MSU-S mesostructure assembled from nanoclustered zeolite seeds retains a well ordered hexagonal structure upon steaming at 800° C. In comparison, the Al-MCM-41 mesostructures prepared both by direct assembly from conventional silicate and aluminate precursors and by so called ultrastable grafting reaction are almost totally destroyed by steaming. These observations are supported by a comparison of the $N_2$ sorption isotherms shown in FIGS. 13A and 13B for the same series of mesostructures. The surface areas, framework pore sizes, and pore volumes derived from these sorption isotherms are provided in Table 1. Included in the table are the hexagonal unit cell parameters obtained from the XRD patterns of the samples. Values in parenthesis in Table 1 report the percent retention of the surface area and framework pore volume values after steaming in comparison to the values before steaming.

TABLE 1

Textural properties of calcined mesoporous aluminosilicate molecular sieves before and after steaming in 20% steam in nitrogen at 800° C. for 5 hours.

| Sample | Unit Cell Dimension, $a_o$ (Å) | Surface Area ($m^2$/g) | Pore Vol. (cc/g) | Pore Dia. (Å) |
|---|---|---|---|---|
| 10% Al-MSU-S (Example 15); | | | | |
| Before Steaming | 48.6 | 713 | 0.56 | 32.1 |
| After Steaming | 44.5 | 652 (91%) | 0.42 (75%) | 30.3 |
| 14% Al-MCM-41 (Example 14): | | | | |
| Before Steaming | 49.6 | 760 | 0.58 | 29.8 |
| After Steaming | — | 62 (8%) | 0.07 (12%) | |
| 10% Al-MCM-41 (Example 16): | | | | |
| Before Steaming | 45.5 | 721 | 0.53 | 33.4 |
| After Steaming | — | 31 (4%) | 0.03 (6%) | — |

The 10% Al-MSU-S sample of Example 15 retains more than 90% of its surface area and about 75% of its framework pore volume after steaming. In addition, the steam treatment improves the textural porosity of the mesostructure as evidenced by the hysteresis behavior at partial pressures above 0.50. In contrast, little or no surface area or framework pore volume is retained after steaming for either of the two Al-MCM-41 samples prepared according to Examples 14 and 16.

The unique hydrothermal stability of 10% Al-MSU-S from zeolite Y seeds is attributed in part to the retention of a zeolite-like connectivity of $AlO_4$ and $SiO_4$ tetrahedra upon assembling the zeolite seeds into a mesostructure. Also, the occluded carbon plays a role in contributing to the structural stability, because samples that are calcined for longer times at 541° C. or at higher temperatures to remove more carbon exhibited a somewhat larger loss in surface area and pore volume upon steaming. However, in support of the importance of a zeolite-like connectivity of $SiO_4$ and $AlO_4$ units in the framework walls, the $^{27}Al$ chemical shift of tetrahedral aluminum in as-made and calcined Al-MSU-$S_H$ occurs at δ=60 ppm, the same value as the seeds solution and within the 59–65 ppm range observed for most zeolites (Lippma, E., et al., J. Am. Chem. Soc. 108 1730 (1986)). This chemical shift value is unique among aluminosilicate mesostructures. All previously reported mesostructured aluminosilicates, including the Al-MCM-41 samples of the present work, exhibit a chemical shift of 53–56 ppm. On the basis of the relationship between $^{27}Al$ chemical shift and the mean bond angle in framework aluminosilicates provided by Lippma et al. (J. Am. Chem. Soc., 108, 1730 (1986)), the mean Al—O—Si angle is substantially smaller (by –8 degrees) for the 10% Al-MSU-$S_H$ of Example 15 than for the two Al-MCM-41 prepared as described in Examples 14 and 16.

EXAMPLE 17

Figure 14:
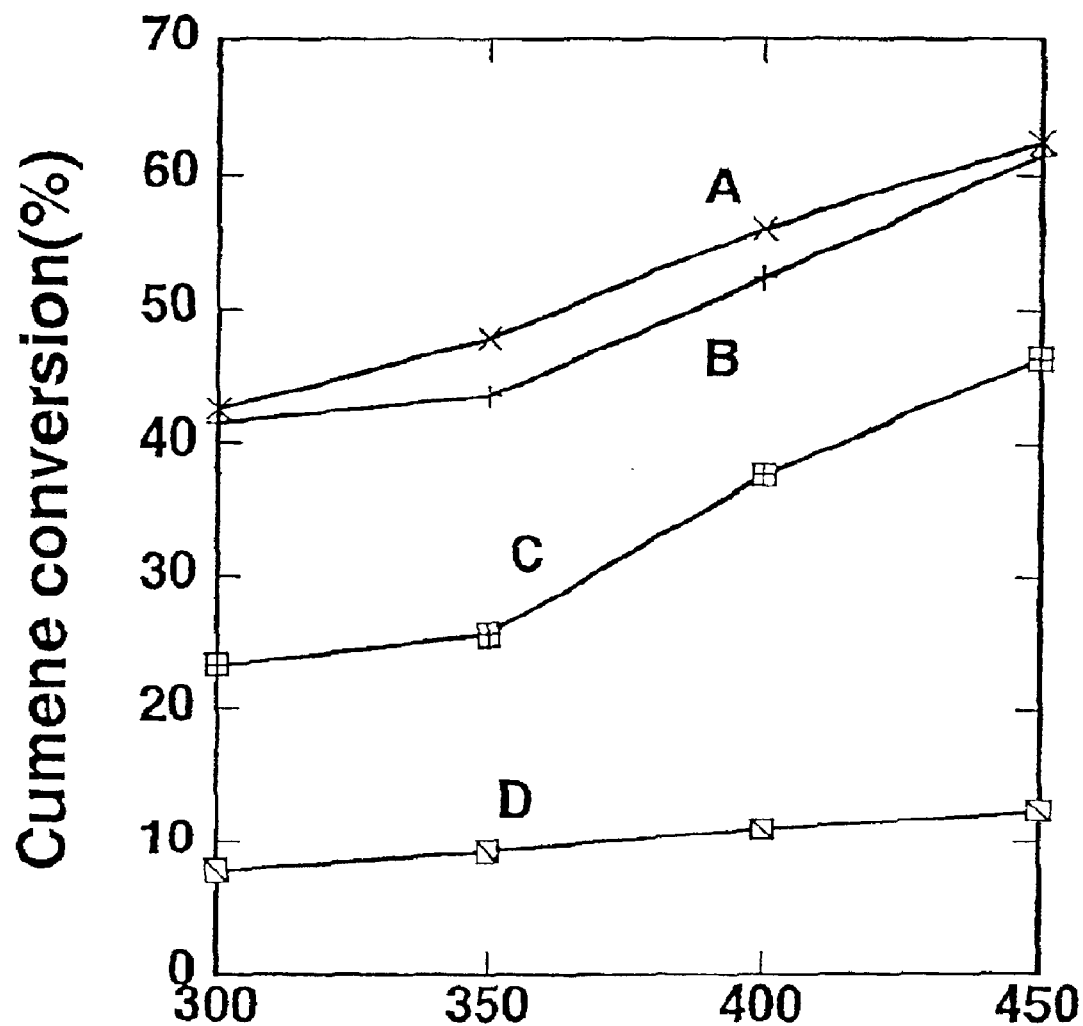
FIG. 14 is a graph showing cumene conversions over mesoporous aluminosilicates in the temperature range 300–450° C.: (A and C) conversions obtained for calcined and steamed samples of 10% Al-MSU-S, respectively; B and D) conversions for calcined and steamed samples, respectively, for 10% Al-MCM-41 prepared by direct synthesis. Reaction conditions: 6 mm i.d. fixed bed quartz reactor; 200 mg catalyst; cumene flow rate, 4.1:mol/min; N$_2$ carrier gas, 20 cc/min; conversions reported after 30 min on steam.

The acidic properties of hexagonal 10% Al-MSU-S, prepared from zeolite Y seeds according to the procedure described in Example 15, for cumene cracking over the temperature range 300–450° C. are compared in FIG. 14 with those of 10% Al-MCM-41 assembled according to Example 16 from conventional aluminate and silicate precursors. Although the two calcined mesostructures are nearly equivalent in activity, 10% Al-MSU-S is a far more active catalyst after exposure to steam. This result illustrates the potential importance of nanoclustered zeolite seeds as precursors for the design of hydrothermally stable mesostructures for catalytic applications.

The use of zeolite seeds as precursors for the assembly of steam stabile aluminosilicates mesostructures is not limited to compositions containing 10 mol % aluminum. Using the general methodology of this example, we also have used zeolite Y seeds to prepare hexagonal Al-MSU-S compositions containing 38 mol % Al with retention of the structural, steam stability, and acidic properties found for 10% Al-MSU-S. In addition, the approach is not limited to the use of type Y zeolite seeds, as illustrated in the following example.

EXAMPLE 18

Example 18 utilizes ZSM-5 (also known as MFI-type) zeolite seeds templated by tetrapropylammonium ions to form a hexagonal 2% Al-MSU-S aluminosilicate molecular sieve with superior hydrothermal stability. In contrast to the Al-MSU-S compositions reported in Examples 4, 5, 6, and 8 where the $^{27}Al$ MAS NMR chemical shifts are well within the zeolitic range of 57–65 ppm, the $^{27}Al$ MAS NMR shift observed for the product of this example was equivalent to the shift found for the initial ZSM-5 seed precursor and comparable to the shifts typically found for aluminosilicate mesostructures assemble from conventional aluminate and silicate precursors (53–56 ppm). However, the resulting mesostructure showed an infrared absorption band indicative of the presence of ZSM-5 type secondary building blocks in the framework walls. The presence of a stable, zeolite-like framework wall structure for the product of this example was verified by a hydrothermal stability to both steam and boiling water. Seeds made from TEOS are not as good as those made from fumed silica.

Tetraethylorthosilicate (6.83 g) was added with stirring to 7.22 ml of 1.0 M tetrapropylammonium hydroxide and then 0.17 g of aluminum sec-butoxide was added to form a clear solution. A 75-ml portion of water was added to the stirred solution, and the solution was allowed to age at 85° C. overnight (16 hr) under static conditions to form a clear solution of ZSM-5 zeolite seeds. A 2.45-g portion of cetyltrimethylammonium bromide then was added under vigorous stirring for 30 minutes, and the resulting mixture was allowed to age at 100° C. under static conditions overnight (16 h). The pH of the reaction mixture was lowered to a value of 9.0 by the addition of 1.0 M sulfuric acid and the reaction mixture was aged again overnight at 100° C. under static conditions. The mesostructured precipitate was filtered, washed, dried in air and then calcined at 550° C. to remove the surfactant. The X-ray powder diffraction pattern of the calcined 2% Al-MSU-S product exhibited four diffraction lines (100, 110, 200, 210) consistent with a hexagonal mesostructure. The $^{27}Al$ MAS NMR spectrum of the calcined product exhibited a single resonance line at 55 ppm, consistent with the same linked $AlO_4$ tetrahedral environment as in ZSM-5 seeds (see the $^{27}Al$ MAS NMR spectrum for ZSM-5 seeds in FIG. 2).

Figure 15:
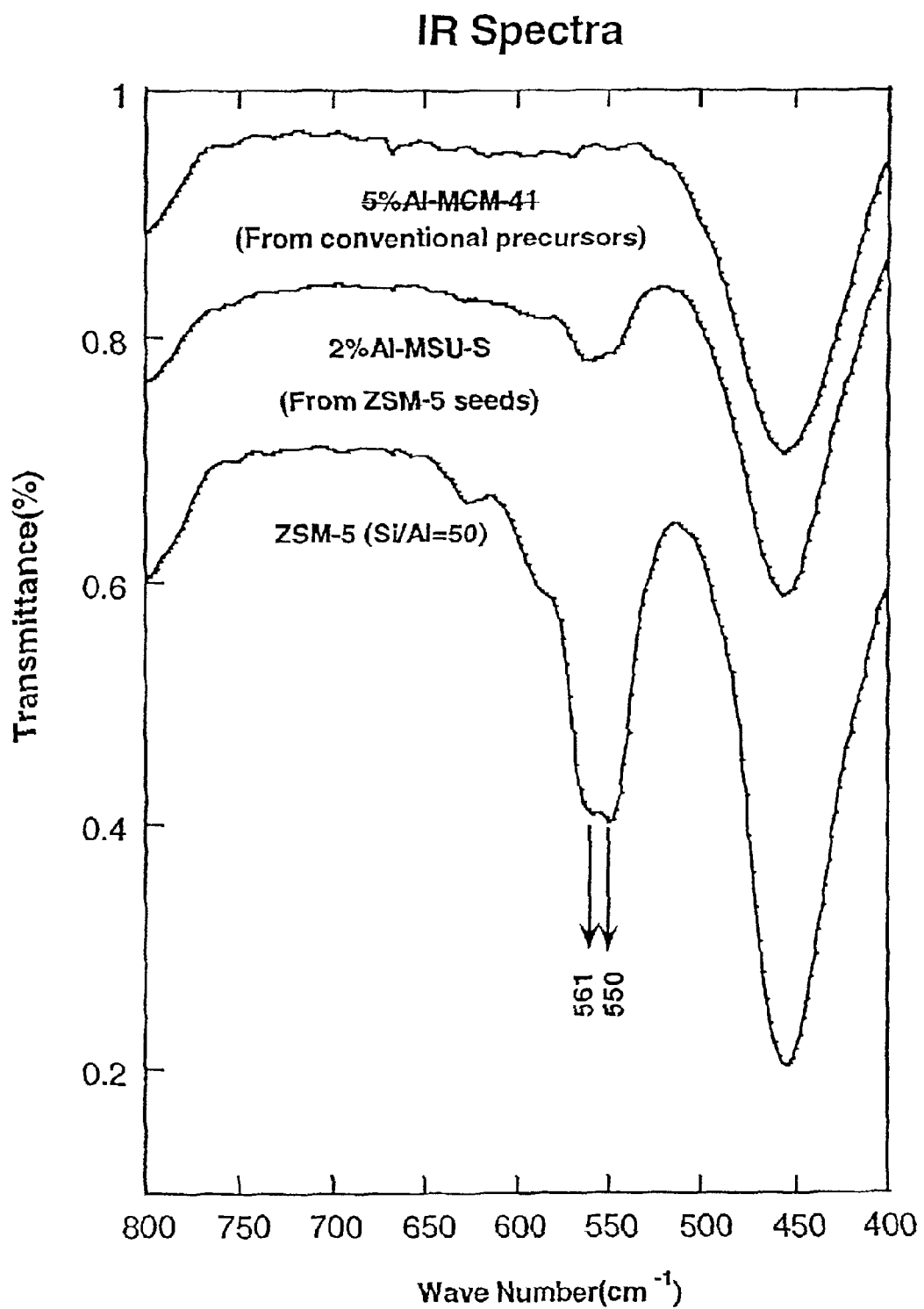
FIG. 15 provides the infrared absorption spectra in the region 400 to 800 cm$^{-1}$ for 5% Al-MCM-41 prepared from conventional precursors and for 2% Al-MSU-S prepared from zeolite ZSM-5 seeds. Included for comparison is the spectrum of an authentic sample of ZSM-5.

Further evidence for a protozeolitic framework wall structure was obtained from the infrared absorption spectrum of the calcined 2% Al-MSU-S mesostructure. As shown in FIG. 15, absorption bands between 500 and 600 $cm^{-1}$, consistent with the presence of secondary 5-membered ring sub-units, are observed. Secondary 5-membered ring sub-units are a characteristic feature of crystalline pentasil zeolites, a family of zeolites that includes ZSM-5 zeolite. Thus, we conclude that the walls of the mesostructure contain the sub-units of a pentasil zeolite, even though the walls lack the atomic crystallinity of a zeolite. Included in FIG. 15 for comparison purposes are the infrared spectra for an authentic sample of 2% Al-ZSM-5 zeolite and for a disordered hexagonal 5% Al-MCM-41 assembled from conventional aluminate and silicate precursors. The same bands between 500–600 cm$^{-1}$ were found for the ZSM-5 zeolite, but the 5% Al-MCM-41 made from conventional precursors does not show these zeolite-like absorption bands.

Kloetstra et al (Chem. Commun., 2281 (1997)) have reported a hexagonal aluminosilicate mesostructure which on the basis of IR bands between 500 and 600 cm$^{-1}$ also contains 5-membered ring structures analogous to the secondary building blocks of ZSM-5 zeolite. This material was prepared by exchanging a conventional Al-MCM-41 with tetrapropylammonium ions and subsequently heating the exchanged mesostructure in glycerol to convert some of the framework into embryonal ZSM-5 units. However, we find upon repeating this work that the mesostructure of Kloetstra et al is hydrothermally unstable. Boiling the material in water for 5 hours or exposing it to 20% steam in nitrogen stream at 600° C. for 5 hours results in nearly the complete loss of framework mesoporosity. In contrast, the hexagonal 2% Al-MSU-S of Example 18 retains nearly all of its framework mesoporosity under these conditions, Thus, the introduction of ZSM-5 type building blocks into the framework walls of MCM-41 by the method of Kloetstra appears to be localized to specific regions of the framework adjacent to tetrapropylammonium cations, whereas the use of zeolite seeds as precursors according to Example 18 affords a more uniform framework of protozeolitic connectivity of SiO$_4$ and AlO$_4$ units and, hence, greatly improved hydrothermal stability.

EXAMPLE 19

This example demonstrates that preparation of zeolite seeds for the assembly of hydrothermally stable aluminosilicate mesostructures is not limited to the use of sodium silicate precursor solutions containing 27 wt % SiO$_2$, 14 wt % NaOH. Sodium silicate solutions containing higher ratios of silica to sodium hydroxide are also suitable for forming the zeolite seeds needed for the supramolecular assembly of hydrothermally stable aluminosilicate mesostructures.

Example 19 illustrates the use of a sodium silicate solution containing 28.43 wt % SiO$_2$ and 8.93 wt % NaOH for preparing zeolite type Y nucleating centers (seeds) and the subsequent use of these zeolite seeds for preparing an aluminosilicate mesostructure with a zeolite-like $^{27}$Al MAS NMR chemical shift in the range 57 to 65 ppm. The method used to prepare the seeds follows the general procedure provided by Vaughan (U.S. Pat. No. 4,178,352) for a zeolite Y seeds composition containing 35 mole % aluminum (Si/Al=1.88). A NaOH aqueous solution containing 1.013 mole NaOH and 7.6 mole H$_2$O was prepared and 0.54 mole NaAlO$_2$ was added to this NaOH solution under stirring until a clear solution formed. To this basic sodium aluminate solution was added 1.0 mole of sodium silicate (28.43% SiO$_2$, 8.93 wt % NaOH, 41 degree, Be',) in 6.6 mol H$_2$O under vigorous stirring. The product set to a stiff gel within 2 minutes after mixing was completed. This gel contains type Y zeolite seeds or nucleation centers. In order to form a steam-stable mesoporous aluminosilicate the zeolite Y seeds, 127 mol H$_2$O was added. To the diluted mixture was added sequentially 0.5065 mole H$_2$SO$_4$ and 0.20 mole CTAB under stirring at room temperature for 30 minutes. The resultant mixture was further acidified with 0.15 mole H$_2$SO$_4$ and aged at 100° C. for 20 h. The mixture then was acidified with 0.029 mole H$_2$SO$_4$ under vigorous stirring and aged at 100° C. again for 20 h to obtain the as-made aluminosilicate mesostructure. The as-made mesostructure were washed thoroughly with water and dried in air. The product was calcined at 540° C. for 7 h to remove the surfactant. The calcined product exhibited a single XRD line consistent with a wormhole framework structure and denoted wormhole 35% Al-MSU-S from zeolite Y seeds. The corresponding XRD basal spacing was about 5.0 nm. The chemical shift for the calcined product was 59 ppm, within the 57–65 ppm range expected for a hydrothermally stable aluminosilicate mesostructure assembled from zeolite Y seeds.

EXAMPLE 20

This example also illustrates the formation of a disordered aluminosilicate mesostructure from zeolite Beta seeds using TEOS (tetraethylorthosilicate) as the silica source.

Tetraethylammonium hydroxide (TEAOH) was used as the template for zeolite Beta seeds formation (J. Perez-Pariente, J. A. Martens and P. A. Jacobs, Applied Catalysis, 31, 35, 1998). TEAOH (0.00665 mol) was mixed with NaAlO$_2$ (0.0005 mol) in 1.2 mol H$_2$O under stirring to obtain a clear solution at ambient temperature. Then TEOS (0.0333 mole) was added to obtain an opaque solution under stirring. The solution was aged at 35° C. for 100 h to produce a cloudy Zeolite Beta seeds solution. To the solution at 35° C. was added 0.00823 mol CTAB at 35° C. under stirring. The resultant mixture was aged at 100° C. in a Teflon-lined autoclave for 2 days. The solid product was filtered, washed with hot water and dried at room temperature. The surfactant was removed by calcination at 550° C. for 4 h. The XRD exhibited a single diffraction line corresponding to a spacing of 3.8 nm and a weak shoulder, as expected for a wormhole structure or a distorted hexagonal structure.

The IR spectra of the TEOS-derived Beta zeolite seeds and the resulting mesostructure formed from these seeds exhibited an IR band near 550–560 cm$^{-1}$, indicating the presence of 5-membered ring subunits. However, the broadness of the XRD pattern indicated that TEOS is less preferred than fumed silica (see Example 21 below) in forming zeolite Beta seeds for the assembly of aluminosilicate mesostructures with well-expressed hexagonal framework symmetry. This does not preclude TEOS from being generally useful as a precursor for forming zeolite seeds, suitable for the assembly of steam stable zeolites. For instance, the mesostructure obtained in this example was stable to 20% steam at 600° C. for 5 hr., retaining at least 88% of the surface areas and framework pore volumes observed before steaming.

EXAMPLE 21

This example illustrates the preferred use of fumed silica for the preparation of pentasil zeolite seeds and the use of these seeds for the formation of well ordered aluminosilicate mesostructures that are steam stable in comparison to aluminosilicate solutions which have not been templated by a structure-directing agent for the formation of zeolite seeds. Although the supramolecular assembly of steam stable MSU-S aluminosilicate mesostructures is quite general and can be formed from any protozeolitic aluminosilicate solution, the pentasil zeolite seeds, especially zeolite ZSM-5 (MFI) and Beta (BEA) seeds, are especially preferred when formed from fumed silica. As will be shown by the steam stability tests of this example hexagonal MSU-S mesostructures formed from these protozeolitic seeds are stable to exposure to 20% steam at 600–800° C. for substantial periods of time. Also, these structures have superior activity for acidic catalysis in comparison to hexagonal aluminosilicate mesostructures formed from conventional aluminosilicate precursors.

Aqueous solutions of nanoclustered ZSM-5 and Beta zeolite seeds (Si/Al=67) were prepared using tetrapropylammonium (TPA$^+$) and tetraethylammonium (TEA$^+$), respectively, as a templates (Camblor, et al., Stud. Surf. Sci. Catal. 105 341 (1997); deMoor et al., J. Phys. Chem. 13 103 1639 (1999)). For comparison purposes, conventional aluminosilicate anions were prepared using tetramethylammonium ions (TMA$^+$) in place of TPA$^+$ and TEA$^+$. TMA$^+$ is not known to function as a template for MFI or BEA zeolite seeds.

An aqueous solution of nanoclustered ZSM-5 seeds (Si/Al=67) was prepared by the reaction of 1.0 M tetrapropylammonium (TPA$^+$) hydroxide (6.7 mmol), sodium aluminate (0.50 mmol, Strem Chemicals, Inc.) and fumed silica (33.3 mmol, Aldrich Chemicals) in water (1270 mmol) at 50° C. for 18 h. The same stoichiometric ratio of tetraethylammonium (TEA$^+$) hydroxide, sodium aluminate, fumed silica and water was used to prepare a solution of zeolite Beta seeds at 100° C. A conventional aluminosilicate precursor solution was prepared using the same experimental methodology except that TMA$^+$ was used in place of TPA$^+$ and TEA$^+$.

Figure 16:
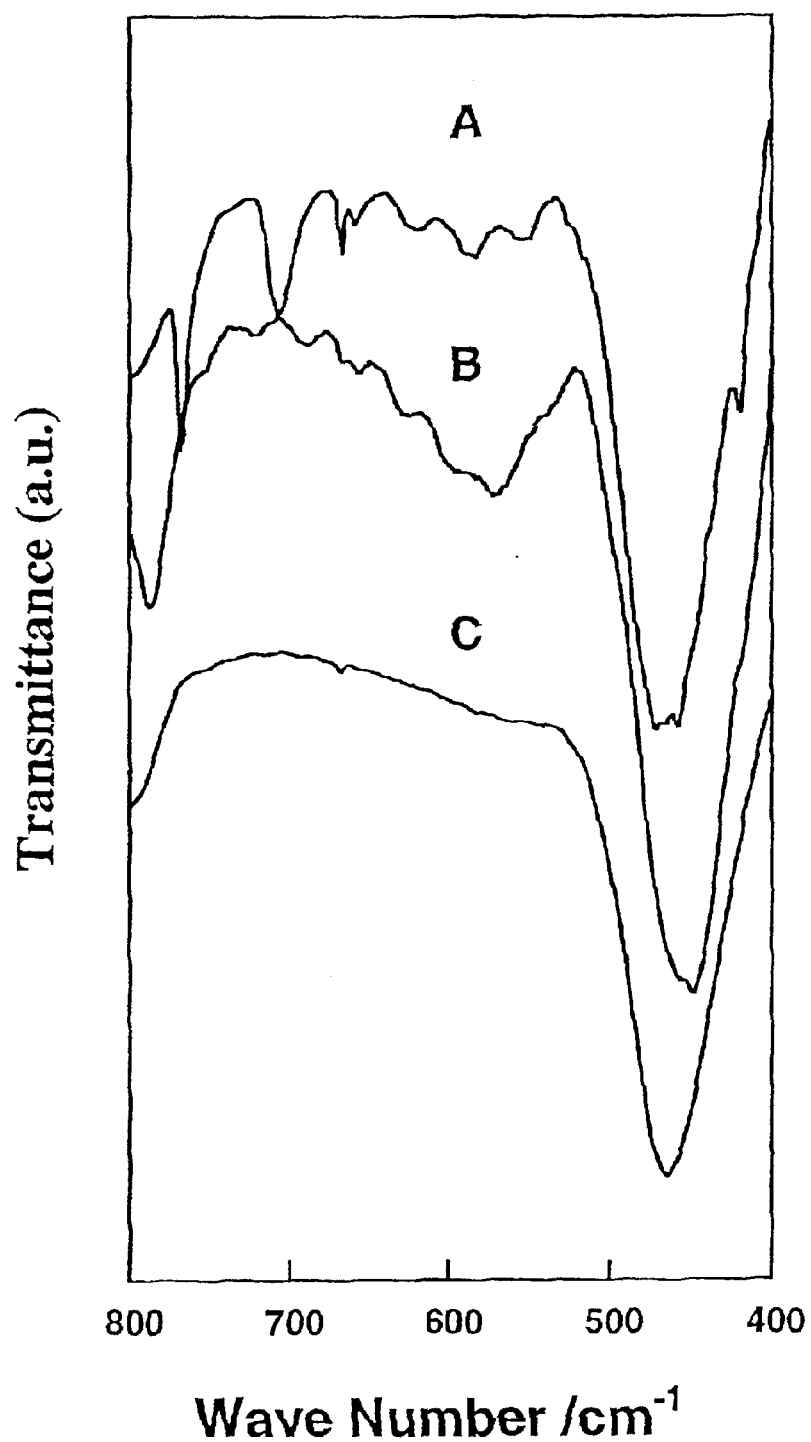
FIG. 16 is a graph showing IR spectra (KBr) of powdered forms of (A) zeolite ZSM-5 seeds prepared in the presence of TPA$^+$ as template (B) zeolite Beta seeds prepared from TEA$^+$ as template and (C) conventional aluminosilicate anions prepared using TMA$^+$ in place of TPA$^+$ or TEA$^+$.

The evaporation of each of the aluminosilicate solutions afforded powders with amorphous X-ray diffraction patterns. However, as shown in FIG. 16, the IR spectra of the powdered forms of the MFI and BEA zeolite seeds revealed distinct vibrations between 500–600 cm$^{-1}$. In contrast, no IR bands were observed in this range for the conventional aluminosilicate anions formed when TMA$^+$ hydroxide was used in place of TPA$^+$ or TEA$^+$ hydroxide. A band near 550 cm$^{-1}$ in pentasil ZSM-5 and Beta zeolites is indicative of the presence of five-membered rings. Thus, the presence of an analogous band in the case of the TPA$^+$ and TEA$^+$ aluminosilicate precursors verifies the presence of pentasil zeolite seeds.

Hexagonal aluminosilicate mesostructures, generally denoted MSU-S$_H$ from ZSM seeds and MSU-S$_H$ from Beta seeds, were assembled by reaction of the respective zeolite seeds solutions with cetyltrimethylammonium bromide (CTAB) at a surfactant to silica ratio of 0.25 at a temperature of 150° C. for 2 days. An equivalent procedure was used to assemble the conventional TMA$^+$ aluminosilicate precursors into a disordered MCM-41 mesostructure. The as-made products were calcined at 550° C. to remove surfactant, treated with 0.1M NH$_4$NO$_3$ at room temperature to displace exchangeable sodium ions, and then calcined again at 550° C. to convert NH$_4^+$ at exchange sites to protons. Chemical analysis indicated the absence of occluded carbon and a Si/Al ratio in agreement with the ratio contained in the initial zeolite seeds.

Figure 17:
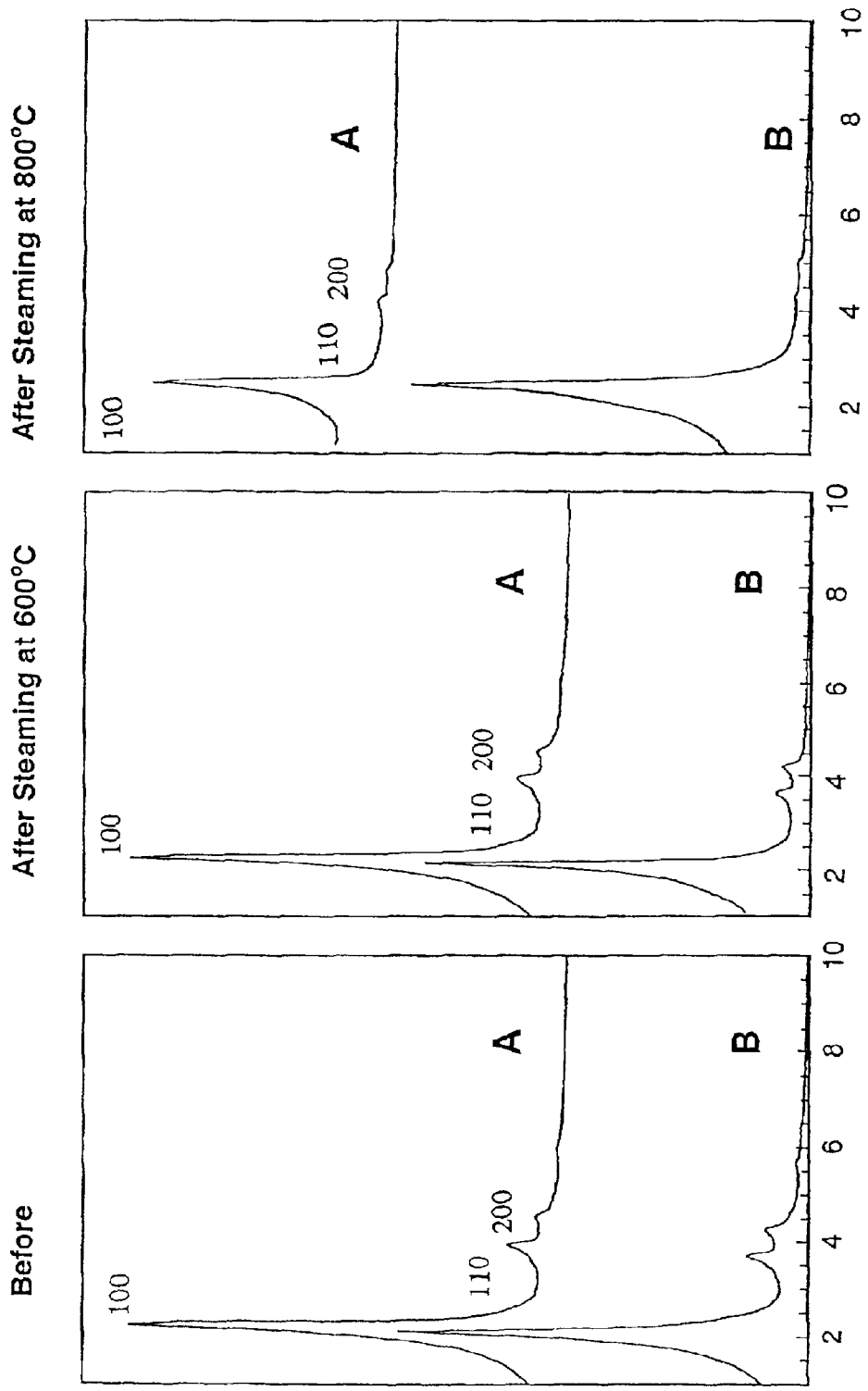
FIGS. 17A, 17B and 17C are graphs showing XRD patterns of calcined (550° C., 4 h) mesoporous aluminosilicate molecular sieves before (A) and after (B) exposure to 20% steam at 600° C. and 800° C. for 5 h: (A) hexagonal 1.5% Al-MSU-S$_{(MFI)}$ prepared from zeolite ZSM-5 seeds; (B) hexagonal 1.5% Al-MSU-S, prepared from zeolite Beta seeds. The intensity scale is the same for the samples before and after steaming. Hexagonal unit cell parameters are provided in Table 2.

FIG. 17 illustrates the XRD patterns of calcined 1.5% Al-MSU-S from ZSM-5 seeds) and 1.5% Al-MSU-S from Beta seeds) before and after exposure to 20% (v/v) water vapor in N$_2$ at 600 and 800° C. for 5 h. The XRD results clearly indicate that mesostructures retain hexagonal order upon steaming. The disordered 1.5% Al-MCM-41 also retained long range structural order after exposure to steam at 600° C., but at 800° C. the mesostructure was almost completely lost. (XRD patterns not shown). The disorder initially associated with the 1.5% Al-MCM-41 sample was not responsible for the loss of long range order. Even well-ordered Al-MCM-41 samples with four hexagonal hkl reflections exhibit a loss of mesostructure upon steaming at 800° C.

Figure 18:
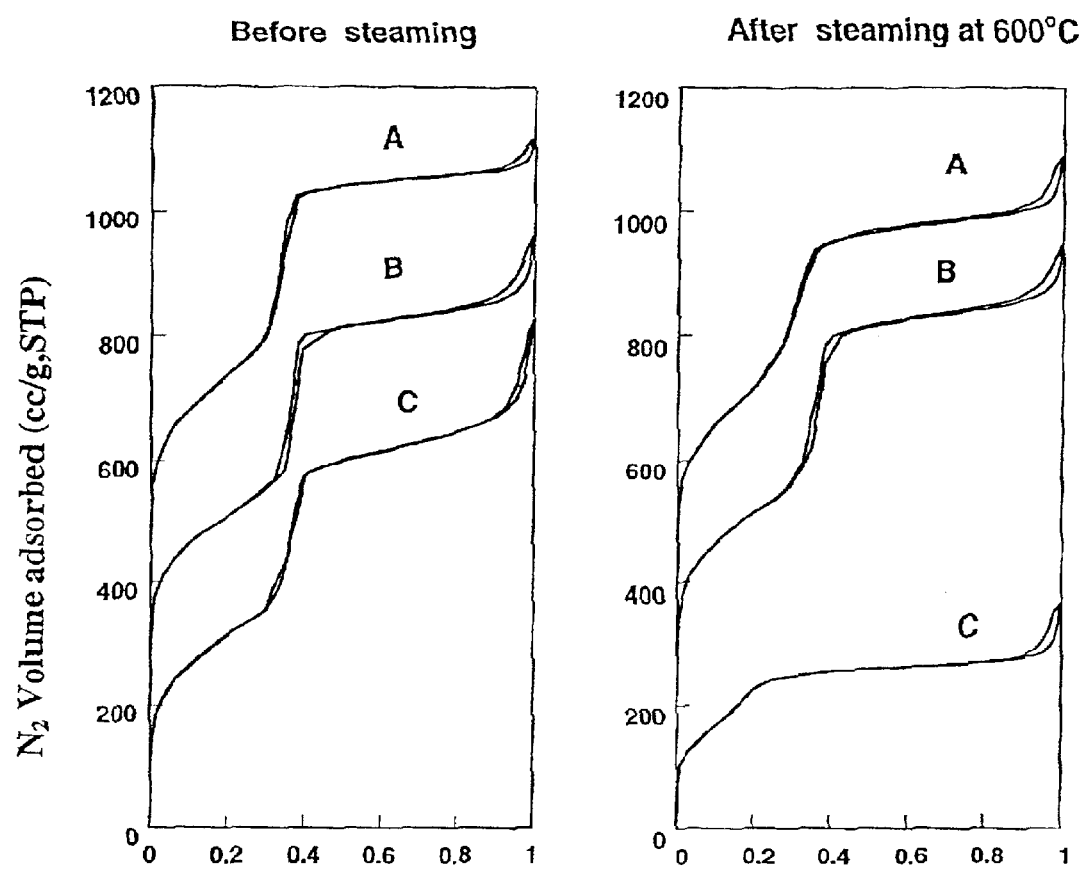
FIGS. 18A and 18B are graphs showing N$_2$ adsorption/desorption isotherms for calcined (550° C., 5 h) hexagonal mesoporous aluminosilicate molecular sieves before and after steaming (20 vol % H$_2$O in N$_2$, 600° C., 5 h): (A): 1.5% Al-MSU-S from zeolite ZSM-5 seeds (B): 1.5% Al-MSU-S from zeolite beta seeds; (C): 1.5% Al-MCM-41 from conventional precursors. The isotherms are offset by 200 cc/g for clarity.

FIG. 18 provides the N$_2$ sorption and adsorption isotherms for the two calcined MSU-S mesostructures before and after exposure to 20% steam at 600° C. in comparison are the isotherms for 1.5% Al-MCM-41 formed from tetramethylammonium hydroxide (TMAOH), sodium aluminate and fumed silica. Table 2 lists the surface areas, framework pore sizes, and pore volumes before and after exposure to steam at 600° and 800° C. The 1.5% Al-MSU-S$_H$ from ZSM-5 seeds and 1.5% Al-MSU-S$_H$ from Beta seeds mesostructures retain more than 95% of their surface areas and more than 87% of their framework pore volumes with little or no pore contraction after exposure to steam at 600° C. In contrast, 1.5% Al-MCM-41 assembled from conventional aluminosilicate anions retains only 63% of its surface area and 36% of its framework pore volume under equivalent steaming conditions. The MSU-S aluminosilicate mesostructures assembled from ZSM-5 and Beta zeolite seeds retain long range hexagonal order upon exposure to steam at 800° C., as judged by XRD (c.f., FIGS. 17A, 17B). In addition, a substantial fraction of the surface area and framework pore volume is retained after exposure to 20% steam at 800° C. As shown by the results presented in Table 2, after an exposure time of 2 h the MSU-S mesostructures experienced minor decreases in surface areas and retain at least 50% of the framework pore volume. After an exposure time of 5 h at 800° C., the pore volume dropped below 50% of the initial framework pore volume. In contrast, the mesostructured framework of 1.5% Al-MCM-41 is completely lost under these conditions.

TABLE 2

Textural and acid catalytic properties of mesoporous aluminosilicate sieves before and after steaming.

| Sample | Unit cell Dimension, a$_o$ (Å) | Surface area (m$^2$/g) | Pore Vol. (Cc/g) | Pore dia. (Å) | Cumene conv.[a] (%) |
|---|---|---|---|---|---|
| 1.5% Al-MSU-S from ZSM-5 seeds | | | | | |
| Calcined | 45.3 | 1231 | 1.06 | 36.8 | 32.3 |
| Steamed 600° 5 h | 44.5 | 1192 | 0.93 | 34.7 | — |
| Steamed 800° 2 h | — | 1130 | 0.62 | 30.6 | — |
| Steamed 800° 5 h | 36.6 | 849 | 0.44 | 24.3 | — |
| 1.5% Al-MSU-S from Beta seeds | | | | | |
| Calcined | 47.3 | 1124 | 1.06 | 39.1 | 31.5 |
| Steamed 600° 5 h | 46.7 | 1065 | 0.94 | 38.0 | — |
| Steamed 800° 2 h | — | 1050 | 0.68 | 35.0 | — |
| Steamed 800° 5 h | 37.0 | 885 | 0.46 | 26.4 | — |
| 1.5% Al-MCM-41[b] | | | | | |
| Calcined | 46.4 | 1013 | 1.08 | 38.7 | 11.7 |
| Steamed 600 5 h | 35.2 | 639 | 0.39 | 20.1 | — |
| Steamed 800 5 h | — | 55 | — | — | — |

[a]Reaction conditions: 6 mm i.d. fixed bed quartz reactor; 200 mg catalyst; cumene flow rate, 4.1 μmol/min; N$_2$ carrier gas, 20 cc/min; conversions reported after 60 min on-stream.
[b]1.5% Al-MCM-41 was prepared by direct assembly of conventional aluminosilicate anions formed from fumed SiO$_2$, NaAlO$_2$, and TMAOH.

The supramolecular assembly of steam stable MSU-S mesostructures from zeolite ZSM-5 and Beta seeds is not limited to a specific loading of aluminum in the framework.

Pentasil zeolite seeds also can be used to assemble steam stable MSU-S mesostructures with Si/Al ratios in the range ~300–20. We have found that a MSU-S derivative assembled from faujasitic zeolite type Y seeds, denoted hexagonal MSU-S from zeolite Y seeds, retains nearly all of its pore structure after exposure to 20% steam at 800° C. for several hours. Zeolite Y seeds, however, are only obtainable at much lower Si/Al ratios (typically in the range ~2.5–10). Other zeolite seeds, such as Linde Type A (or Type A zeolite) seeds are expected to provide mesostructures with Si/Al ratios of 1.0. It is well known according to Lowenstein's rule that zeolite compositions avoid Si/Al ratios less than 1.0. Ammonium ion exchange of the mesostructures formed from zeolite Y seeds could be accomplished in the presence of the surfactant.

Depending upon calcination conditions to remove the surfactant, the resulting mesostructure assembled from zeolite Y seeds may contain occluded carbon in the framework mesopores. This occluded carbon, which is presumed to form through cracking of the surfactant during calcination, modifies the surface polarity and makes the framework walls more resistant to hydrolysis. The as-made mesostructures formed from ZSM-5 and Beta zeolite seeds, however, have the great advantage of providing steam-stable compositions with much higher Si/Al ratios (Si/Al~300–20). Also, mesostructures formed from pentasil zeolite seeds can be calcined to remove the surfactant and subsequently $NH_4^+$-exchanged without the loss of long range order or the occlusion of carbon. This implies that these mesostructures derived from pentasil zeolite seeds are less acidic in comparison to mesostructures derived from zeolite type Y seeds, and their steam stability is not dependent on the presence of carbon on the framework walls.

$^{27}Al$ MAS NMR measurements indicate that more than 90% of the aluminum centers in calcined 1.5% Al-MSU-S and 1.5% Al-MSU-S are in tetrahedrally coordinated sites, as judged from the intensity of the tetrahedral resonance near 53 ppm in comparison to a very weak octahedral resonance near 0 ppm.

In association with the tetrahedral siting of aluminum, Bronsted acidity was verified by the cumene cracking activity of these steam-stable mesostructures. Cumene conversions for calcined forms of 1.5% Al-MSU-S from ZSM-5 seeds, 1.5% Al-MSU-S from Beta seeds, and 1.5% Al-MCM-41 at 300° C. are included in Table 2. Clearly, the Al-MSU-S derivatives are far more active acid catalysts than the Al-MCM-41 prepared from conventional aluminosilicate precursors.

Figure 19:
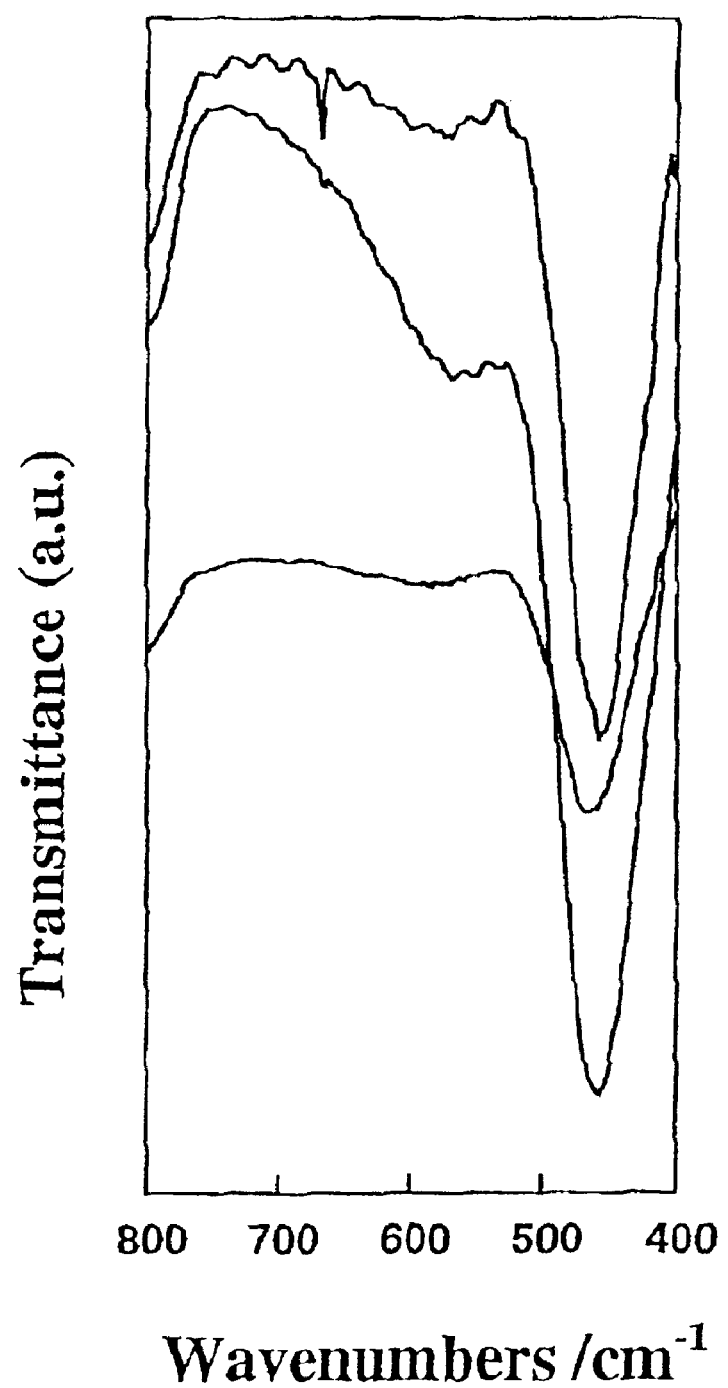
FIG. 19 is a graph showing IR spectra of calcined hexagonal mesostructures: (A) 1.5% Al-MSU-S assembled from zeolite ZSM-5 seeds; (B) 1.5% Al-MSU-S assembled from zeolite Beta seeds; and (C) 1.5% Al-MCM-41 formed from conventional aluminosilicate precursors.

It was concluded on the basis of the above example that the substantial improvement in both the hydrothermal stability and catalytic activity is due to a zeolite-like connectivity of $AlO_4$ and $SiO_4$ tetrahedra in framework walls of the aluminosilicate mesostructures. Evidence for the retention of a zeolitic seeds structure in the framework walls of calcined MSU-S from ZSM-5 seeds and MSU-S from Beta seeds mesostructures was provided by the retention of the same 5-membered ring IR absorption bands found for the initial zeolite seeds. Compare, for example, the IR spectra in FIG. 19 for the calcined 1.5% Al-MSU-S and 1.5% Al-MCM-41 mesostructures with the spectra in FIG. 16 for the initial aluminosilicate precursors. The band characteristics of five-membered rings is well-expressed in the spectra of MSU-S from ZSM-5 seeds and MSU-S from Beta seeds, but not for the MCM-41 derivative.

Improvements in the steam stability and acidity for aluminosilicate mesostructures can be anticipated through the incorporation of other families of zeolitic seeds in the framework walls. Future studies can be expected to focus on this very promising approach to the supramolecular assembly of steam-stable derivatives.

EXAMPLE 22

The purpose of this Example was to show that steam stable aluminosilicate mesostructures can be assembled from a mixture of zeolite Y seeds and conventional sodium silicate as the silica source. The advantage of this methodology is in part that it allows for the preparation of stable structured aluminosilicate compositions with Si/Al ratios greater than or about equal to 10 from a zeolite Y seeds composition that normally is prepared at Si/Al ratios less than 10. The structure directing surfactant used in this example was PLURONIC 123, illustrating further that a non-ionic surfactant can be used in place of an onium ion surfactant.

A 15% Al zeolite Y seeds composition (Si/Al=5.67) was prepared according to the methodology described in Example 2. To 0.6 ml 0.6M NaOH solution, 0.00074 mol $NaAlO_2$ was added under stirring, then 0.0042 mol sodium silicate (27% $SiO_2$, 14% NaOH) was added under vigorous stirring until a homogeneous opalescence gel was formed. To obtain the zeolite Y seeds composition, the gel was sequentially aged at ambient temperature (18 hr) and then at 100° C. overnight (20 hr). To the seeds solution was added 25 ml $H_2O$ and 0.0328 mol sodium silicate (27% $SiO_2$, 14% NaOH) under stirring. The resultant mixture contained 2 mol % Al or a Si/Al ratio of about 49.

The surfactant solution was prepared by adding 2.4 g PLURONIC 123 to 40 ml $H_2O$ under stirring for 12 hr. The above zeolite seeds solution was added to the surfactant solution and the pH of the mixture was adjusted to a value in the range 5.5~6.5 (as judged using Hydrion pH indicator paper) by the dropwise addition of 1:10 (vol:vol) $H_2SO_4$:water. The reaction mixture was stirred at 50° C. for 40 h. The final product was recovered by filtration, washed with water and air dried. The surfactant was removed by calcination at 600° C. for 4 h. A steam stability test of the sample, denoted MSU-S, was performed at 800° C. for 2 h in 20% steam.

Figure 20:
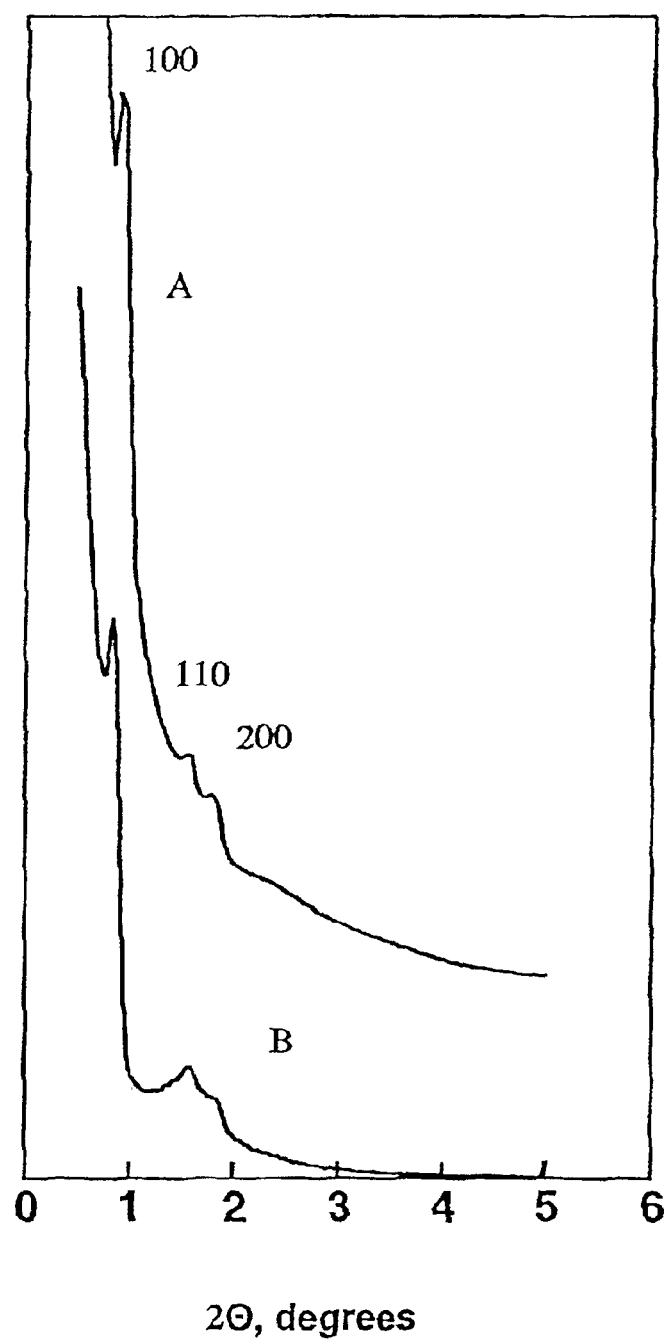
FIG. 20 is a graph showing XRD patterns of a hexagonal MSU-S aluminosilicate mesostructure (Si/Al=49) before (A) and after (B) steaming at 800° C. for 2 h. The composition was prepared from a mixture of zeolite Y seeds (Si/Al=5.67) and sodium silicate in the presence of PLURONIC P123™ surfactant.

FIG. 20 illustrates the XRD patterns of the calcined MSU-S sample before and after steaming. The XRD results clearly indicate that product retains a well ordered hexagonal structure upon steaming at 800° C.

Figure 21:
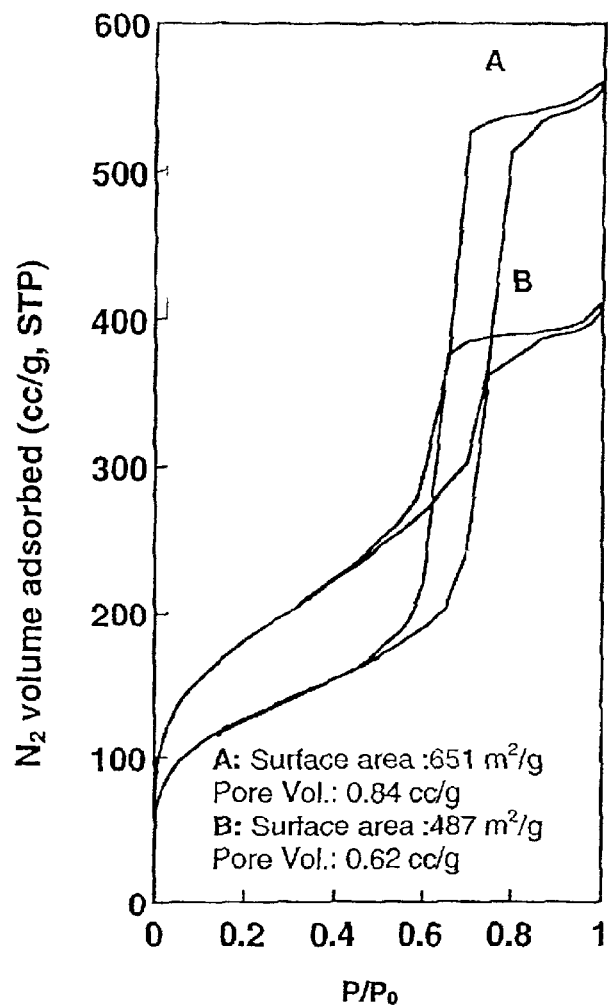
FIG. 21 is a graph showing $N_2$ adsorption and desorption isotherms of a MSU-S aluminosilicate mesostructure (A) before and (B) after steaming at 800° C. for 2 h. The composition was assembled from a mixture of zeolite Y seeds and sodium silicate in presence of PLURONIC P123™ surfactant.
Figure 21A:
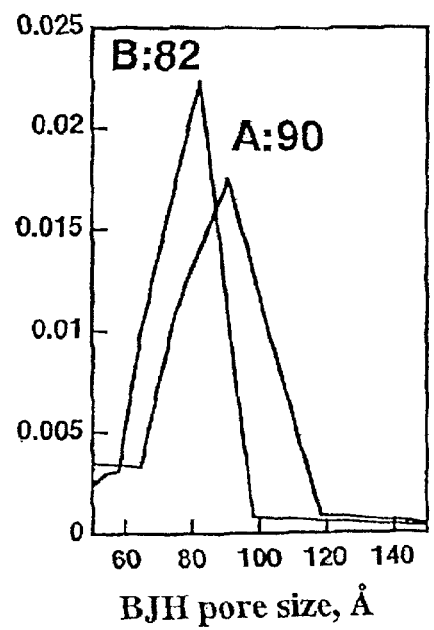
FIG. 21A shows the pore size.

FIG. 21 shows the $N_2$-adsorption and desorption isotherm of the mesostructure before and after steaming at 800° C., 2 h.

EXAMPLE 23

The purpose of this Example was to show that a structured aluminosilicate composition (Si/Al=49) with a framework pore size greater than 10 nm can be assembled from a mixture of zeolite Y seeds and conventional sodium silicate in the presence of a non-ionic polyethylene oxide surfactant (PLURONIC 123) and an alcohol (1-butanol) as a co-surfactant.

A mixture of zeolite Y seeds and conventional sodium silicate containing 2 mole % Al (Si/Al-49) was prepared as described in Example 22. The surfactant solution was prepared by adding 2.4 g PLURONIC 123 and 2.4 g 1-butanol to 40 ml $H_2O$ under stirring for 12 hours. To the surfactant solution was added the aluminosilicate solution. The pH of the mixture was adjusted to be in the range 5.5~6.5 by addition of 1:10 (vol:vol) $H_2SO_4$:water. The reaction mixture was stirred at 50° C. for 40 h then kept at 100° C. for 20 h under static conditions. The product was recovered by filtration, washed and air dried. The surfactant was removed by calcination at 600° C. for 4 h.

Figure 22:
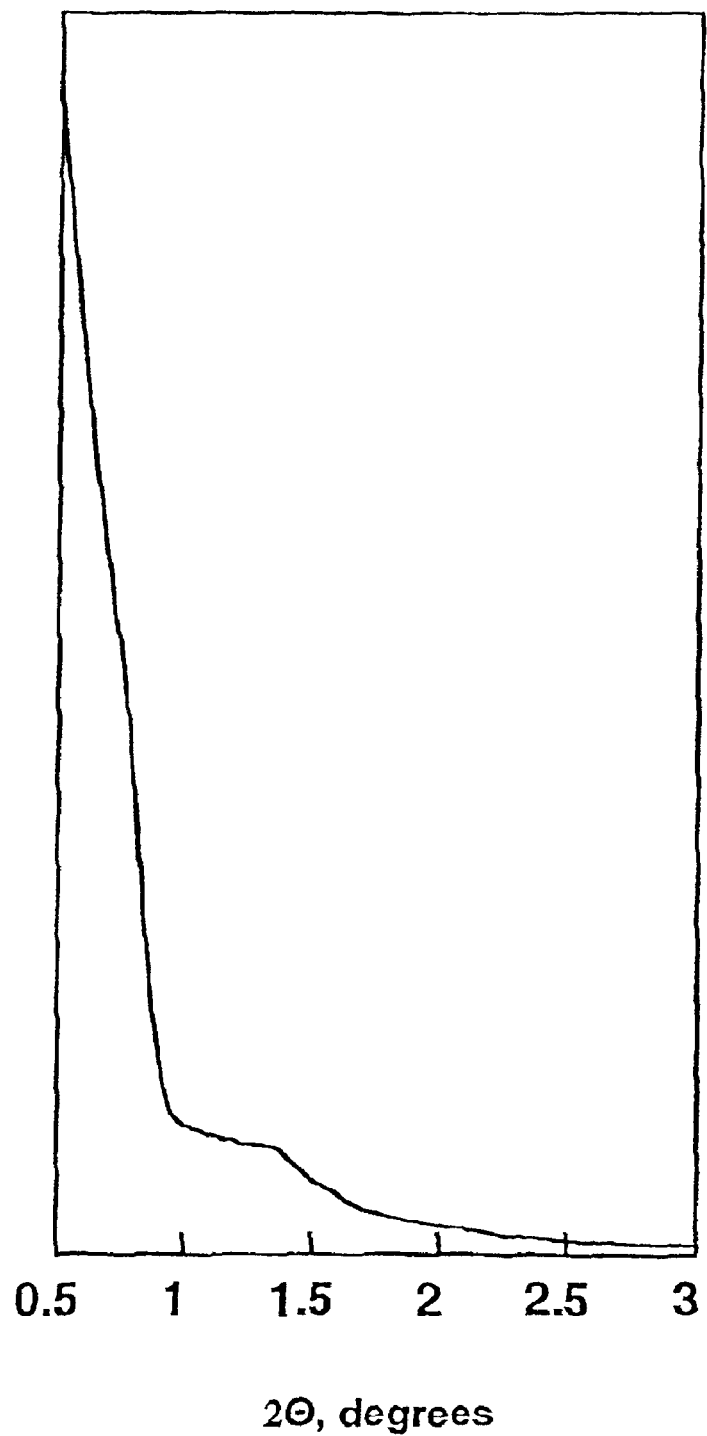
FIG. 22 is a graph showing XRD patterns of the calcined product of Example 23.
Figure 23:
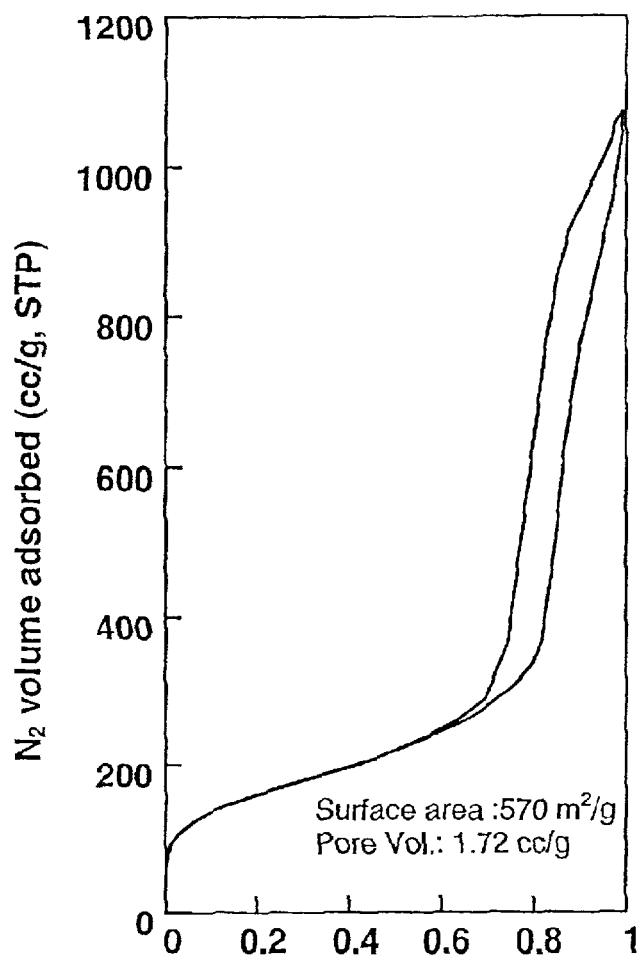
FIG. 23 is a graph showing $N_2$ adsorption and desorption isotherms of the calcined product of Example 23.
Figure 23A:
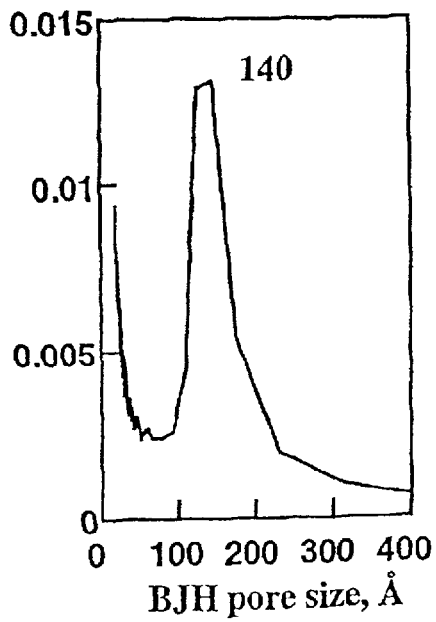
FIG. 23A shows the pore size.

FIG. 22 shows the XRD patterns of the calcined product. FIG. 23 shows the $N_2$-adsorption and desorption isotherm of the calcined product.

EXAMPLE 24

The purpose of this Example was to demonstrate the preparation of a structured large pore aluminosilicate composition with Si/Al ratio of 5.67 from zeolite Y seeds in the presence of a triblock non-ionic surfactant containing a polypropylene oxide (PPO) and polyethylene oxide (PEO) segments in the sequence PEO-PPO-PEO and in the presence of a co-surfactant (1-dodecanol).

A zeolite Y seeds composition containing 15 mole % Al was prepared according to the methodology of Example 2. To 5 ml 0.6 M NaOH solution, was added 0.0058 mol $NaAlO_2$ under stirring. Then 0.0328 mol sodium silicate (27% $SiO_2$, 14% NaOH) was added under vigorous stirring until a homogeneous opalescence gel was formed. To obtain the final zeolite seeds composition, the gel was sequentially aged at ambient temperature and then at 100° overnight. The zeolite Y seeds composition was then diluted with 25 ml $H_2O$.

A mixture of surfactant and co-surfactant was prepared by adding 2.4 g PLURONIC 123 and 2.0 g 1-dodecanol to 40 ml $H_2O$ under stirring. After 12 hours stirring, to the surfactant solution was added the zeolite Y seeds solution. The pH of the mixture was adjusted to a value in the range 5.5–6.5 (ad judged from Hydrion pH indicator paper) by the addition of 1:10 (vol:vol) concentrated $H_2SO_4$:water. The reaction mixture was stirred at 45° C. for 20 h then kept at 100° C. for 2 h statically. The final product was recovered by filtration, washed and air dried. The surfactant was removed by calcination at 600° C. for 4 hr.

Figure 24:
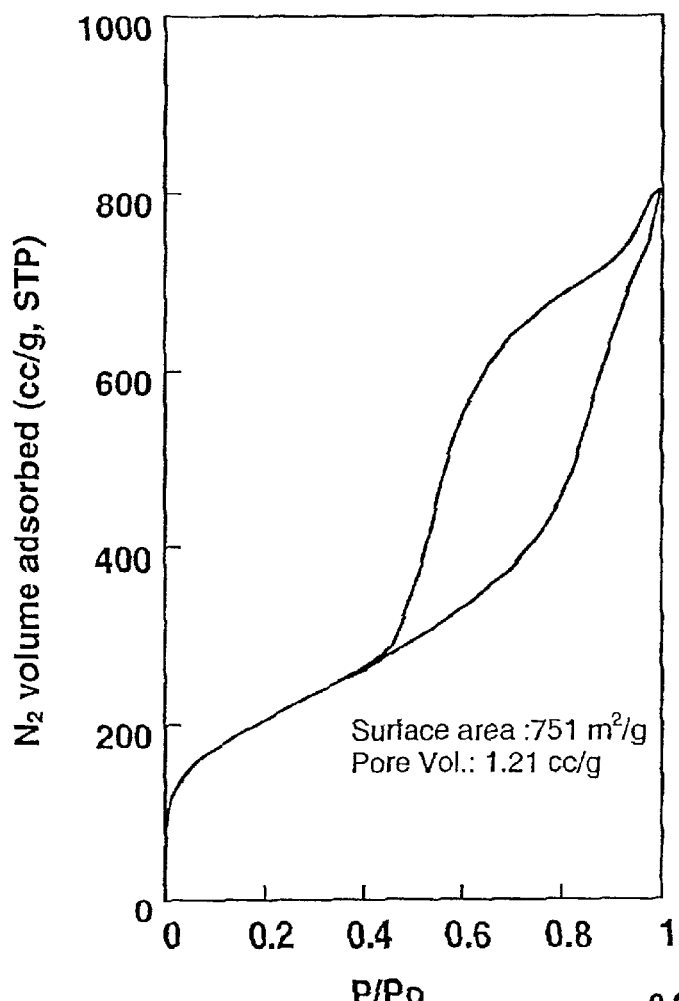
FIG. 24 is a graph showing $N_2$ adsorption and desorption isotherms of the calcined product of Example 24.
Figure 24A:
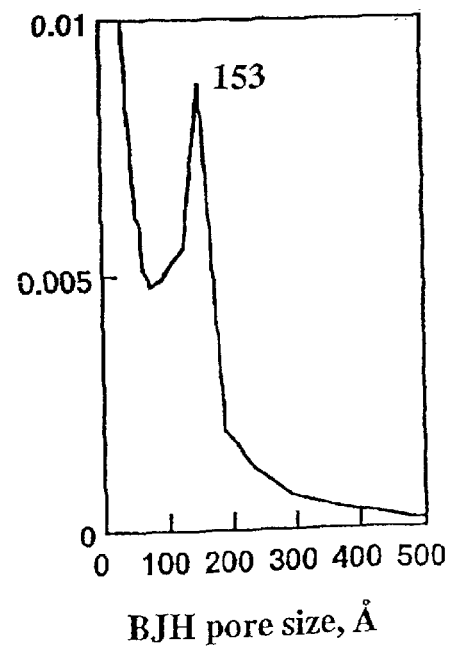
FIG. 24A shows the pore size.

FIG. 24 shows the $N_2$-adsorption and desorption isotherm of the calcined product.

EXAMPLE 25

The purpose of this Example was to show that very large pore aluminosilicate compositions with a cellular foam framework structure can be assembled from a mixture of zeolite seeds and conventional sodium silicate precursors.

Two zeolite seeds solutions containing 2 mole % and 5 mole % aluminum were prepared according to the general method of Example 22 from a mixture of zeolite Y seeds (15 mole % Al) and sodium silicate.

The surfactant solution was prepared by adding 2.4 g PLURONIC 123 to 40 ml $H_2O$ under stirring. After 12 hours trimethylbenzene was added to form an emulsion. To the emulsion, was added one of the above seeds solution (2 mole % aluminum) and the pH value was adjusted to a value in the range 5.5–6.5 with 1:10 (vol:vol) concentrated $H_2SO_4$:water. An analogous procedure was used to prepare a second reaction mixture using the seeds solution containing 5 mole % aluminum. The reaction mixtures were stirred at 45° C. for 20 h, then kept under static conditions at 100° C. for 20 h. The final product was recovered by filtration, washed and air dried. The surfactant was removed by calcination at 600° C. for 4 h.

Figure 25:
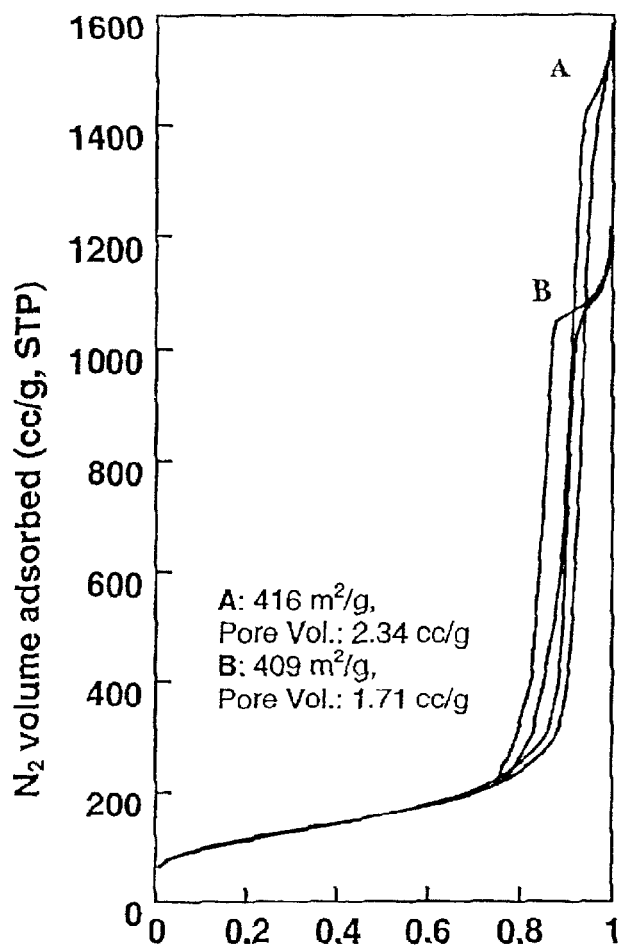
FIG. 25 is a graph showing $N_2$ adsorption and desorption isotherms of aluminosilicate compositions of the calcined aluminosilicate compositions of Example 25 with cellular foam framework structures containing (A) 2 mole % Al and (B) 5 mole % Al.
Figure 25A:
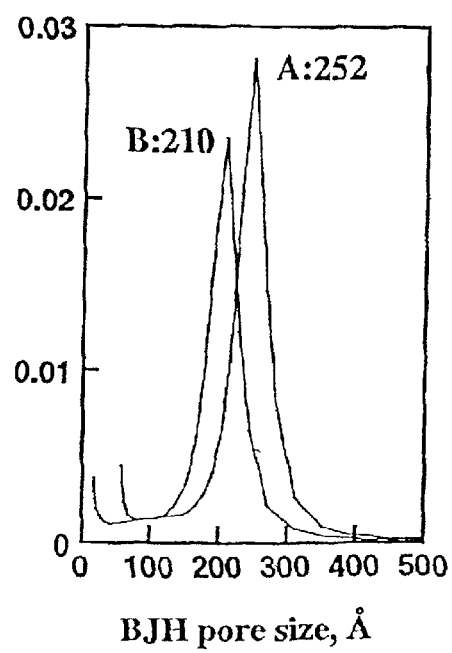
FIG. 25A shows the pore size.

FIG. 25 shows the $N_2$-adsorption and desorption isotherm of the calcined compositions containing 2% and 5% Al. FIG. 25A shows the corresponding pore size distributions.

EXAMPLE 26

The purpose of this Example was to show the assembly of steam stable large pore aluminosilicate compositions with cellular foam framework structures using pentasil zeolite seeds and an emulsion formed from a non-ionic polyethylene oxide surfactant (PLURONIC 123) and an aromatic organic co-surfactant (trimethylbenzene) as the structure director.

An aqueous solution of nanoclustered pentasil zeolite ZSM-11 seeds (also known as MEL) with a Si/Al ratio of 67) was prepared by the reaction of 40% tetrabutylammonium hydroxide ($TBA^+$) solution as the seeds structure director (6.7 mmol), sodium aluminate (0.50 mmol, Strem Chemicals, Inc) and fumed silica (33.3 mmol, Aldrich Chemicals) in water (2700 mmol) at 130° C. for 3 h.

The surfactant solution was prepared by adding 2.4 g PLURONIC 123 to 30 ml $H_2O$ under stirring. After 12 hours stirring, to the surfactant solution was added trimethylbenzene to form an emulsion. To the emulsion was added the above seeds solution and the pH was adjusted to a value of 5.5~6.5 by the addition of 1:10 (vol:vol) concentrated $H_2SO_4$:water. The reaction mixture was stirred at 45° C. for 20 hr then kept at 100° C. for 20 h statically. The final product was recovered by filtration, washed and air dried. The surfactant was removed by calcination at 600° C. for 4 h.

Figure 26:
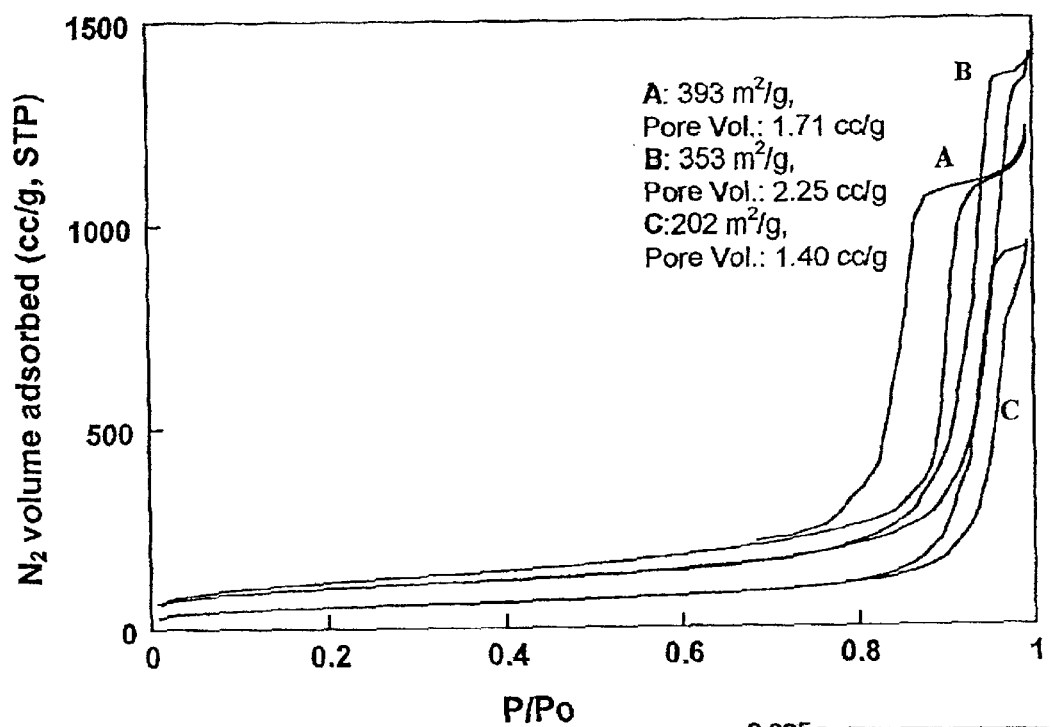
FIG. 26 is a graph showing $N_2$ adsorption and desorption isotherms of calcined aluminosilicate cellular foam composition of Example 26 (Si/Al=67) (A) after calcination in air at 600° C. and (B) after exposure to 20% steam at 600° C. for 4 h and (C)) after exposure to 20% steam at 800° C. for 2 h.
Figure 26A:
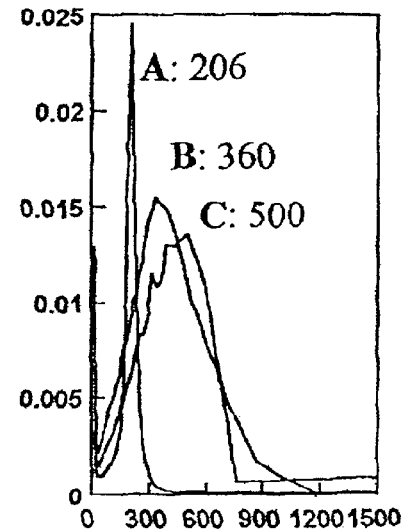
FIG. 26A shows the pore size.

FIG. 26 illustrates the $N_2$-adsorption and desorption isotherms of calcined composition before and after exposure to steam at 650° C. for 4 hours and at 800° C. for 2 hours. Note from FIG. 26A that the pore size increased from 20 to 36 and 50 nm upon steaming at 650 and 800° C., respectively.

EXAMPLE 27

The purpose of this Example was to show the assembly of steam stable aluminosilicate cellular foam structures from pentasil zeolite Beta and ZSM-5 seeds.

Aqueous solutions of nanoclustered aluminosilicate zeolite seeds (Si/Al=50) were prepared by the reaction of 6.7 mmol of 35% tetraethylammonium hydroxide (for preparation of zeolite Beta seeds) or tetrapropylammonium hydroxide (for preparation of ZSM-5 seeds), aluminum tri-sec-butoxide (0.42 mmol, Aldrich Chemicals, Inc.) and TEOS (21.2 mmol, Aldrich Chemicals) in water (330 mmol) at 100° C. for 3 h.

The surfactant solution was prepared by adding 2.4 g PLURONIC 123 to 30 ml $H_2O$ under stirring. After 12 hours stirring, to the surfactant solution was added trimethylbenzene to form an emulsion. To the emulsion was added the desired seeds solution. The pH of the mixture was adjusted to a value in the range 2~3 with 37% HCl. The reaction mixture was stirred at 35° C. for 20 h then kept at 100° C. for 20 h statically. The final product was recovered by filtration, washed and air dried. The surfactant was removed by calcination at 600° C. for 4 h.

Figures 27A, 27B:
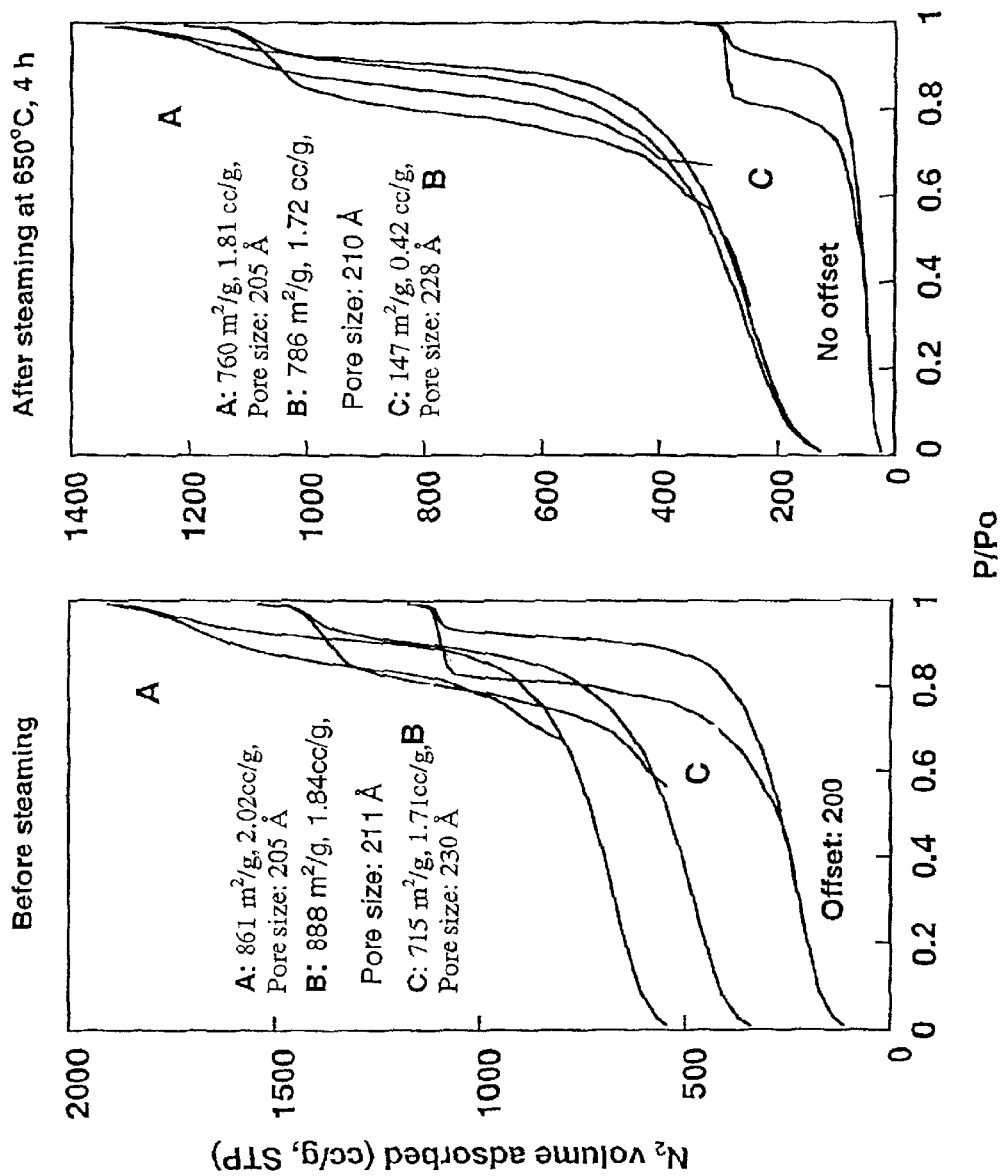
FIGS. 27A and 27B are graphs showing $N_2$ adsorption and desorption isotherms of calcined mesoporous aluminosilicate cellular foams (Si/Al=50) (FIG. 27A) before and after (FIG. 27B) exposure to 20% steam at 650° C. for 4 h: (A) prepared from ZSM-5 seeds, (B) zeolite Beta seeds and (C) conventional precursors.

FIG. 27 illustrates the $N_2$-adsorption and desorption isotherms of the calcined products before and after exposure to steam at 650° C. for 4 hours. Included for comparison is mesoporous cellular foam composition prepared from conventional precursors as described in Example 28.

COMPARATIVE EXAMPLE 28

In order to have a contrast example for our newly invented steam stable aluminosilicate compositions with a cellular foam framework, we prepared a mesocellular foam composition containing 2 mole % aluminum according to the general preparation art of Stucky and co-workers, as described in J. Am. Chem. Soc. 121: 254 (1999). PLURONIC 123 (2.0 g) was dissolved in 75 ml of 1.6 M HCl solution at ambient temperature. Trimethylbenzene (2.0 g) was added to form an emulsion. To the emulsion was added a mixture of TEOS (21 mmol) and aluminum tri-sec-butoxide (0.42 mmol). After aging 20 h at 35° C., the mixture was kept at 100° C. for 24 h. The final product was recovered by filtration, washed and air dried. Surfactant was removed by calcination at 550° C. for 8 h.

The curves labeled "C" in FIG. 27 illustrate the $N_2$-adsorption and desorption isotherm of the calcined product before and after exposure to steam (650° C., 4 h, 20% $H_2O$). It is seen that the steam stability of the product of Example 28 is greatly inferior to the stability of the product of Example 27.

It was also noted that the calcined product of Example 28 retained only 23% of its initial surface area after 250 hrs as a suspension (0.10 g/20 cc) in boiling water. In contrast, the calcined product of Example 27 retained 75% of its initial surface area after the same treatment.

EXAMPLE 29

The purpose of this Example was to show that an aluminosilicate composition with cellular foam framework porosity can be obtained from mixtures of zeolite seeds and sodium silicate as the framework precursors. PLURONIC 123 was used as the non-ionic surfactant and 1-dodecanol was the co-surfactant.

The zeolite seeds solution containing 2% Al was prepared from a mixture of zeolite Y seeds and sodium silicate using the methodology described in Example 22.

The surfactant solution was prepared by adding 2.4 g PLURONIC 123 and 2.0 g 1-dodecanol to 40 ml $H_2O$ under stirring. After 12 hours stirring the above seeds solution was added to the surfactant solution, and the pH was adjusted to a value in the range 5.5~6.5 with 1:10 (vol:vol) concentrated $H_2SO_4$:water. The reaction mixture was stirred at 50° C. for 40 h then kept at 100° C. for 20 h statically. The final product was recovered by filtration, washed and air dried. The surfactant was removed by calcination at 600° C. for 4 h.

Figure 28:
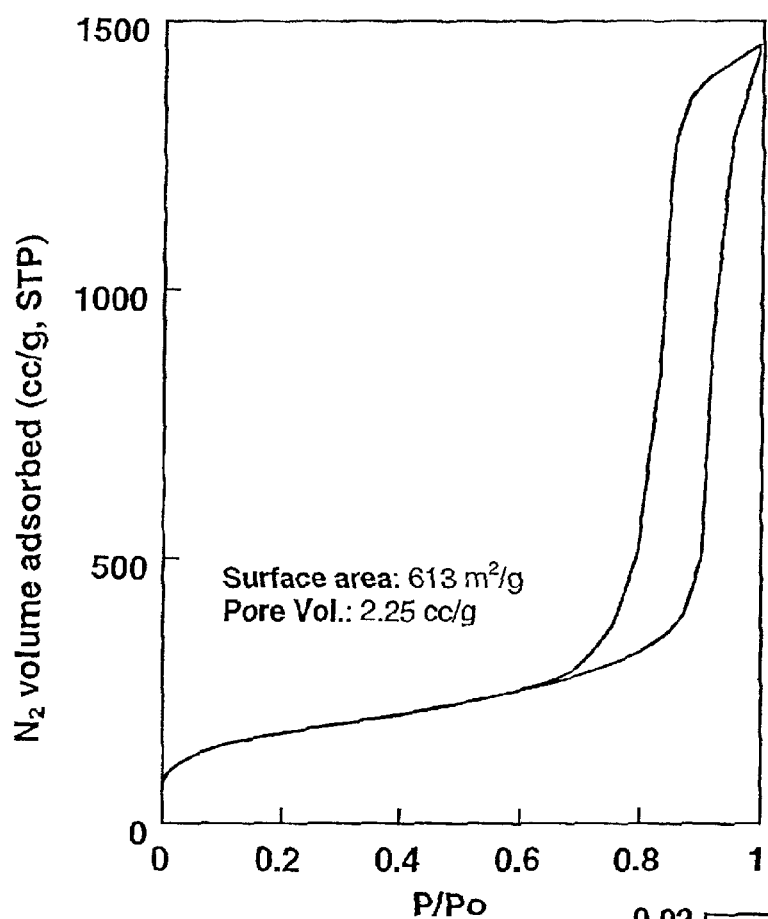
FIG. 28 is a graph showing $N_2$ adsorption and desorption isotherms of the calcined product of Example 29.
Figure 28A:
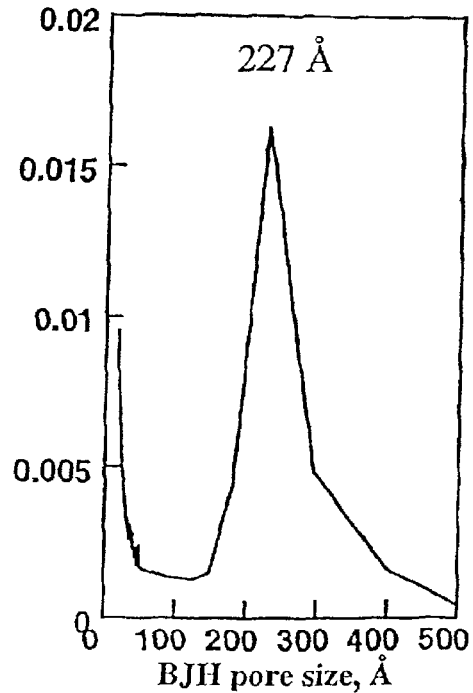
FIG. 28A shows the pore size distribution.

FIG. 28 shows the $N_2$-adsorption and desorption isotherm of the calcined product and FIG. 28A shows the framework pore size distribution.

EXAMPLE 30

The purpose of this Example was to show that a steam stable structured aluminosilicate composition with super-microporosity (1.0–2.0 nm) and a disordered wormhole framework can be assembled from zeolite seeds. Decyltrimethylammonium bromide was used as the structure directing surfactant.

Zeolite Y seeds containing 15 mole % Al were prepared according to the general method described in Example 2. To 5 ml of 0.6 M NaOH solution was added 0.0058 mol $NaAlO_2$ under stirring. Then 0.0328 mol sodium silicate (27% $SiO_2$, 14% NaOH) was added under vigorous stirring until a homogeneous opalescence gel was formed. To obtain the desired zeolite Y seeds composition, the gel was sequentially aged at ambient temperature (18 hr) and then at 100° C. overnight (20 hr) To the seeds solution was added 75 ml $H_2O$ and 0.0068 mel decyltrimethylammonium bromide under stirring at ambient temperature for 50 min. The mixture then was acidified with 0.020 mol $H_2SO_4$ under vigorous stirring and heated at 100° C. for 40 h. The final product was recovered by filtration, washed and air dried.

Treatment of the as-synthesized supermicroporous material with 0.1 M $NH_4NO_3$ at 100° C. displaced exchangeable sodium ions. The product was calcined at 550° C. for 4 h to remove the surfactant. XRD indicated the presence of one diffraction line consistent with a wormhole structure.

Figure 29:
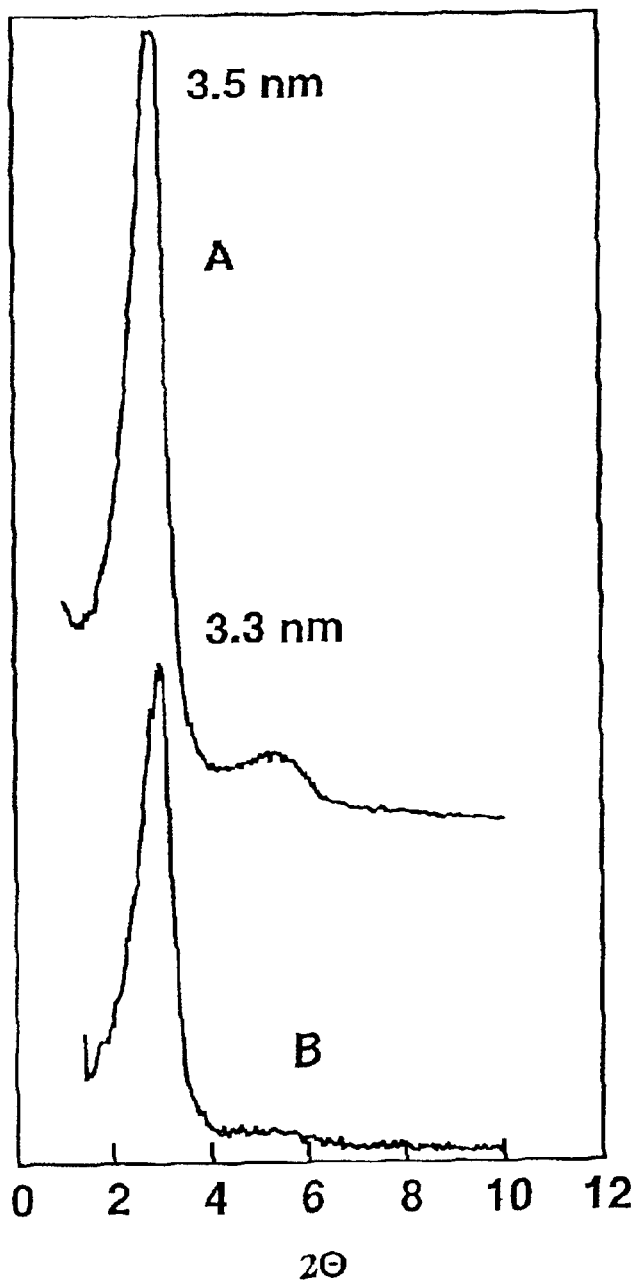
FIG. 29 is a graph showing XRD patterns of the supermicroporous aluminosilicate composition of Example 30 (A) before and (B) after steaming at 650° C. for 4 h.
Figure 30:
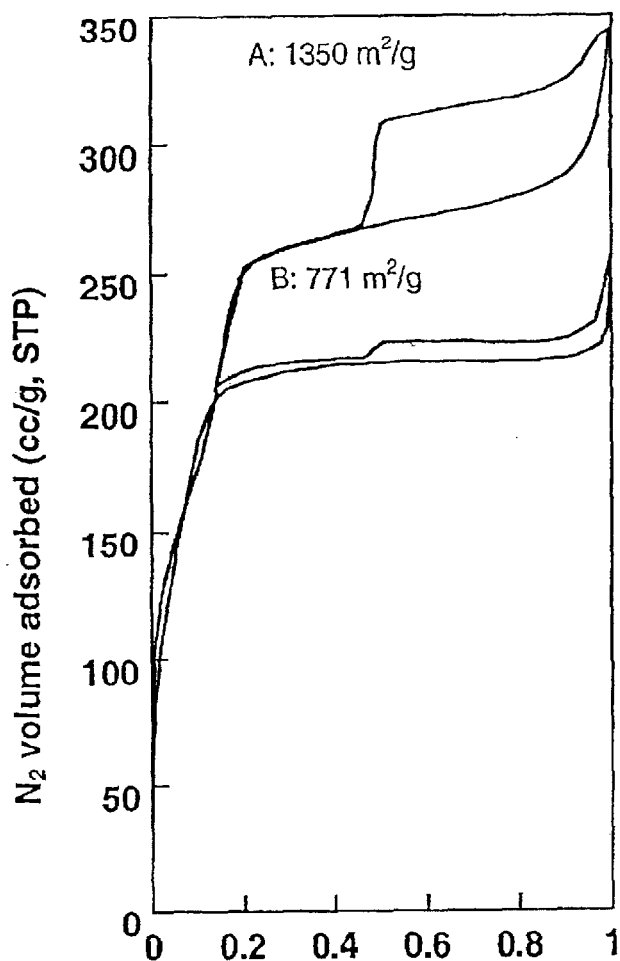
FIG. 30 is a graph showing $N_2$ adsorption and desorption isotherms for the calcined supermicroporous compositions of Example 30 (A) before and (B) after exposure to 20% steam 650° C. for 4 h.
Figure 30A:
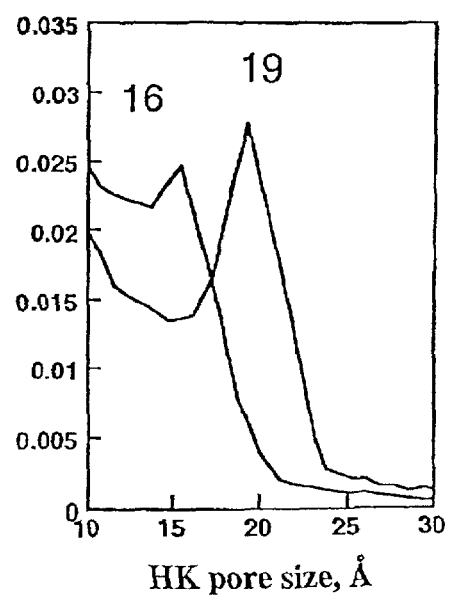
FIG. 30A shows the pore size.

FIG. 29 illustrates the XRD patterns of the disordered calcined composition before and after exposure to 20% steam at 650° C. for 4 hours. FIG. 30 is the $N_2$-adsorption and desorption isotherm of the disordered calcined composition before and afer exposure to 20% steam at 650° C. for 4 hours.

EXAMPLE 31

The purpose of this example is to illustrate the preparation of a composite composition comprising a hydrothermally stable hexagonal MSU-S mesostructure and microporous faujasite zeolite crystals from faujasitic zeolite seeds.

Faujasite zeolite seeds containing 16.7 mole % aluminum (Si/Al=5/1), were prepared in the following manner. A NaOH aqueous solution with 0.088 mole NaOH and 8.5 mole $H_2O$ was prepared and 0.20 mole $NaAlO_2$ was added to this NaOH solution under stirring until a clear solution formed. To this basic sodium aluminate solution was added 0.8 mole of sodium silicate from a 27 wt % sodium silicate solution under vigorous stirring until a homogeneous opalescent gel formed. To obtain the faujasite seeds composition, the gel was sequentially aged at ambient temperature over night and then at 100° C. over night. The gel-like faujasite seeds were diluted with 127 moles of water. To the diluted mixture, was added sequentially 0.044 mole $H_2SO_4$ to decrease the pH and 0.20 mole cetyltrimethylammonium bromide (CTAB) surfactant under stirring at room temperature for 30 minutes. The resultant mixture was further acidified with 0.48 mole $H_2SO_4$ and aged at 100° C. for 48 h to both crystallize the faujasite zeolite component and the hexagonal mesostructured MSU-S components of the composite composition. The as-made composite composition was exchanged with 0.1 M $NH_4NO_3$ solution, air dried and calcined at 550° C. for 4 h.

Figure 33:
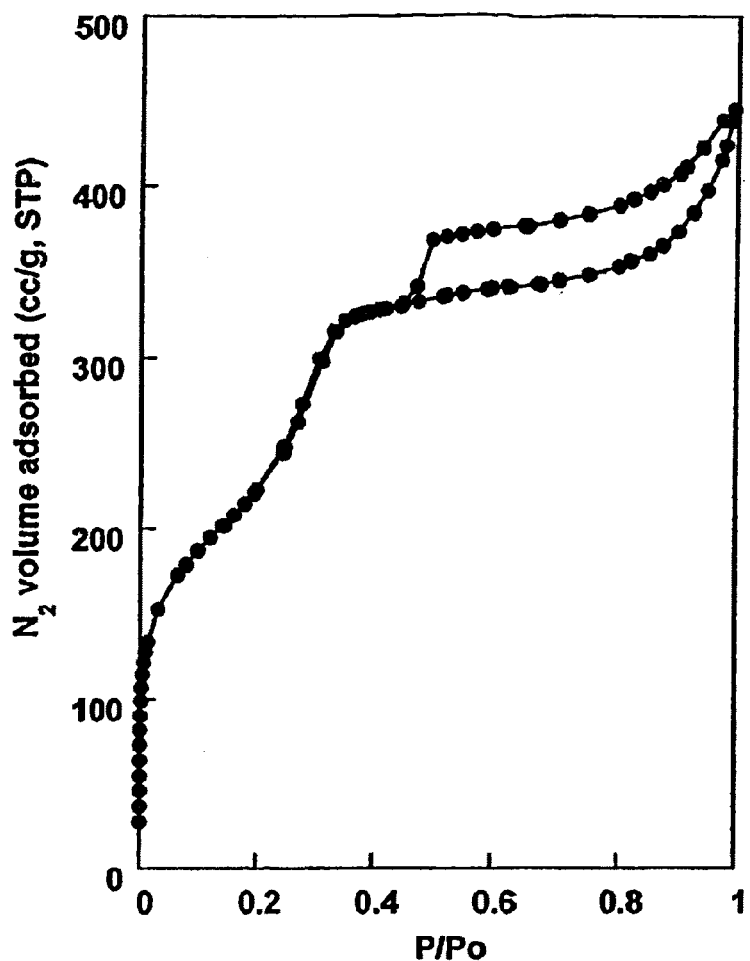
FIG. 33 is a graph showing the nitrogen adsorption/desorption pattern for the composition of Example 31.
Figure 33A:
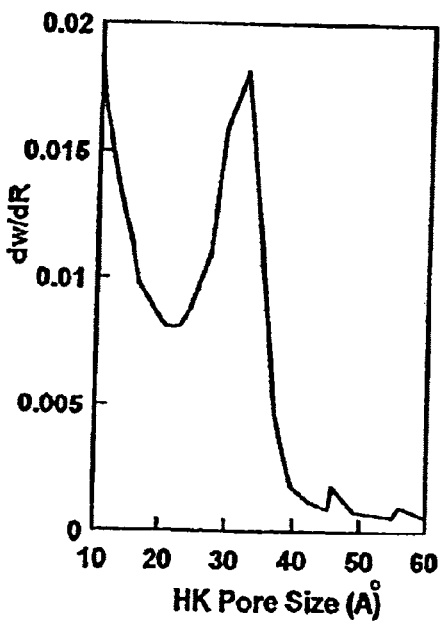
FIG. 33A is a graph showing the pore size distribution.

The calcined composite composition exhibited an XRD powder diffraction pattern indicative of a hexagonal MSU-S mesostructure with diffraction peaks between 1~6 degrees $2\theta$ and multiple diffraction peaks indicative of zeolite Y at $2\theta$ values between 5~50 degrees (FIG. 32). The nitrogen adsorption-desorption isotherms (FIG. 33) were of type IV and show steep hysteresis of type H1 at relative pressure between 0.2~0.4. This isotherm is typical of mesoporous materials that exhibits capillary condensation and evaporation with a narrow pore size distribution. Moreover, the calcined composite exhibited a single $^{27}Al$ MAS NMR chemical shift at about ~62 ppm which is comparable to the shift of steam stable Y zeolites (FIG. 34). In other words, the aluminosilicate species in the composite exhibit an $^{27}Al$ NMR pattern consistent with the presence of faujasitic subunits, as reported in the literature for typical zeolite Y seeds (Y. Liu, W. Zhang, and T. J. Pinnavaia, J. Am. Chem. Soc. 122, 8791 (2000)). The single $^{27}Al$ NMR chemical shift at ~62 ppm indicates that the framework of mesostructure composited of faujasite seeds which is different from a conventional Al-MCM-41 mesostructured (chemical shift at ~55 ppm) or a mechanical mix of MCM-41 and zeolite Y.

EXAMPLE 32

This example demonstrates the preparation of a mesostructured MSU-S/microstructured ZSM-5 zeolite composite composition made from a mixture of ZSM-5 seeds and nanosized ZSM-5 zeolite crystals.

To prepare the mixture of MFI zeolite seeds and nanosized ZSM-5 zeolite crystals, 0.17 g of aluminum sec-butoxide was added with stirring to 7.22 ml of 1.0 M tetrapropylammonium hydroxide and then tetraethylorthosilicate (6.83 g) was added to form a clear solution. A 70-ml portion of water was added to the stirred solution, and the solution was allowed to age to 100° C. overnight (16 hr) under static conditions to form a cloudy mixture of ZSM-5 zeolite seeds and nanosized ZSM-5 crystals. A 2.45-g portion of cetyltrimethylammonium bromide then was added under vigorous stirring for 30 minutes, and the resulting mixture was allowed to age at 100° C. under static conditions overnight (16 h). The pH of the reaction mixture was lowered to a value of 9.0 by the addition of 1.0 M sulfuric acid and the reaction mixture was aged again overnight at 100° C. under static conditions. The mesoporous/microporous composite precipitate was filtered, washed, dried in air and then calcined at 550° C. to remove the surfactant.

The X-ray powder diffraction pattern of the calcined product exhibited diffraction lines at 2θ values between 1~5 degrees consistent with a mesostructure and diffraction lines at 2θ values between 5~50 degrees consistent with a ZSM-5 zeolite phase (FIG. 35). The steam stability of the mesoporous/microporous composite was tested at 800° C. for 2 h in 20% steam. As shown by the nitrogen adsorption/desorption isotherms in FIG. 36, before and after steaming in 20% steam at 800° C. for 2 h, the composite material still retained 80% of its initial surface area and pore volume.

EXAMPLE 33

The purpose of this example is to illustrate that zeolite seeds useful for the preparation of a steam stable MSU-S mesostructure or a steam stable composite of a MSU-S mesostructure and a microstructured crystalline zeolite be prepared from a crystalline zeolite.

In order to prepare a composite mixture of reconstructured zeolite seeds and nanosized zeolite Beta crystals, 2 g Zeolite Beta (Si/Al=37.5, Zeolyst Co.) was added with stirring to 50 mL 0.19 mol NaOH solution. The mixture was heated under static conditions at 100° C. for 2.5 h to form the reconstituted seeds. A 2.45 g portion of cetyltrimethylammonium bromide in 25 ml H$_2$O then was added under vigorous stirring for 30 minutes, and the resulting mixture was allowed to age at 100° C. under static conditions overnight (16 h) to form a mixture of zeolite beta and zeolite beta seeds. The pH of the reaction mixture was lowered to a value of 9.0 by the addition of 0.156 g sulfuric acid and the reaction mixture was aged again overnight at 100° C. under static conditions to form a mesostructure from the remaining zeolite beta seeds. The mesoporous/microporous composite precipitate was filtered, washed, dried in air and then calcined at 55° C. to remove the surfactant.

The X-ray powder diffraction pattern of the calcined product exhibited diffraction lines 2θ values between 1~5 degrees consistent with a hexagonal mesostructure and diffraction lines at 2θ values between 5~50 degrees consistent with zeolite Beta (FIG. 37). The steam stability of this material was tested at 800° C. in 20% steam. As shown in FIGS. 37, 38 and 38A, after steaming at 800° C., the mesoporous/microporous composite material still retained 78% of its initial surface area and 65% of its initial pore volume.

EXAMPLE 34

The purpose of this example is to illustrate that zeolite seeds useful for the preparation of a steam stable MSU-S mesostructure or a steam stable composite of a MSU-S mesostructure and a microstructured crystalline zeolite be prepared from kaolin clay as a precursor.

In order to prepare a mixture of nanosized faujasite zeolite and nanosized faujasite seeds from kaolinite, kaolinite was first calcined at 650° C. for 7 h to convert to metakaolin. The, 0.6 g metakaolin was added to 5.2 g sodium silicate solution (27% SiO$_2$, 14% NaOH) with 0.411 g NaOH, and 5 ml H$_2$O under stirring condition. The mixture was stirred at ambient temperature for 24 h and heated at 90° C. for 16 h. The resultant mixture was comprised of nanosized faujasitic zeolite Y crystals and nanosized faujasite seeds.

The above mixture was diluted with 75 ml water. To the diluted mixture, was added sequentially 0.142 g H$_2$SO$_4$ and 2.45 g CTAB under stirring at room temperature for 30 minutes. The resultant mixture was further acidified with 0.781H$_2$SO$_4$ and aged at 100° C. for 24 h. Then the mixture was acidified with 0.156 g H$_2$SO$_4$ and aged at 100° C. for 24 h again. The final solid was recovered by filtration, washed and air-dried. The as-made mesostructure was exchanged with 0.1 M NH$_4$NO$_3$ solution, air dried and calcined at 550° C. for 4 h.

Figure 40:
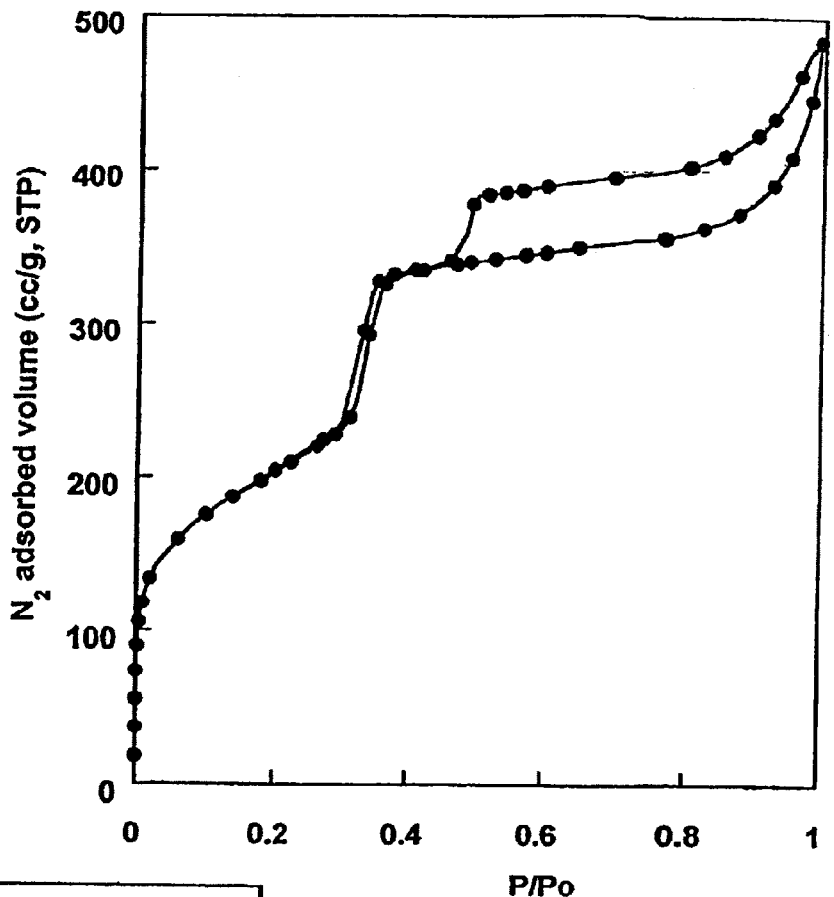
FIG. 40 is a graph showing the nitrogen adsorption/desorption pattern for the composition of Example 34
Figure 40A:
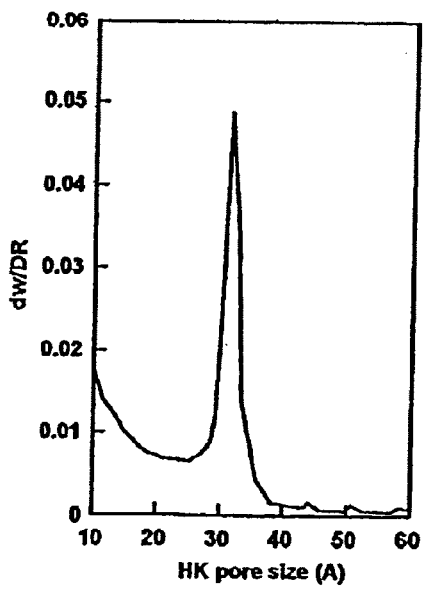
FIG. 40A shows the pore size distribution of the composition.

The calcined hexagonal mesostructured/microstructured composite exhibited diffraction lines at 2θ values between 1~6 degrees characteristic of a hexagonal mesostructure and multiple diffraction lines at 2θ values between 5~50 degrees indicative of zeolite Y crystals (FIG. 39). The isotherms (FIGS. 40 and 40A) are of type IV and show steep hystereses of type H1 at relative pressure between 0.2~0.4, which is typical for mesoporous materials that exhibit capillary condensation and evaporation with narrow pore size distribution. Moreover, the calcined mesostructures exhibited a single $^{27}$Al MAS NMR chemical shift at about ~62 ppm which is comparable to the shift for steam stable Y. The steam stability of the mesoporous/microporous composite was tested at 800° C. for 2 h in 20% steam. As shown in FIG. 44, after exposure to 20% steam at 800° C. for 2 h, the composition retained 75% of its initial surface area and pore volume.

EXAMPLE 35

The purpose of this example is to illustrate that hydrothermally stable a mesostructured/microstructured aluminosilicate composite can be prepared from metakaolin, sodium silicate and sodium aluminate.

To prepare the faujasite seeds, 0.6 g metakaolin, prepared as described in Example 4, was added to 5.2 g sodium silicate solution (27% SiO$_2$, 14% NaOH) with 0.411 g NaOH, 0.05 g NaAlO$_2$ and 5 ml H$_2$O under stirring condition. The mixture was stirred at ambient temperature for 24 h and heated at 80° C. for 16 h. The resultant mixture composed pure nanosized faujasite seeds, but no crystalline zeolite phase as judged by the absence of characteristic XRD lines in the diffraction pattern between 10–50 degrees 2θ.

The above mixture was diluted with 75 ml water. To the diluted mixture, was added sequentially 0.142 g H$_2$SO$_4$ and 2.45 g CTAB under stirring at room temperature for 30 minutes. The resultant mixture was further acidified with 0.781 g H$_2$SO$_4$ and aged at 100° C. for 48 h. The final solid was recovered by filtration washing and air dried. The as-made mesostructure was exchanged with 0.1 M NH$_4$NO$_3$ solution, air dried and calcined at 550° C. for 4 h. The calcined hexagonal micro/meso mesostructured/microstructured product exhibited hexagonal mesostructure diffraction lines at 2θ values between 1~6 degrees and nanosized zeolite Y crystals at 2θ values between 5–50 degrees (FIG. 41). The isotherms (FIGS. 42 and 42A) are of type IV and show steep hystereses of type H1 at relative pressure between 0.2~0.4, which is typical for mesoporous materials that exhibit capillary condensation and evaporation with narrow pore size distribution. Moreover, the calcined mesostructures exhibited a single $^{27}$Al MAS NMR chemical shift at about ~62 ppm which is comparable to the shift of steam stable Y. The steam stability of the mesoporous/microporous composite was tested at 800° C. for 2 h in 20% steam. As shown in FIG. 46, after exposure to 20% steam at 800° C. for 2 h, the composition retained 78% of its initial surface area and 85% of its pore volume.

EXAMPLE 36

The purpose of this example is to illustrate that a hydrothermally stable hexagonal mesostructured Aluminosilicate MSU-S can be prepared from metakaolin, sodium silicate and sodium aluminate.

To prepare the faujasite seeds, 0.6 g metakaolin, prepared as described in Example 4, was added to 5.2 g sodium silicate solution (27% SiO$_2$, 14% NaOH) with 0.411 g NaOH, 0.05 g NaAlO$_2$ and 5 ml H$_2$O under stirring conditions. The mixture was stirred at ambient temperature for 24 h and heated at 80° C. for 16 h. The resultant mixture contained nanosized faujasite seeds, but no crystalline zeolite phase as judged by the absence of characteristic XRD lines in the diffraction pattern between 10–50 degrees 2θ.

The above mixture was diluted with 75 ml water. To the diluted mixture, was added sequentially 0.142 g H$_2$SO$_4$ and 2.45 g CTAB under stirring at room temperature for 30 minutes. The resultant mixture was acidified with 0.781 g H$_2$SO$_4$ and aged at 100° C. for 18 h, then further acidified with 0.156 g H$_2$SO$_4$ and aged at 100° C. for another 18 h. The final solid was recovered by filtration washing and air dried. The as-made mesostructure was exchanged with 0.1 M NH$_4$NO$_3$ solution, air dried and calcined at 550° C. for 4 h.

The calcined product exhibited diffraction lines characteristic of a hexagonal mesostructure at 2θ values between 1~6 degrees and no diffraction lines at 2θ values between 5~50 degrees (FIG. 43), verifying the absence of a crystalline zeolite phases. The isotherms (FIGS. 44 and 44A) are of type IV and show steep hysteresis of type H1 at relative pressure between 0.2~0.4, which is typical for mesoporous materials that exhibit capillary condensation and evaporation with narrow pore size distribution. Moreover, the calcined mesostructures exhibited a single $^{27}$Al MAS NMR chemical shift at about ~62 ppm which is comparable to the shift observed for steam stable zeolite Y.

EXAMPLE 37

The purpose of this example is to illustrate that zeolite fragments useful for the preparation of a steam stable MSU-S mesostructure from a crystalline zeolite.

In order to reconstitute the zeolite into zeolite fragments, 2 g of ultrastable zeolite Y (Si/Al=39, Zeolyst Co.) was added with stirring to 30 mL 0.19 molar NaOH solution and stirred for 30 min. To the restructured zeolite fragments solution, a 2.45 g portion of cetyltrimethylammonium bromide in 25 ml H$_2$O then was added under vigorous stirring for 30 minutes, and the resulting mixture was allowed to age at 100° C. under static conditions for 16 h. Then the pH of the reaction mixture was lowered to a value of 9.0 by the addition of 0.156 g sulfuric acid and the reaction mixture was aged again overnight at 100° C. under static conditions. The precipitate was filtered, washed, dried in air and then calcined at 550° C. to remove the surfactant.

The x-ray powder diffraction pattern of the calcined product exhibited diffraction lines at 2θ values between 1~5 degrees consistent with a hexagonal mesostructure and no diffraction lines at 2θ values between 5~50 (FIG. 45).

The isotherms (FIG. 46) are of type IV and show steep hystereses of type H1 at relative pressure between 0.2~0.4, which is typical for mesoporous materials that exhibit capillary condensation and evaporation with narrow pore size distribution.

EXAMPLE 38

The purpose of this example was to demonstrate that fragments containing zeolitic subunits derived from the ultrasonic degradation of the delaminated ITQ-2 layers of MCM-22 zeolite, were useful for the preparation of a steam stable aluminosilicate mesostructure, which we denote MSU-S/ITQ.

In order to prepare nanosized fragments of zeolite MCM-22, delaminated ITQ-2 layers were prepared from the precursor of zeolite MCM-22, denoted MCM-22 (P) (Corma, A., *Nature* 353 (1998)). A 0.23-g quantity of NaAlO$_2$ and a 0.81-g amount of NaOH were dissolved in 103.5 g H$_2$O under stirring at ambient temperature. Then 6.35 g hexamethylenimine (HMI) and 7.86 g fumed silica were added under stirring at ambient temperature for 30 min. The mixture then was transferred to an autoclave and aged at 190° C. for 11 days under stirring. The resulting MCM-22 (P) solid was washed with H$_2$O until pH <8, centrifuged, and dried at room temperature. Then 1.35 g of the dried MCM-22(P) was added to 5.4 g H$_2$O to form a slurry. Then 7.6 g cetyltrimethylammonium bromide in 26 ml H$_2$O was added under stirring. To the mixture was added 9.45 g of 35% tetraethylammonium hydroxide. After refluxing at 80° C. for 16 h, 25 ml H$_2$O was added and the pH of the mixture was adjusted to ca. 12.5 with tetraethyl ammonium hydroxide. The mixture was cooled in a cold water bath and then subjected to ultrasonication by a ultrasonic horn for 1 hour. A few drops of strong HCl acid was added to adjust the suspension to pH=2. The mixture was centrifuged to obtain a solid containing the transformed ITQ-2 layers containing zeolitic subunits. The transformed ITQ-2 fragments were washed with acetone:water=1:1 (v/v) solution and then air dried.

To assemble the transformed nanosized ITQ-2 fragments containing zeolitic subunits into a mesoporous material, 10 ml H$_2$O, 1.1 g CTAB and 1.22 g 20% tetramethylammonium hydroxide was added consecutively and transferred to an autoclave. The autoclave was heated at 150° C. for 40 h. The final solid was recovered by filtration, washed and air-dried. The surfactant was removed by calcination at 550° C. for 4 hours and the product was denoted MSU-S/ITQ-2.

Figure 47:
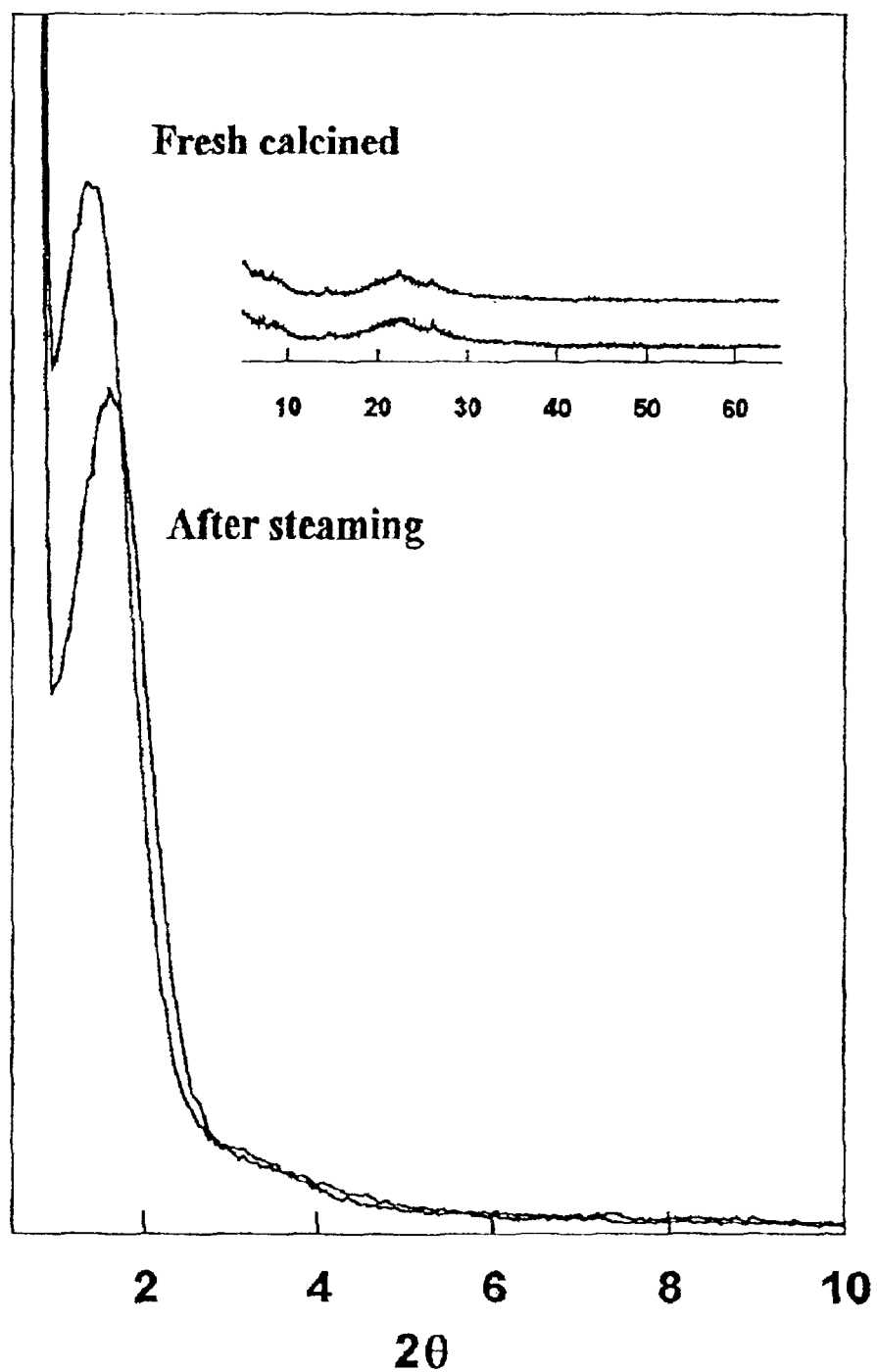
FIG. 47 is a graph showing XRD patterns of MSU-S/ITQ (Example 38) before and after steaming at 800° C. for 2 hours.

The X-ray powder diffraction patterns of the calcined product before and after steaming at 800° C. for 2 hours are shown in FIG. 47. Clearly, MSU-S/ITQ was still stable after steaming at 800° C. Also, in the wide angle scattering range, weak ITQ-2 peaks were observed, which confirms that MSU-S/ITQ was successfully assembled by using nanosized aluminosilicate particles derived from delaminated ITQ-2 layers.

Figure 48:
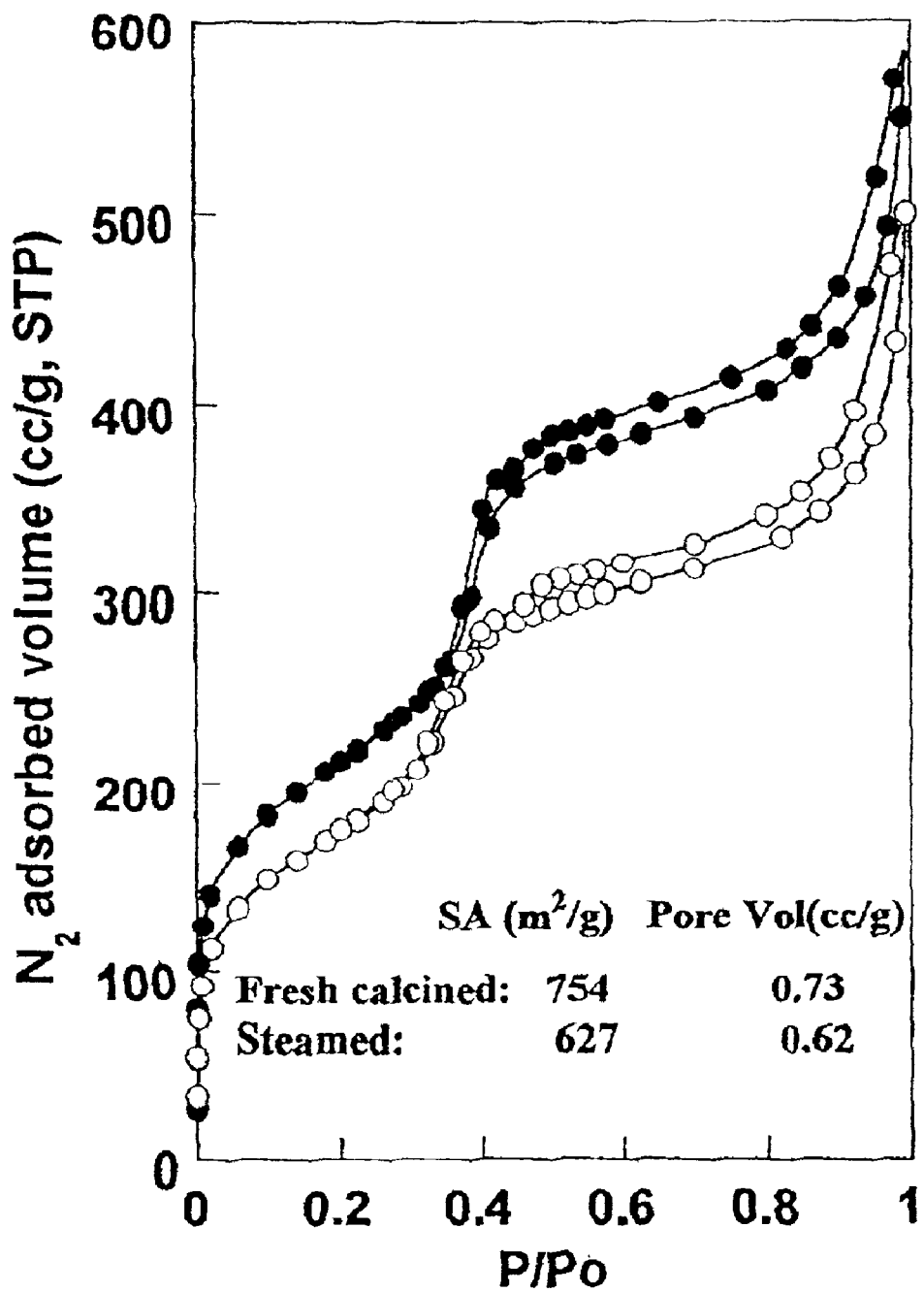
FIG. 48 is a graph showing $N_2$ sorption isotherms of MSU-S/ITQ (Example 38) before and after steaming at 800° C. for 2 hours.

The isotherms (FIG. 48) are of type IV and show steep hystereses of type H1 at relative pressure between 0.2–0.4, which is typical for mesoporous materials that exhibit capillary condensation and evaporation with a narrow pore size distribution. The steam stability of the mesoporous/microporous composite was tested at 800° C. for 2 hours in 20% steam. As shown in FIG. 48, before and after steaming in 20% steam at 800° C. for 2 hours, the material still retained 83% of its initial surface area and 85% of its pore volume.

Figure 49:
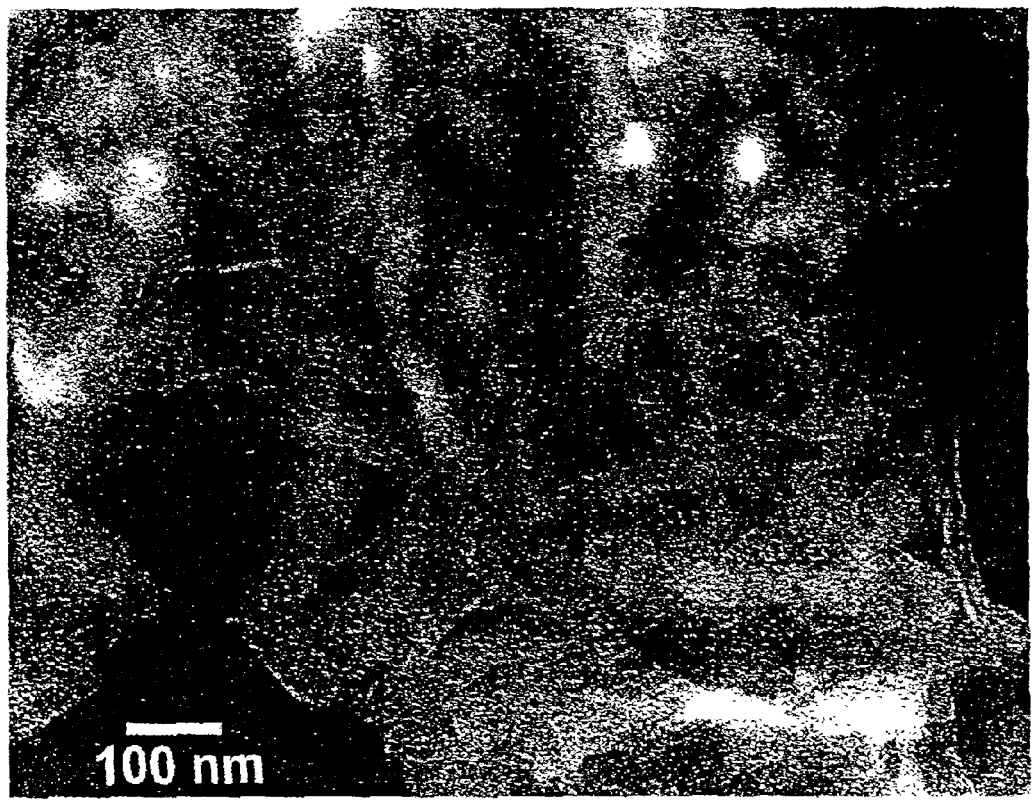
FIG. 49 is a TEM image of MSU-S/ITQ (Example 38).

The TEM image of MSU-S/ITQ was shown in FIG. 49 which further confirmed the mesophase of MSU-S/ITQ.

EXAMPLE 39

The purpose of this example was to illustrate the preparation of a hydrothermally stable wormhole mesostructure using zeolite beta seeds and a small, non-surfactant organic molecule as a porogen, namely triethanol amine, in place of a surfactant. The product was denoted MSU-S/TEA.

In order to make zeolite Beta seeds containing 2 mol % Al, 0.11 g of aluminum sec-butoxide was added with stirring to 3.3 g of 35% tetraethylammonium hydroxide and then 4.4 g of tetraethylorthosilicate and 4 ml $H_2O$ were added to form a clear solution under vigorous stirring overnight at ambient temperature. Then the clear solution was aged at 100° C. for 3–10 h. 3.2 g triethanolamine was added under stirring at ambient temperature for 24 h and heated at 80–100° C. under stirring for 2–4 hours to vaporize ethanol and $H_2O$. The dry gel was aged at 100° C. for 48 hours and final products were obtained by calcination at 650° C. for 10 hours with the ramp rate at 1° C./min.

Figure 50:
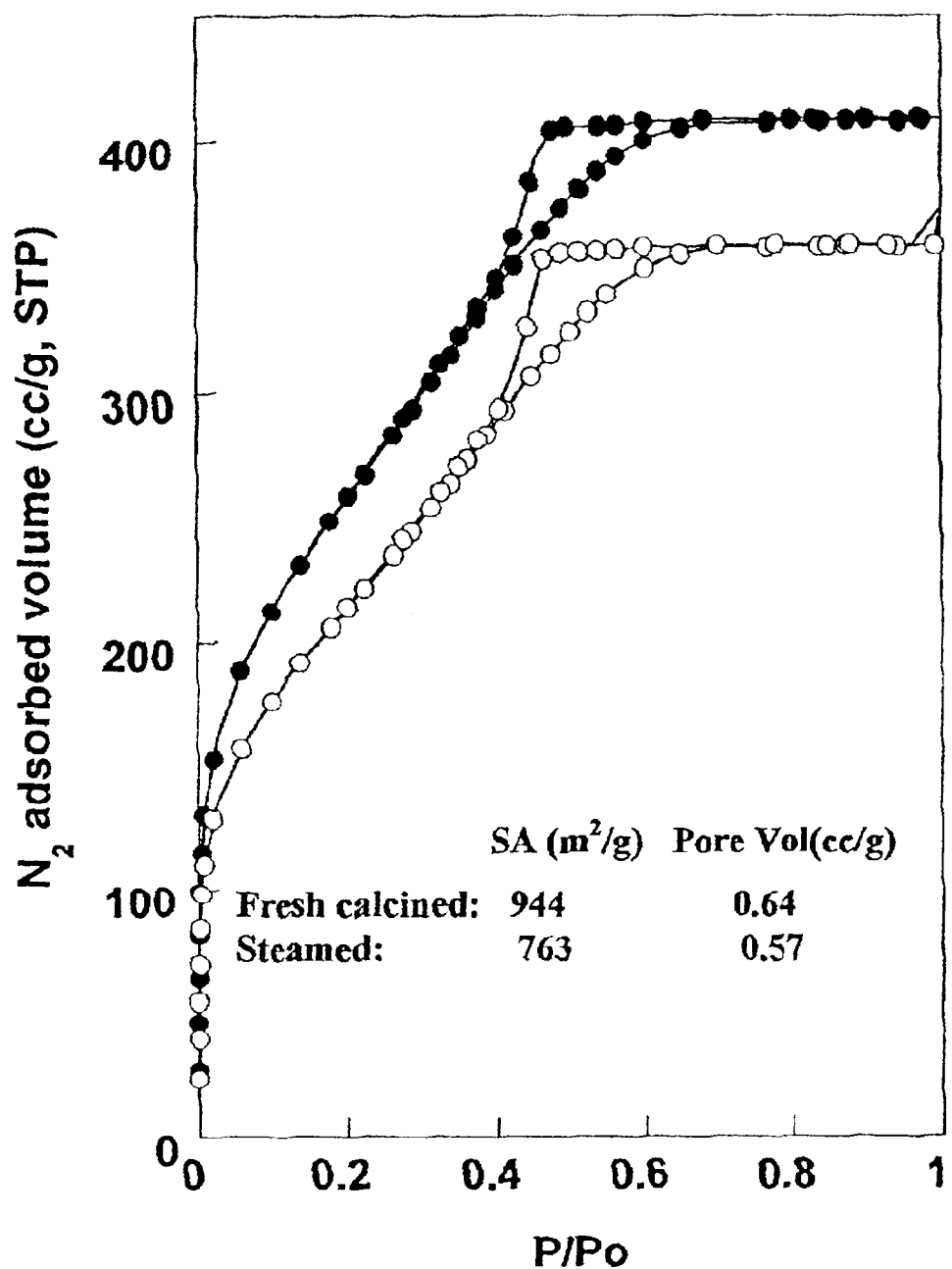
FIG. 50 is a graph showing $N_2$ sorption isotherms of MSU-S/TEA (Example 39) before and after steaming for 2 hours.
Figure 51:
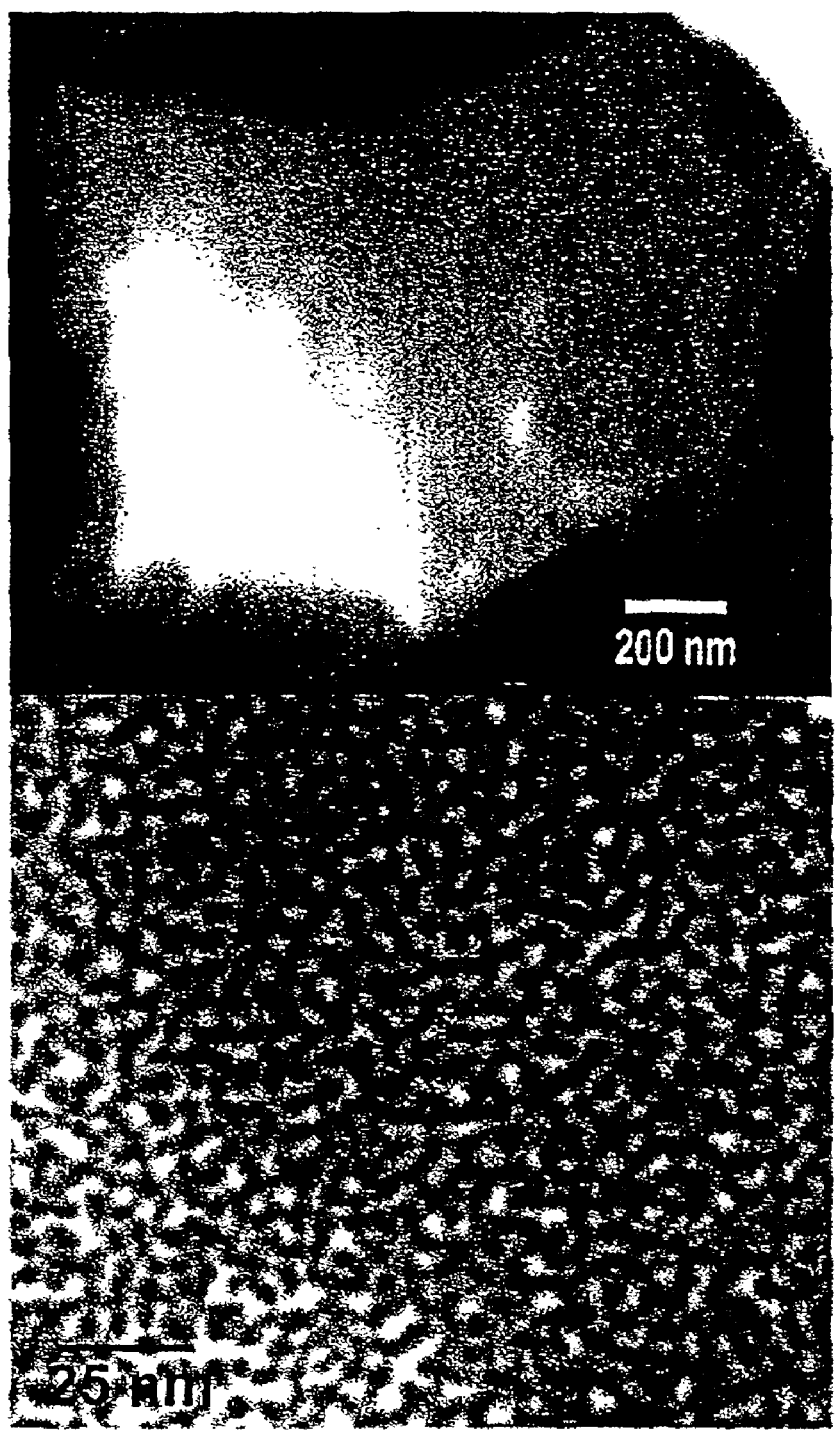
FIG. 51 is a TEM image of MSU-S/TEA (Example 39) at 200 nm and at 25 nm measuring scale.

The isotherms (FIG. 50) were of type IV and showed a hystereses of type H1 at relative pressure between 0.2~0.4, which was typical for mesoporous materials that exhibit capillary condensation. Further evidence for the presence of uniform mesoporous of MSU-S/TEA was provided by TEM images (FIG. 51). The steam stability of this material was tested at 800° C. in 20% steam for 2 hours. As shown in FIG. 50, after steaming at 800° C., the material still retained 81% of its initial surface area and 89% of its initial pore volume.

It is intended that the foregoing description be only illustrative of the present invention and that the present invention be limited only by the hereinafter appended claims.

We claim:

1. A porous structured aluminosilicate composition which comprises:

a framework of linked tetrahedral $SiO_4$ and $AlO_4$ units assembled from zeolite fragments, the framework defining pores and having a Si to Al molar ratio of between about 1000 to 1 and 1 to 1 and having at least one x-ray diffraction peak between 2 and 100 nm, and wherein the composition retains at least 50% of an initial framework pore volume after exposure to 20 volume % steam at 800° C. for two hours.

2. A porous structured aluminosilicate composition which comprises:

a framework of linked $SiO_4$ and $AlO_4$ units assembled from zeolite fragments, the framework defining pores and having a Si to Al molar ratio of about 1000 to 1 and 1 to 1, and having at least one X-ray diffraction peak between 2 and 100 nm, and wherein the composition retains at least 75% of an initial framework pore volume after exposure to 20 volume percent steam at 600° C. for four hours.

3. The composition of claim 1 or 2 assembled from preformed zeolite seeds and zeolite fragments.

4. The composition of claim 3 wherein the zeolite seeds are formed using a structure director selector from the group consisting of organic onium ions, alkali metal ions and mixtures thereof.

5. The composition of claim 1 or 2 having a BET surface area of between about 200 and 1400 $m^2$ per gram, an average pore size between about 1 and 100 nm and a pore volume of between about 0.1 and 3.5 $cm^3$ per gram.

6. The composition of claim 1, 2 or 3 containing between about 0.1 and 50% by weight carbon in the framework pores.

7. The composition of claims 1 and 2 with an infrared absorption band between 500 and 600$cm^{-1}$.

8. The composition of claims 1 and 2 with a $^{27}$Al NMR chemical shift between about 57 and 65 ppm relative to an external reference of 1.0 M aluminum nitrate.

9. The composition of claim 1 which contains zeolite crystals.

10. The composition of claim 2 which contains zeolite crystals.

11. A porous structured aluminosilicate composition which comprises:

a framework of linked tetrahedral $SiO_4$ and AlO4 units, the framework defining pores having an organic surfactant in the pores and having a Si to Al molar ratio of between 1000 to 1 and 1 to 1 and having at least one X-ray diffraction peak corresponding to a basal spacing between about 2 and 100 nm and wherein the composition is derived from a porogen and preformed zeolite fragments.

12. The composition of claim 11 wherein the porogen is an organic surfactant is selected from the group consisting of an organic onium ion surfactant and a non-ionic surfactant.

13. The composition of claim 12 wherein the surfactant is a non-ionic surfactant selected from the group consisting of a non-ionic polyethylene oxide surfactant and a non-ionic amine surfactant.

14. The composition of claim 11 wherein the zeolite seeds are formed using a structure director selected from the group consisting of organic onium ions, alkali metal ions and mixtures thereof.

15. The composition of claim 11 wherein the porogen is an organic surfactant which contains a co-surfactant selected from the group consisting of alkyl alcohol, alkyl amine, aromatic hydrocarbon and mixtures thereof containing between about 2 and 36 carbon atoms in the alkyl and 6 to 36 carbon atoms in the aromatic hydrocarbon.

16. The composition of claim 11 which contains zeolite crystals.

17. The composition of claim 11 wherein the zeolite fragments are derived from zeolite crystals by digesting with a base.

18. The composition of claim 11 wherein the zeolite fragments are derived from a naturally occurring crystalline zeolite.

19. The composition of claim 11 wherein the porogen is selected from the group consisting of an amine, ethoxylated amine or alkoxylated amine.

20. The composition of claim 11 wherein the zeolite seeds and fragments are derived from a crystalline aluminosilicate.

21. The composition of claim 20 wherein the crystalline aluminosilicate is a clay.

22. A structured aluminosilicate porous composition which comprises:

a framework of linked tetrahedral $SiO_4$ and $AlO_4$ units assembled from zeolite fragments, the framework defining mesopores, having a porogen in the pores of the composition, having a Si to Al molar ratio of between about 1000 to 1 and 1 to 1, and having at least one X-ray diffraction peak corresponding to a basal spacing between about 2.0 and 100 nm, and which when calcined retains at least 50% of an initial framework pore volume after exposure to 20 volume % steam at 800° C. for two hours.

23. The composition of claim 22 wherein the porogen is a surfactant is selected from the group consisting of:
  (a) an ammonium or phosphonium ion of the formula $R_1R_2R_3R_4Q^+$, wherein Q is nitrogen or phosphorous, and wherein at least one of the R moieties is selected from the group consisting of aryl, alkyl of between about 6 to 36 carbon atoms and combinations thereof, remaining of the R moieties are selected from the group consisting of hydrogen, alkyl of from 1 to 5 carbon atoms and combinations thereof, and
  (b) a non-ionic block surfactant containing polyethylene oxide units in a hydrophilic block and polypropylene oxide, polybutylene oxide, alkyl, or aryl units in a hydrophobic block, and nonionic amine surfactants containing 6 to 36 carbon atoms.

24. The composition of claim 22 wherein the porogen is a surfactant and a co-surfactant and the co-surfactant is selected from the group alkyl amine, alkyl alcohol, aromatic hydrocarbon and mixtures thereof, wherein the number of carbon atoms in the co-surfactant is between 2 and 36.

25. The composition of any one of claims 1, 2, 11 or 22 where in the framework has a structure which is hexagonal, cubic, lamellar, wormhole or cellular foam.

26. The composition of claim 11 or 22 wherein the porogen is removed by calcination, by ion exchange, or by a combination of ion exchange and calcination.

27. The process of claim 22 wherein the porogen is a non-surfactant.

28. The process of claim 22 wherein the porogen is triethanolamine.

29. A porous aluminosilicate composition which comprises: a framework of tetrahedral linked $SiO_4$ and $AlO_4$ units assembled from zeolite fragments, the framework defining mesopores having an Si to Al molar ratio of between about 1000 to 1 and 1 to 1, and having at least one x-ray diffraction peak corresponding to a basal spacing between about 2.0 and 100 nm, wherein a BET surface area is between 200 and 1400 $m^2$ per gram, wherein an average pore size of the framework is between about 1.0 and 100 nm, and wherein a pore volume of the framework is between about 0.1 and 3.5 $cm^3$ per gram, and which retains at least 50% of an initial framework pore volume after exposure to 20 volume % steam at 800° C. for two hours.

30. The composition of claim 29 wherein the framework has a structure which is hexagonal, cubic, lamellar, wormhole, or cellular foam.

31. A hybrid porous aluminosilicate-carbon composition which comprises: a framework of linked tetrahedral $SiO_4$ and $AlO_4$ units assembled from zeolite fragments, the framework defining mesopores having an Si to Al molar ratio of between about 1000 to 1 and 1 to 1 and between 0.01 and 50 wt % carbon embedded in the mesopores, and having at least one X-ray diffraction peak corresponding to a basal spacing between about 2.0 and 100 nm, wherein a BET surface area is between 100 and 1400 $m^2$ per gram, wherein an average pore size of the framework is between about 1.0 and 100 nm, and wherein a pore volume of the framework is between about 0.1 and 3.5 $cm^3$ per gram, and which retains at least 50% of an initial framework pore volume after exposure to 20 volume % steam at 800° C. for two hours.

32. The composition of claim 31 wherein the framework has a structure which is hexagonal, cubic, lamellar, wormhole, or cellular foam.

33. The composition of claim 31 which contains zeolite crystals.

34. A composition prepared by treating the composition of claim 22 before calcining with an ammonium salt solution at a temperature between about 0° and 200° C. for a period of up to 24 hours and repeating the treatment up to ten times to introduce ammonium ions into the composition, collecting and drying the resulting composition, and then calcining the resulting composition at a temperature between about 400 and 900° C. to remove the organic porogen and to convert a fraction of the surfactant or other organic porogen to carbon embedded in the mesopores.

35. A carbon composition obtained from the composition of any one of claim 31, 32, or 34, wherein the aluminosilicate component is removed by dissolving in aqueous base or hydrofluoric acid.

36. A porous structured silicate composition which comprises:
  a framework of linked tetrahedral $SiO_4$ and units selected from the group consisting of $AlO_4$ units, $GaO_4$ units, $TiO_4$ units and mixed units assembled from zeolite fragments, the framework defining pores and having an Si to combined Ga, Ti and Al molar ratio of between about 1000 to 1 and 1 to 1, and having at least one X-ray diffraction peak corresponding to a basal spacing between about 1 and 100 nm, and wherein the composition retains at least 50% of the initial framework pore volume after exposure to 20 volume percent steam at 600° C. for four hours.

37. The composition of claim 36 assembled from pre-formed nanoclustered seed precursors.

38. The composition of claim 36 or 37 having an X-ray diffraction peak corresponding to a basal spacing between about 2 and 100 nm, a BET surface area of between about 200 and 1400 $m^2$ per gram, an average pore size between about 1 and 100 nm and a pore volume of between about 0.1 and 3.5 $cm^3$ per gram.

39. The composition of claim 37 wherein the seed precursors are formed using a structure director selected from the group consisting of organic onium ions, alkali metal ions and mixtures thereof.

40. The composition of claim 36 wherein the catalyst contains zeolite seeds and zeolite fragments.

* * * * *

UNITED STATES PATENT AND TRADEMARK OFFICE
CERTIFICATE OF CORRECTION

PATENT NO. : 6,843,977 B2
DATED : January 18, 2005
INVENTOR(S) : Thomas J. Pinnavaia, Wenzhong Zhang and Yu Liu It is certified that error appears in the above-identified patent and that said Letters Patent is hereby corrected as shown below:

Column 7,
Line 40, "Al-MSU-$S_w$" should be -- Al-MSU-S --.
Line 64, "$^{27}$Al AS NMR" should be -- $^{27}$Al MAS NMR --.

Column 27,
Line 38, "14.0 A," should be -- 14.0 Å, --.

Column 43,
Line 63, "0.0068 mel" should be -- 0.0068 mol --.

Column 45,
Line 53, "55ºC." should be -- 550ºC --.

Column 46,
Line 67, "between 5-50" should be -- between 5 ~ 50 --.

Column 48,
Line 62, "0.2-0.4" should be -- 0.2 ~ 0.4 --.

Column 49,
Line 19, "3-10 h." should be -- 3 ~ 10 h. --.
Line 20, "80-100ºC" should be -- 80 ~ 100ºC --.
Line 21, "2-4 hours" should be -- 2 ~ 4 hours --.
Line 60, "claim 1 or 2" should be -- Claims 1 or 2 --.
Line 63, "selector" should be -- selected --.
Line 66, "Claim 1 or 2" should be -- Claims 1 or 2 --.

Column 50,
Line 16, "AlO4 units" should be -- $AlO_4$ units --.

UNITED STATES PATENT AND TRADEMARK OFFICE
CERTIFICATE OF CORRECTION

PATENT NO. : 6,843,977 B2
DATED : January 18, 2005
INVENTOR(S) : Thomas J. Pinnavaia, Wenzhong Zhang and Yu Liu It is certified that error appears in the above-identified patent and that said Letters Patent is hereby corrected as shown below:

Column 52,
Line 23, "claim 31, 32, or 34" should be -- Claims 31, 32, or 34 --.

Signed and Sealed this

Sixteenth Day of August, 2005

JON W. DUDAS
*Director of the United States Patent and Trademark Office*